United States Patent [19]
Sparks et al.

[11] Patent Number: 6,085,852
[45] Date of Patent: Jul. 11, 2000

[54] PIPE HANDLING DEVICE

[75] Inventors: Darrel W. Sparks, Perry; Richard W. McEwen, Coyle; Arthur D. Deken, Perry; Cody L. Sewell, Perry; Ronald A. Frazier, Perry; James E. Franklin, Perry; Kevin L. Smith, Perry, all of Okla.

[73] Assignee: The Charles Machine Works, Inc., Perry, Okla.

[21] Appl. No.: 08/624,240

[22] Filed: Mar. 29, 1996

Related U.S. Application Data

[63] Continuation-in-part of application No. 08/532,354, Sep. 22, 1995, abandoned, which is a continuation-in-part of application No. 08/392,072, Feb. 22, 1995, abandoned.

[51] Int. Cl.[7] .................................................. E21B 19/14
[52] U.S. Cl. .............................. 175/52; 173/164; 175/85; 414/22.54; 414/22.58
[58] Field of Search .................................. 175/52, 85, 209; 166/77.5; 81/57.16, 57.21, 57.34; 414/22.54, 22.57, 22.58, 22.61, 22.62, 22.63, 22.65

[56] References Cited

U.S. PATENT DOCUMENTS

| Re. 30,071 | 8/1979 | Hilding | 175/52 |
|---|---|---|---|
| 3,095,048 | 6/1963 | O'Neill | 175/6 |
| 3,254,776 | 6/1966 | Brown | 214/2.5 |
| 3,411,596 | 11/1968 | Robbins | 175/85 |
| 3,506,075 | 4/1970 | Attebo | 175/52 |
| 3,552,506 | 1/1971 | Mayer | 175/85 |
| 3,561,616 | 2/1971 | Eddy | 214/2.5 |
| 3,800,980 | 4/1974 | Takeuchi | 221/195 |
| 3,913,753 | 10/1975 | Swartz et al. | 214/2.5 |
| 3,918,536 | 11/1975 | Detter | 175/85 |
| 3,965,994 | 6/1976 | Hilding | 175/52 |

(List continued on next page.)

FOREIGN PATENT DOCUMENTS

| 00477728 | 9/1991 | European Pat. Off. | 19/14 |
|---|---|---|---|
| 477728 | 9/1991 | European Pat. Off. | 19/14 |
| 0565502 | 10/1993 | European Pat. Off. | E21B 19/20 |
| 565502A1 | 10/1993 | European Pat. Off. | E21B 19/20 |

(List continued on next page.)

Primary Examiner—William Neuder
Attorney, Agent, or Firm—McKinney & Stringer, P.C.

[57] ABSTRACT

An automatic pipe handling device (10) is disclosed which includes a support frame (12) mounted on a boring device (14). Removable pipe racks (16, 80, 130, 140) can be placed in position on the support frame (12) to deliver pipe to the spindle axis or to remove pipe therefrom as required. The pipe sections are removed from the pipe rack and positioned on the spindle axis by pipe grippers (32) mounted on hydraulic cylinders (28, 30) mounted on a rotating longitudinal shaft (20). The grippers and shaft similarly return the used pipe sections for storage to the pipe rack. In one pipe rack (16) an S-shaped guide path (72) is used. In another pipe rack (80) a plurality of rows (88, 90, 92) of pipe sections are used.

In another embodiment, pipe is stored in an arcuate path. Pipe grippers (32) may be pivoted to any selected position along the arc extending from a first position (178) for connecting to or receiving pipe from the boring device, to a final position (180) where the pipe grippers (32) are positioned to pick up the last pipe in the arc.

In another embodiment, pipe is stored in a self-leveling arrangement beneath a pipe loader (256). The pipe loader is mounted on a rotation member (236) which, in combination with extension cylinders (244), rotates and extends pipe grippers (256) to access any selected pipe section stored in the self-leveling arrangement.

In another embodiment, pipe sections (18) are stored horizontally in columns (430) above a pipe handling assembly (416) which shuttles pipe sections between the boring device and the storage area. The pipe handling assembly (416) has arms which extend and retract between the spindle line of the boring device and the columns of pipe sections.

245 Claims, 22 Drawing Sheets

U.S. PATENT DOCUMENTS

| | | | |
|---|---|---|---|
| 3,966,053 | 6/1976 | Loftis | 211/60 |
| 3,985,189 | 10/1976 | Jahnke et al. | 175/52 |
| 4,033,465 | 7/1977 | Stine | 214/13 |
| 4,382,738 | 5/1983 | Frias | 414/22 |
| 4,445,579 | 5/1984 | Bello | 175/52 |
| 4,449,592 | 5/1984 | Mayer | 175/52 |
| 4,455,116 | 6/1984 | Lindstedt et al. | 414/22 |
| 4,533,055 | 8/1985 | Haney | 211/70.4 |
| 4,604,724 | 8/1986 | Shaginian | 364/478 |
| 4,632,618 | 12/1986 | Issakainen | 414/22 |
| 4,709,766 | 12/1987 | Boyadjieff | 175/52 |
| 4,725,179 | 2/1988 | Woolslayer et al. | 414/22 |
| 4,822,230 | 4/1989 | Slettedal | 414/22.54 |
| 4,834,195 | 5/1989 | Robinson | 175/52 |
| 4,951,759 | 8/1990 | Richardson | 175/85 |
| 5,050,283 | 9/1991 | Piipponen | 13/50 |
| 5,183,122 | 2/1993 | Rowbotham et al. | 175/52 |
| 5,263,545 | 11/1993 | Tudora et al. | 175/52 |
| 5,284,375 | 2/1994 | Land, III | 294/88 |
| 5,297,642 | 3/1994 | Rajakallio et al. | 175/52 |
| 5,375,667 | 12/1994 | Trevisani | 175/52 |
| 5,556,253 | 9/1996 | Rozendaal | 414/797.7 |
| 5,607,280 | 3/1997 | Rozendaal | 414/745.7 |
| 65471 | 1/1984 | Finland | E21C 9/00 |
| 2018884 | 3/1970 | Germany | E21B 19/00 |
| 01483865 | 9/1970 | Germany | E21B 9/00 |
| 1483865 | 9/1970 | Germany | E21C 9/00 |
| 2148357 | 3/1972 | Germany | E21C 5/00 |
| 2952764A | 7/1981 | Germany | B65G 1/06 |
| 3608511A | 9/1987 | Germany | E21C 11/02 |
| 225859 | 4/1969 | Sweden | E21B 19/00 |
| 1455510 | 11/1976 | Sweden | E21B 19/14 |
| 1737094 | 8/1987 | U.S.S.R. | E21B 7/00 |

FOREIGN PATENT DOCUMENTS

| | | | |
|---|---|---|---|
| 776832 | 6/1957 | United Kingdom . | |
| 1455510 | 11/1976 | United Kingdom | E21B 19/14 |
| 2139269A | 11/1984 | United Kingdom | E21B 19/15 |
| 09119885 | 12/1991 | WIPO . | |
| 9119885 | 12/1991 | WIPO . | |

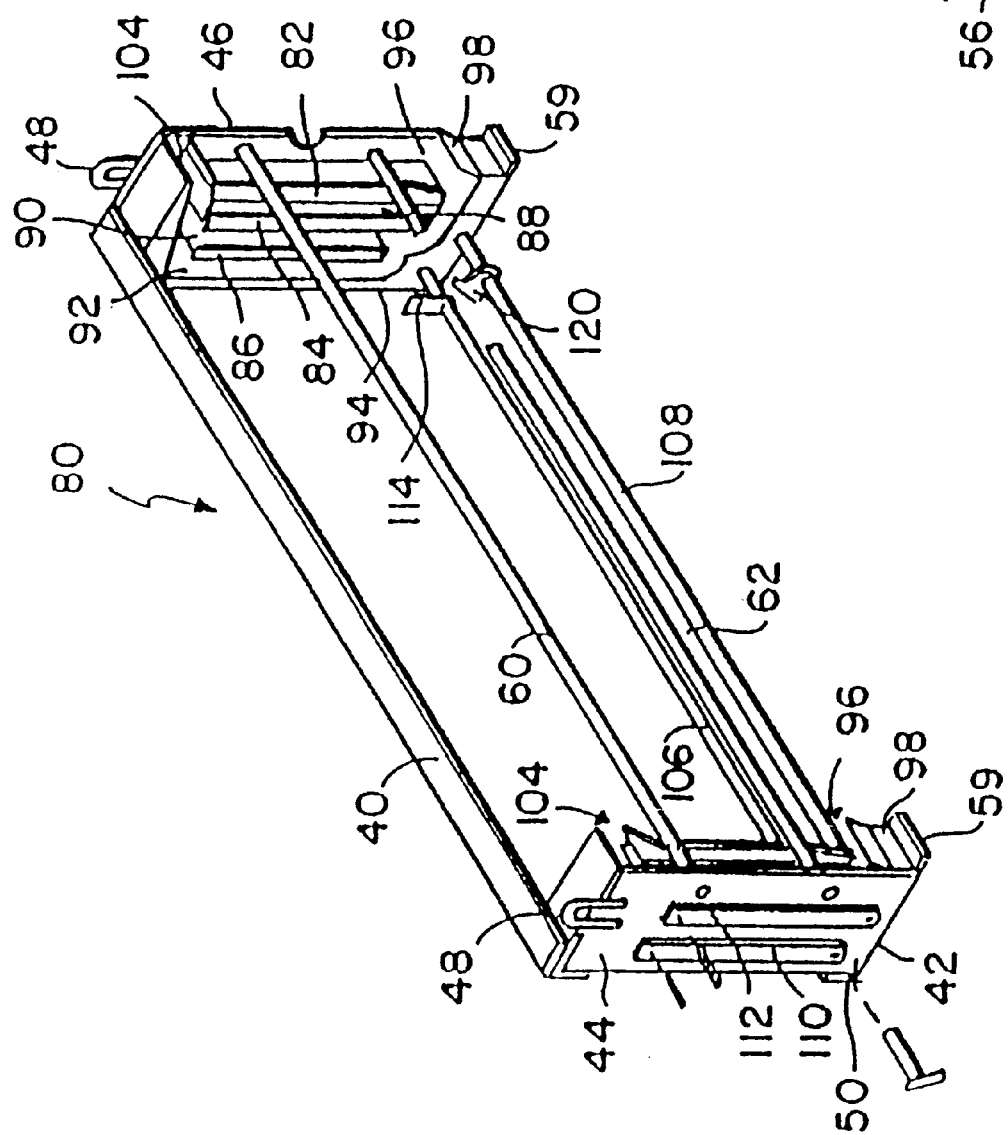
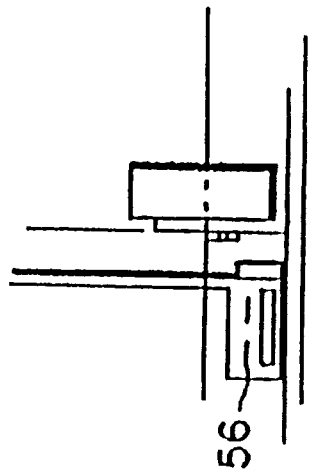

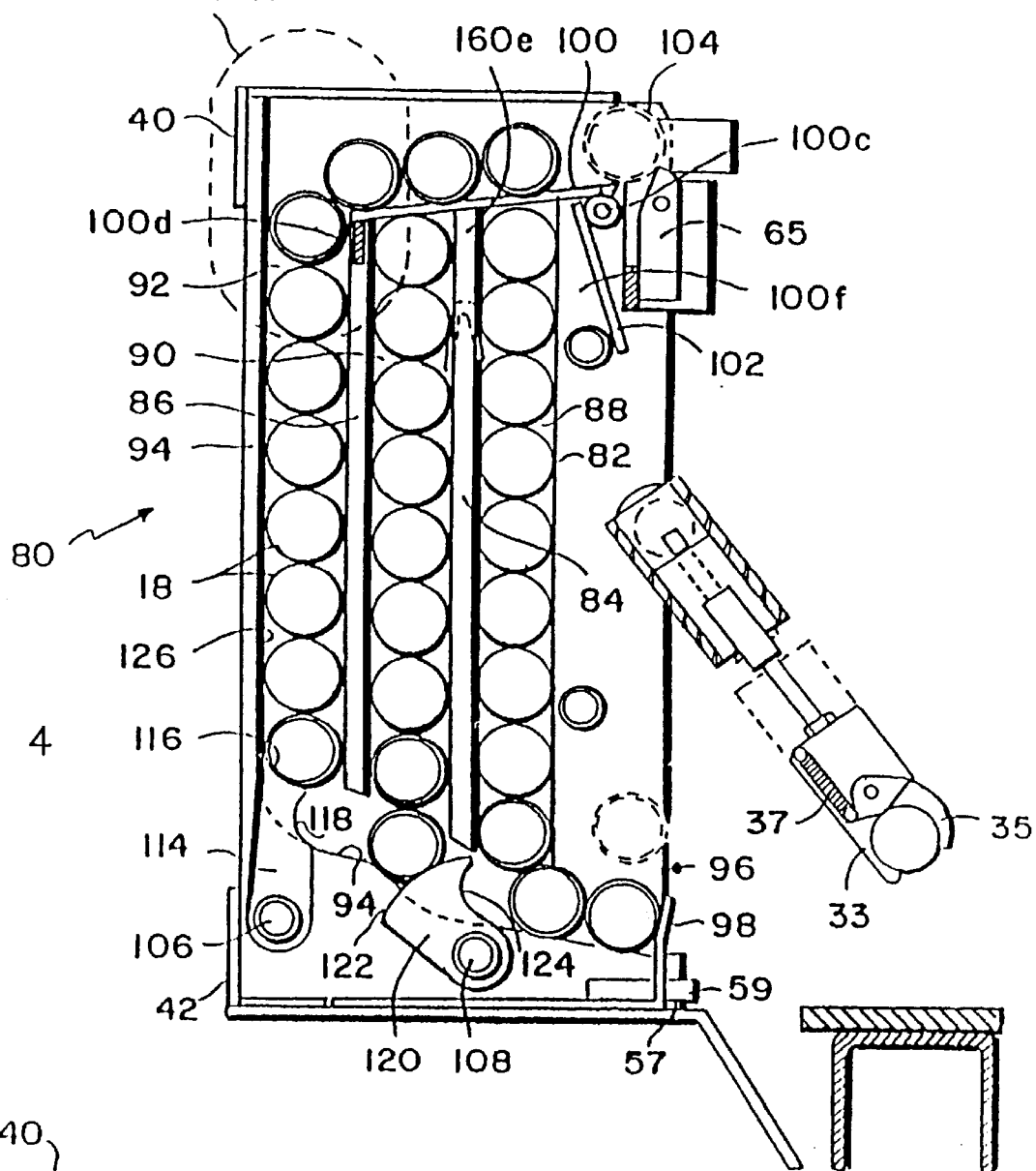
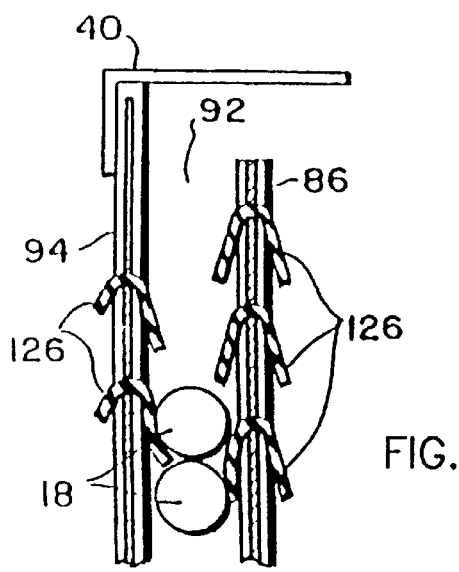
FIG. 4
FIG. 4A
FIG. 5

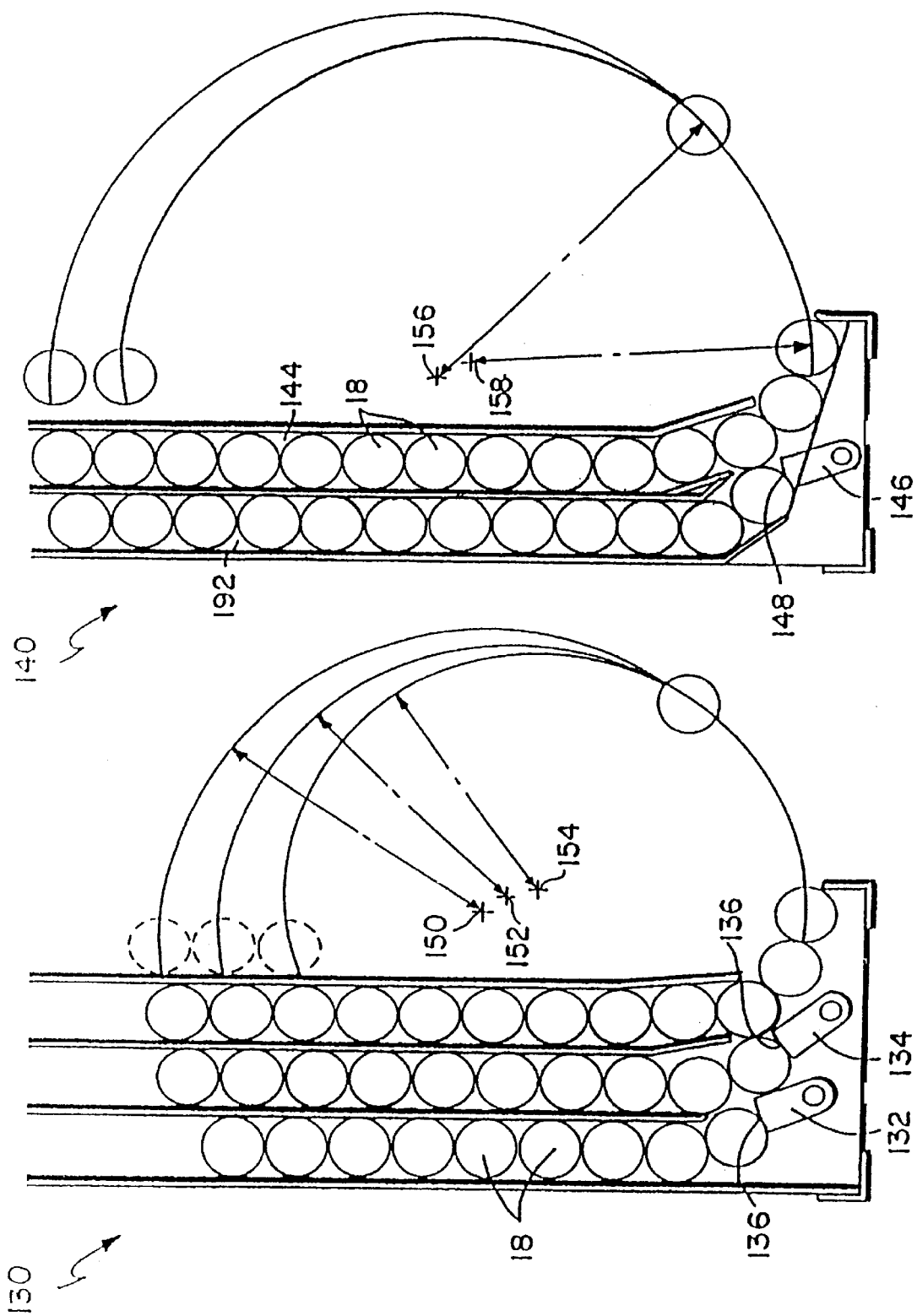

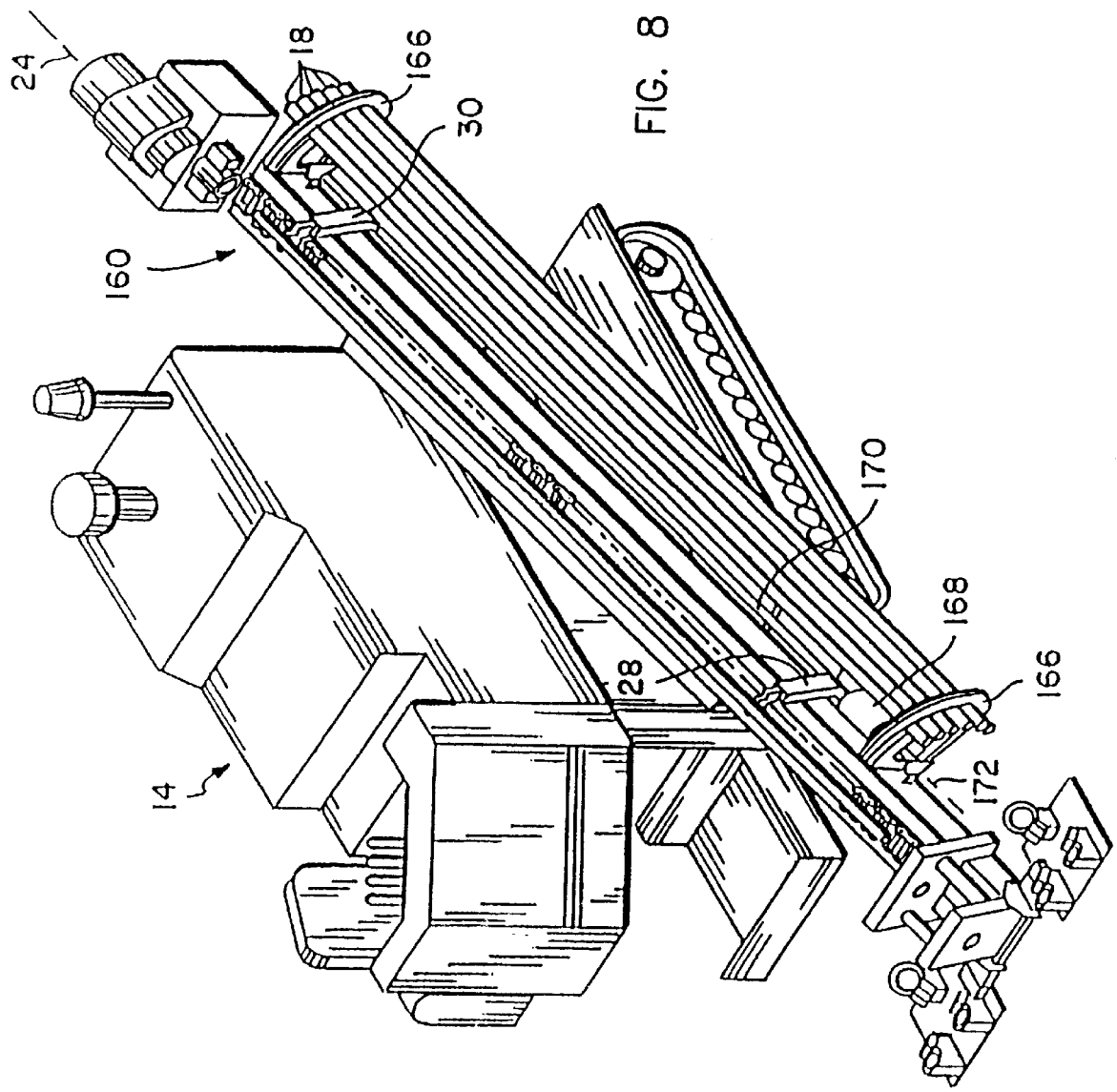

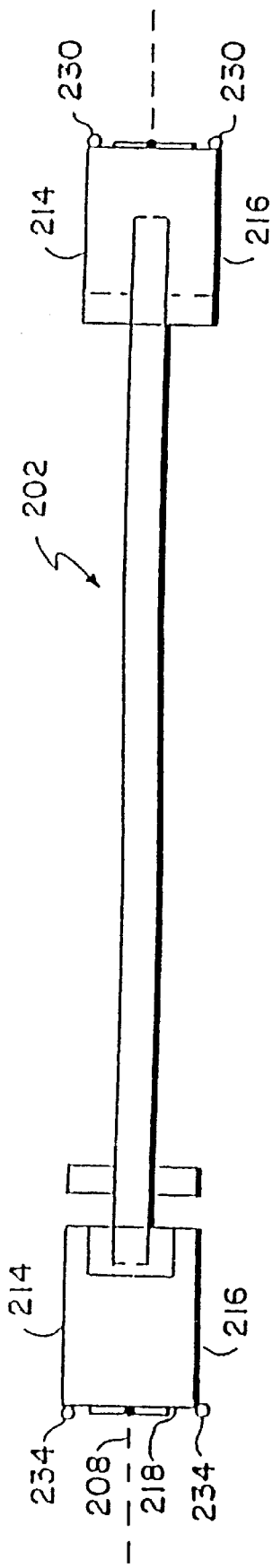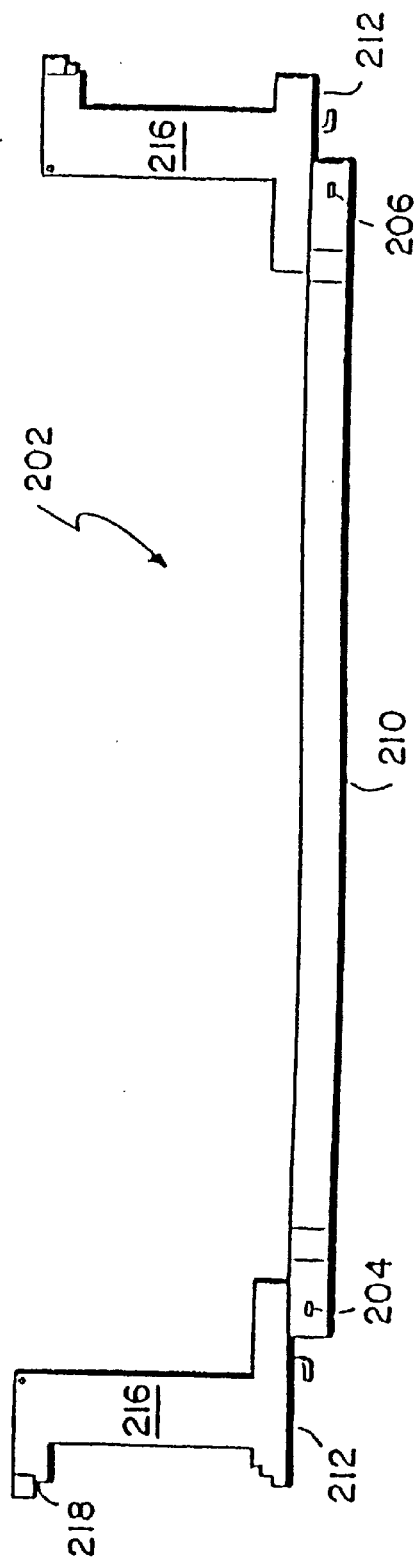
FIG. 15
FIG. 16

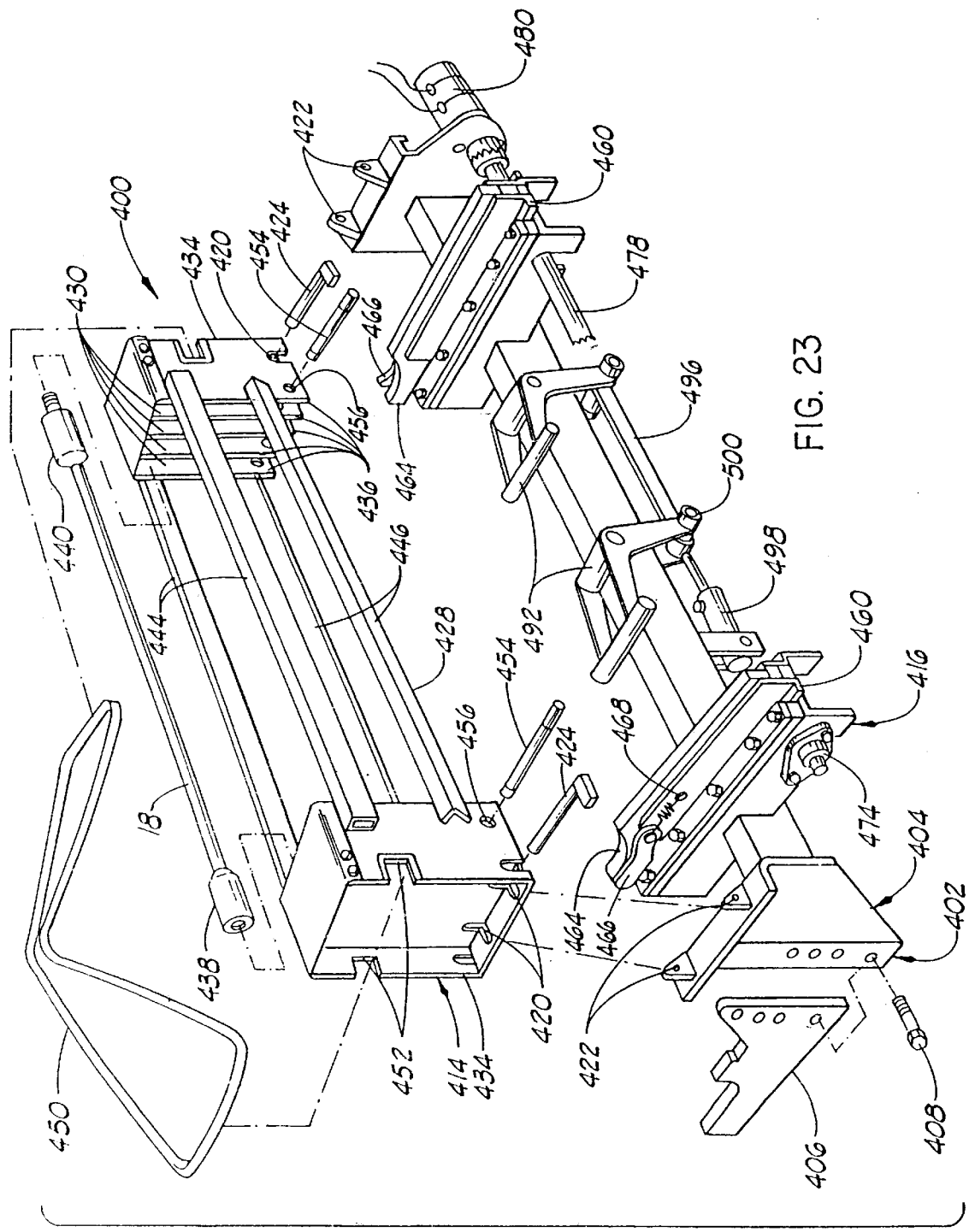

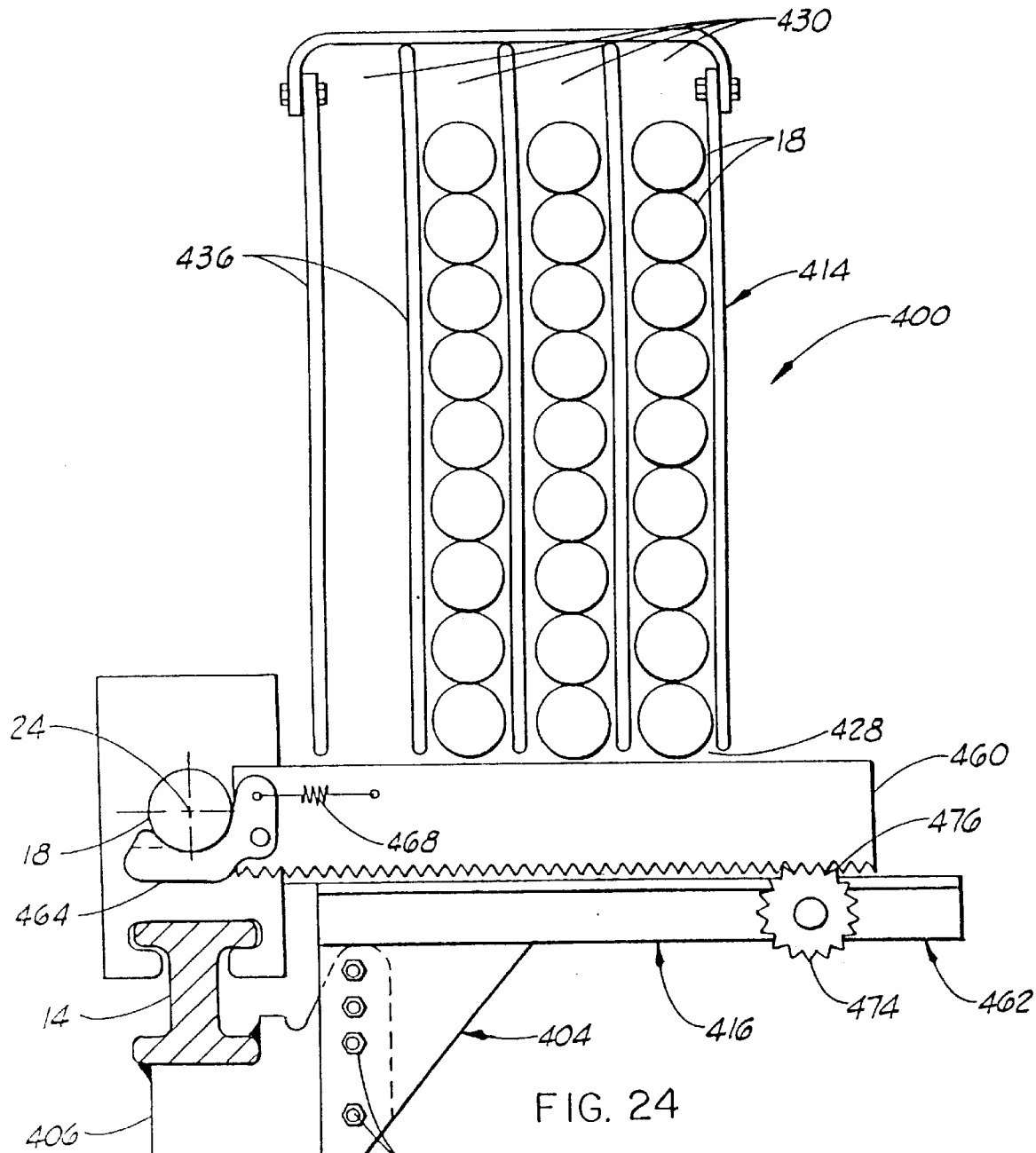
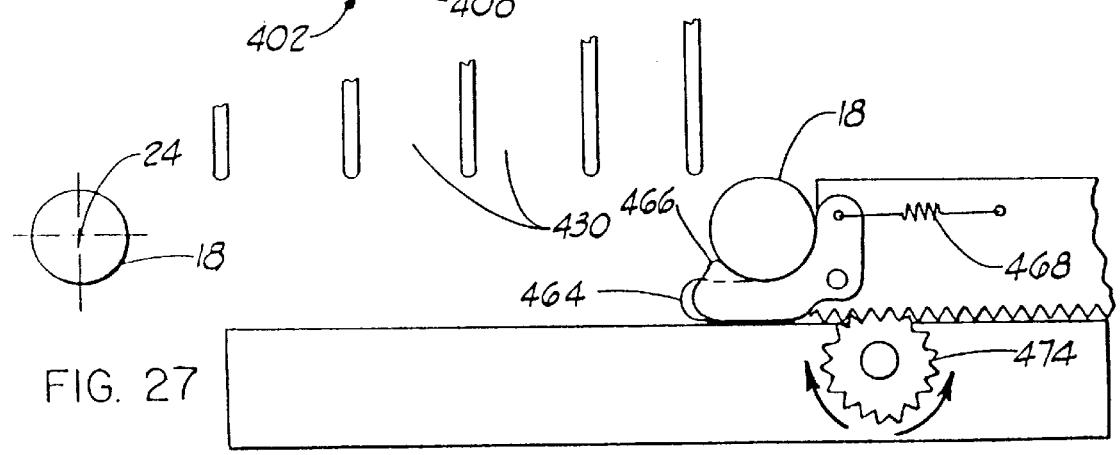

PIPE HANDLING DEVICE

CROSS REFERENCE TO RELATED APPLICATION

This application is a continuation-in-part of patent application Ser. No. 08/532,354 filed on Sep. 22, 1995, now abandoned, which was a continuation-in-part of application Ser. No. 08/392,072 filed on Feb. 22, 1995, now abandoned, and the entire/contents of both of these applications are incorporated herein by reference.

FIELD OF THE INVENTION

This invention relates to the handling of pipe for a horizontal boring device or other machine using or requiring the receipt of pipe in a generally horizontal position.

SUMMARY OF THE INVENTION

The present invention is directed to a pipe handling device for storing and transporting pipe sections to and from a horizontal boring machine, the horizontal boring machine comprising a spindle for connecting a drill string to the horizontal boring machine. The pipe handling device comprises a magazine and a pipe handling assembly. The magazine is adapted to store a plurality of pipe sections near the horizontal boring machine. The pipe handling assembly is adapted to transport at least one pipe section between the magazine and the horizontal boring machine. The magazine further is adapted to passively position the plurality of pipe sections in the magazine for transport to the horizontal boring machine.

The present invention is further directed to a horizontal boring machine comprising a spindle for connecting a drill string to the horizontal boring machine and further comprising a pipe handling device. The pipe handling device stores and transports pipe sections to and from the horizontal boring machine and comprises a magazine and a pipe handling assembly. The magazine is adapted to store a plurality of pipe sections near the horizontal boring machine. The pipe handling assembly is adapted to transport at least one pipe section between the magazine and the horizontal boring machine. The magazine further is adapted to passively position the plurality of pipe sections in the magazine for transport to the horizontal boring machine.

Finally, the present invention is directed to a machine requiring receipt of elongate objects in a generally horizontal position. The machine comprises a handling device for storing and transporting elongate objects to and from the machine. The handling device comprises a magazine and a handling assembly. The magazine is adapted to store a plurality of elongate objects near the machine. The handling assembly is adapted to transport at least one elongate object between the magazine and the machine. The magazine further is adapted to passively position the plurality of elongate objects in the magazine for transport to the machine.

BRIEF DESCRIPTION OF THE DRAWINGS

For a more complete understanding of the present invention and for further advantages thereof, reference is now made to the following description of the preferred embodiments, taken in conjunction with the accompanying drawings.

FIG. 2 is a partial cross-sectional view of taken along view A in FIG. 1.

FIG. 3 is a perspective view of a modified pipe rack for use with the device.

FIG. 4 is a side elevational view in cross-section of the pipe rack of FIG. 3.

FIG. 5 is a detail view of the rack of FIG. 4 illustrating the rubber straps cushioning the pipe section movement.

FIG. 6 is a partial cross-sectional view of the pipe rack of FIG. 3.

FIG. 7 is a partial cross-sectional view of a modification of the pipe rack of FIG. 3.

FIG. 8 is a perspective view illustrating another modification of the automatic pipe handling device.

FIG. 15 is a plan view of the pipe box used in the device.

FIG. 16 is a side view of the pipe box.

FIG. 23 is an exploded perspective view of another preferred embodiment of the pipe handling device of the present invention.

FIG. 24 is a partly cross-sectional end view of the magazine and pipe handling assembly of FIG. 23.

FIG. 27 is a fragmented, end elevational view of the pipe handling device of FIG. 23 in the auxiliary load position.

DETAILED DESCRIPTION OF THE PREFERRED EMBODIMENTS

In recent years, many utility lines have been laid or replaced by use of a horizontal boring machine which eliminates the need to dig a trench from the surface to install or replace the utility. This technique has generally come to be known as trenchless technology.

In a typical horizontal boring machine, a bore hole is formed with a steerable bit. The boring machine is mounted at the surface. One hydraulic motor on the boring machine causes the drill bit and drill string to rotate while another thrusts the drill bit and drill string forward as the bore is formed. It is also common to backream the bore with the machine, rotating a backreaming tool while drawing back the drill string to the boring machine.

The drill string is formed of a plurality of individual drill string sections threaded together. As the machine initially bores the hole, additional drill string sections must be added or "made up" as the bore is lengthened. Similarly, when backreaming the bore, the individual drill string sections must be removed or "broken out". Traditionally, making up and breaking out drill string sections has been done by hand, with the assistance of wrenches on the drilling machine. There has also been a requirement to store the individual drill string sections before and after use.

The typical horizontal boring device requires a three member crew. To increase efficiency and reduce cost, it would be of great benefit to provide an automated system for making and breaking drill pipe sections automatically during operation. Ideally, this would eliminate the need for a third person in the operation and permit the boring machine to be operated with a crew of two. In addition to an increase in efficiency and reduction of cost, eliminating the use of an individual to manhandle the drill pipe sections would reduce the chances for injury.

Figure 1:
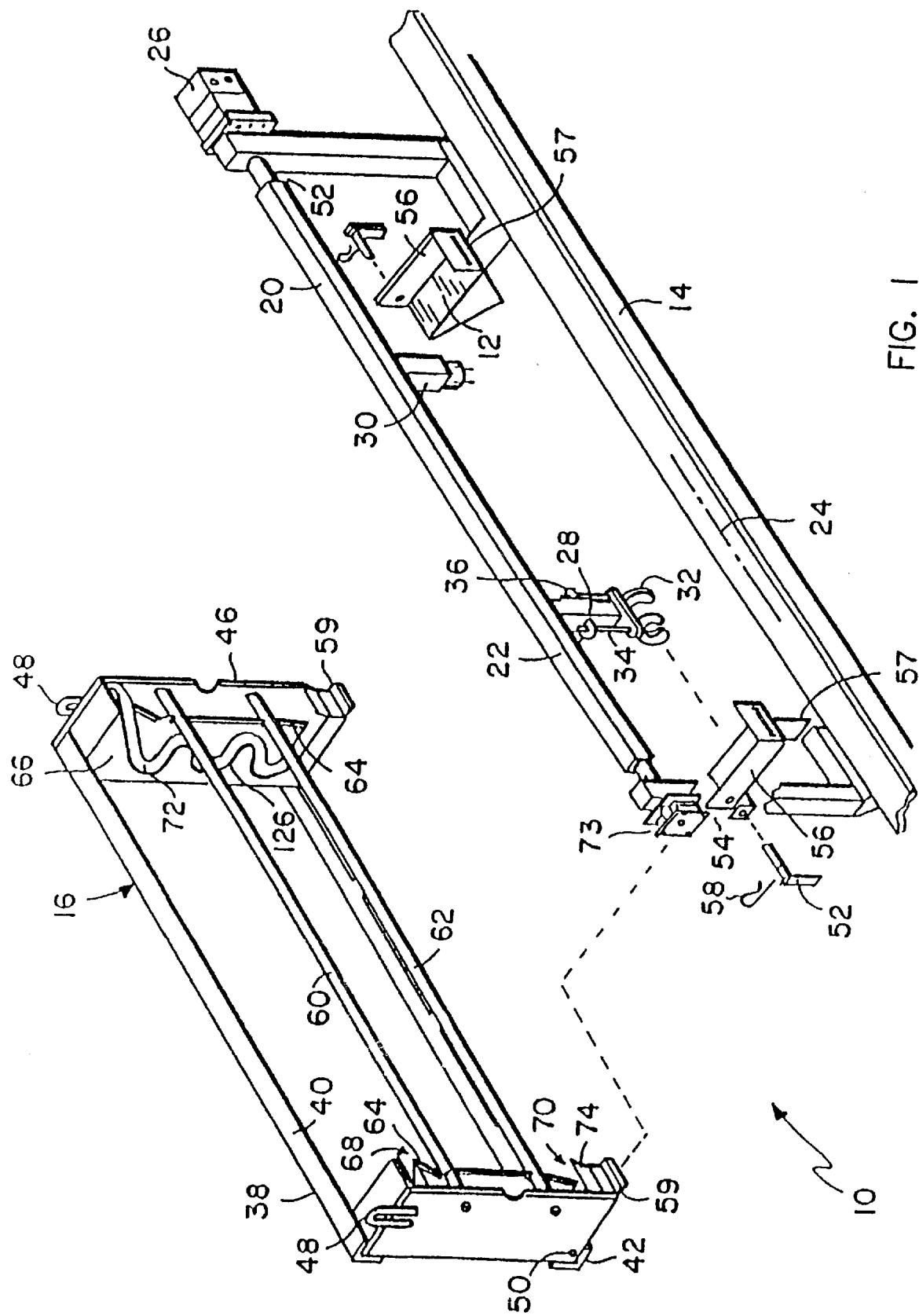
FIG. 1 is a perspective view of an automatic pipe handling device forming a first embodiment of the present invention.

The Embodiment of FIGS. 1 and 2

With reference now to FIGS. 1 and 2, an automatic pipe handling device 10 is illustrated which forms a first embodiment of the present invention. The device includes a support frame 12 which is permanently attached to the drill rig 14. The drill rig 14 is not illustrated in its entirety as it is a conventional and well known device. A pipe rack 16 is removably attached to the support frame 12 to store pipe sections 18 (see FIGS. 4, 5 and 6) when not in use by the drill rig.

The support frame 12 mounts a longitudinal shaft 20 which is mounted for rotation about an axis 22 which is parallel to the spindle axis 24 of the drill rig 14. The spindle axis 24 is the axis along which the drill string extends and is the axis of rotation of the drill string at the drill rig. To insert a pipe section 18 within the drill string, or remove the pipe section, the pipe section must be laid along the spindle axis 24 or removed from the spindle axis 24.

The longitudinal shaft 20 is rotatable by a hydraulic drive motor 26. Two hydraulic cylinders 28 and 30 are mounted along the length of the shaft 20 and are mounted perpendicular to the axis 22. At the end of the piston of each of the cylinders 28 and 30 is mounted a spring loaded pipe gripper 32. Grippers 32 include fixed fingers 33 and spring loaded fingers 35 urged to grip the pipe section by springs 37. The grippers 32 include guide shafts 34 which slide within brackets 36 mounted on the cylinders 28 and 30 so that the movement of the pipe grippers is only along an axis 31 perpendicular to the axis 22.

The pipe rack 16 is formed of a frame weldment 38 including an upper bracket 40, a lower bracket 42 and side plates 44 and 46. Bars 60 and 62 extend between the side plates as well. Each side plate mounts a lifting eye 48 and is provided with aperture 50 to attach the pipe rack 16 to the support frame 12. An elongated aperture 57, located on bracket 56 of support frame 12, engages tab 59 located on the base of pipe rack 16 as the pipe rack is loaded onto support frame 12. Pins 52 are inserted through apertures 54 in brackets 56 on the support frame 12 and through the apertures 50 in the side plates 44 and 46. The pins 52 have a through hole to receive a locking clip 58 to secure the pipe rack on the support frame despite vibration or movement of the boring machine. However, the pipe rack 16 can be relatively easily removed from the support frame 12 by removing the pins and lifting the pipe rack off the frame.

Near each end plate of the pipe rack is mounted a labyrinth track 64 which cooperates with a guide 66 mounted on the inside surfaces of the side plates 44 and 46 to form an S-curve path 72 to guide drill pipe within the pipe rack from a return position 68 formed at the top of the pipe rack to a pick up position 70 formed at the bottom of the pipe rack. Attached to each end plate is a guide strip made from a low friction plastic such as UHMW (Ultra High Molecular Weight) plastic, to permit the use of shoulderless pipe in the pipe rack.

Assuming that pipe sections are to be added to the drill string and are presently stored in the pipe rack 16, the pipe rack will first be attached to the support frame 12. The drive motor 26 will then be activated to cause the longitudinal shaft 20 to pivot so that the spring loaded pipe grippers 32 are facing the pipe section at the pick up position 70. The hydraulic cylinders 28 and 30 are activated to extend the pistons thereof so that the pipe grippers 32 move against and over the pipe at the pick up position. The hydraulic cylinders 28 and 30 are then retracted, drawing the pipe section from the pick up position and out of the pipe rack. The hydraulic drive motor 26 is then again activated to pivot the longitudinal shaft 20 until the pipe grippers 32 are directed toward the spindle axis 24. The hydraulic cylinders 28 and 30 are again activated to extend the pipe grippers to position the pipe section along the spindle axis 24. The mechanisms of the horizontal boring machine, not shown, then thread the pipe section into the drill string. After the pipe section is threaded, the cylinders 28 and 30 are retracted, pulling the pipe grippers 32 off the pipe section just inserted in the drill string.

If a plurality of pipe sections are stored in the pipe rack 16, when the pipe section in the pick up position 70 is removed by the pipe grippers, the remaining pipe sections 18 in the pipe rack, guided by the S-curve path 72 formed between the labyrinth track 64 and guides 66 at each end of the pipe rack, will move via gravity to urge the next pipe section in line into the pick up position 70. In tits manner, each of the pipe sections in the pipe rack 16 can be removed individually from the pipe rack and positioned on the spindle axis 24 to be made up as part of the drill string. Block plates 74 on each of the side plates prevent the pipe section in the pick up position 70 from simply falling out of the pipe rack.

When the boring has been completed, and pipe sections are to be removed from the drill string, the device works essentially in reverse. The longitudinal shaft 20 will be pivoted by hydraulic drive motor 26 to grasp a pipe section 18 on the spindle axis 24. However, instead of being pivoted to the pick up position 70, the longitudinal shaft 20 is rotated by hydraulic drive motor 26 so that the pipe grippers 32 face the return position 68. The hydraulic cylinders 28 and 30 are then extended to move the pipe section 18 into the return position 68. The shaft 20 will then be rotated slightly to move the pipe section inside a portion of the tracks 64 so that when the hydraulic cylinders 28 and 30 are retracted, the pipe section will be held in place by the track plus the end guides 64 and the pipe grippers 32 will be removed from the pipe section.

Alternatively, a reverse stop 65 (see FIG. 4) can be mounted on the pipe rack which pivots out of the way to allow the pipe section to be inserted in the return position but then pivots back by gravity to block the pipe section from falling out of the pipe rack. Once removed, the pipe section will fall by gravity along the S-curve path 72 between the tracks 64 and guides 66 until it contacts the next previous pipe section inserted into the pipe rack. As pipe sections are removed from the drill string, these steps can be repeated until the pipe rack is completely full of pipe sections and ready to be used again to form another bore. If the drill string contains more pipe sections than pipe rack 16 can hold, the full rack is simply removed and replaced by an empty rack to continue the process.

If heavier pipe sections are used, the spring loaded pipe grippers 32 can be replaced by pipe grippers actuated by hydraulic cylinders.

A detent device 73 on one end of the shaft 20 can assist in indexing the shaft in the positions described above.

The use of the S-curve path and the end guides permit straight, shouldered, bottlenecked, shoulderless or any other style of pipe sections to be used. A number of rubber straps 126 can be mounted within the pipe rack 16 to slow the fall of pipe sections within the rack as seen in FIG. 5.

The sequence of operations of the device illustrated in FIGS. 1 and 2 would be for the load sequence to move pipe sections from the rack to the drill string:

1. extend grippers toward pick up position of rack;
2. grip pipe section in pick up position;
3. retract grippers to remove gripped pipe section from pick up position;
4. rotate grippers with pipe section toward spindle axis and extend grippers;
5. retract grippers to release grippers from pipe section;
6. rotate to pick up position; and
7. extend grippers to next pipe section.

The unload sequence moving pipe sections from the drill string to storage in the rack would be as follows:

1. rotate grippers to spindle center line;
2. extend grippers to grip pipe section to be removed from drill string;
3. rotate grippers and removed pipe section to the return position; and
4. retract grippers from pipe section in return position of rack.

The pipe section will then fall by gravity to the pick up position through the S-curve path.

The Embodiments of FIGS. 3–5

With reference now to FIGS. 3 and 4, a modified pipe rack 80 will be described. The pipe rack 80 includes a number of elements identical to the pipe rack 16 (FIGS. 1 & 2), including brackets 40 and 42, side plates 44 and 46, lifting eyes 48, apertures 50 and bars 60 and 62. It will be clear from this that pipe rack 80 can be mounted directly on the support frame 12 as a replacement for or substitute for the pipe rack 16, and pipe racks 16 and 80 are completely interchangeable.

Pipe rack 80 has an outer track 82, an intermediate track 84 and an inner track 86 mounted on the inside of each of the side plates 44 and 46. The pipe rack 80 defines a return position 104 and pick up position 96. A first vertical row 88 is formed between track 82 and track 84. A second vertical row 90 is formed between the intermediate track 84 and the inner track 86. A third vertical row 92 is formed between the inner track 86 and a guide 94 extending from the upper bracket 40 downward toward the lower bracket 42 and then forward to the pick up position 96 at the bottom front of the pipe rack. Block plates 98 are mounted on the plates to prevent pipe sections in the pipe rack from falling out because of gravity.

Manual upper row selectors 100 and 102 (seen in FIG. 4) can be positioned to select which row a pipe section will enter after being placed in the return position 104. The manual upper row selectors 100 and 102 are located at each end of the pipe rack 80 at a pivot point 100c. Selector 100 selects the third vertical row 92 and rests, when in the receiving position (as seen in FIG. 4), on stop 100d. Selector 102 selects the second vertical row 90 and rests on stop 100e. The first vertical row 88 is selected by rotation of both manual upper row selectors 100 and 102 about pivot points 100c and into a position as shown at 100f (where selector 102 is shown in FIG. 4). The top of the rack is open at the position of selectors 100 and 102 so that, for example, selector 100, seen in FIG. 4 in the receiving position, can be pivoted clockwise about pivot 100c into position 100f beside the position of upper row selector 102 seen in FIG. 4. Both of the selectors 100 or 102 at each end of the pipe rack must be selected in order for the pipe to enter the desired vertical row. If selector 100 is selected at one end of the pipe rack and selector 102 is selected at the opposite end, the pipe will attempt to enter the second vertical row 90 and the third vertical row 92 simultaneously and become jammed. Preferably, as pipe sections are returned, the third row 92 will be filled up first, next the second row 90 and finally the first row 88.

Near the bottom of the pipe rack 80 are mounted gate rods 106 and 108 which extend the entire length of the pipe rack and are supported by the side plates for limited pivotal motion. Handles 110 and 112 (seen in FIG. 3) are mounted on gate rods 106 and 108, respectively, to permit manual pivotal motion of the rods. Mounted along gate rod 106 are a pair of gates 114. In the position shown in FIG. 4, the gates 114 prevent pipe sections from moving out of the third row 92 into the pick up position 96. Gates 114 can be seen to have an arcuate end 116 to engage the lowermost pipe section in the third row. When the pipe sections in the third row 92 are to be used, the handle 110 is manually moved to pivot rod 106 so that the gates 114 move in a direction away from the block plates 98 (counter-clockwise in FIG. 4), permitting the pipe sections in the third row to fall onto the guide 94 for movement into the pick up position 96 by gravity. Gates 114 can be seen to have an arcuate side 118 which assists the movement of the pipe sections to the pick up position.

Gate rod 108 similarly supports a pair of gates 120 which can be used to prevent pipe sections from the second row from moving into the pick up position 96. Gates 120 have a convex surface 122 which engages the pipe sections in either the second row or those pipe sections permitted to pass gates 114 from the third row to prevent the pipe sections from moving into the pick up position. However, if pipe sections from the second or third rows are to be permitted to move to the pick up position, the handle 112 can be moved to pivot the rod 108 away from the block plates 98 (counterclockwise in FIG. 4) to move convex surfaces 122 out of engagement with the pipe sections. Gates 120 have arcuate sides 124 to facilitate movement of the pipe sections by gravity into the pick up position.

Either handle 110 or 112 can be manipulated to stop supply of pipe sections from the second or third rows even before the rows have been emptied by moving the respective gate at least part way back to the blocking position until the pipe sections between the gates and the pick up position have been moved out of the pipe rack and then moving the gates to the final blocking position, as seen in FIG. 4.

A number of rubber straps 126, as seen in FIGS. 4 and 5, can be mounted within the pipe rack 80 to slow the fall of pipe sections within the rows to prevent pipe damage.

The pipe rack 80 has the same volume of space as the pipe rack 16 but will carry a greater number of pipe sections. In operation, pipe sections are delivered to the return position 104 and directed by the manually positioned selectors 100 and 102 to one of the three vertical rows 88, 90, and 92. Gravity propels the pipe section to the bottom of the row. When removing pipe from the rack, the selection of a particular row to be used is accomplished by the manual rotation of the handles 110 and 112 as noted. The first row 88 connects directly with the pick up position 96 and has no gates associated therewith. After the pipe sections in the first row 88 are used, it is preferable to move handle 112 to permit the pipe sections in the second row 90 to next be used. Finally, the handle 110 is activated to allow the pipe sections in the third row 92 to be used. When all rows are emptied, the emptied pipe rack 80 can be off loaded from the support frame 12 and a full rack installed. The process is reversed when performing a backreaming or pullback function.

The Embodiments of FIGS. 6–7

FIG. 6 is a cross-sectional view of a pipe rack 130 which is a modification of pipe rack 80. Pipe rack 130 is identical with pipe rack 80 with the exception of the use of gates 132 and 134 which each have convex ends 136 to engage the pipe sections in the second and third rows to prevent them from moving to the pick up position.

FIG. 7 is a cross-sectional view of a pipe rack 140 which is a modification of pipe rack 80. In pipe rack 140, only two rows, rows 142 and 144 are used. This requires the use of only a single pair of gates 146 with convex ends 148.

FIGS. 6 and 7 permit the location of the positioning and gripper location in a new position or several different positions 150, 152, 154 in the case of FIG. 6 and 156 and 158 in the case of FIG. 7 to permit the loading and carrying of a greater number or quantity of drill pipe.

For the embodiment shown in FIGS. 3–7, the loading sequence to load pipe sections from the rack to the drill string would be as follows:

1. extend gripper to pick up position in rack;
2. pick up pipe section in pick up position;
3. retract grippers and gripped pipe section;
4. rotate grippers and gripped pipe section to spindle center line;
5. retract grippers after pipe section is threaded into drill string; and
6. rotate grippers to pick up position to pick up next pipe section.

To remove pipe from the drill string and return it to the rack the unloading sequence would be:

1. rotate grippers to spindle center line;
2. extend grippers to grip pipe section to be removed from drill string;
3. rotate grippers and gripped pipe section to return position in rack; and
4. retract gripper from pipe section.

The pipe sections will fall by gravity to the pick up position through the vertical rows.

Figure 9:
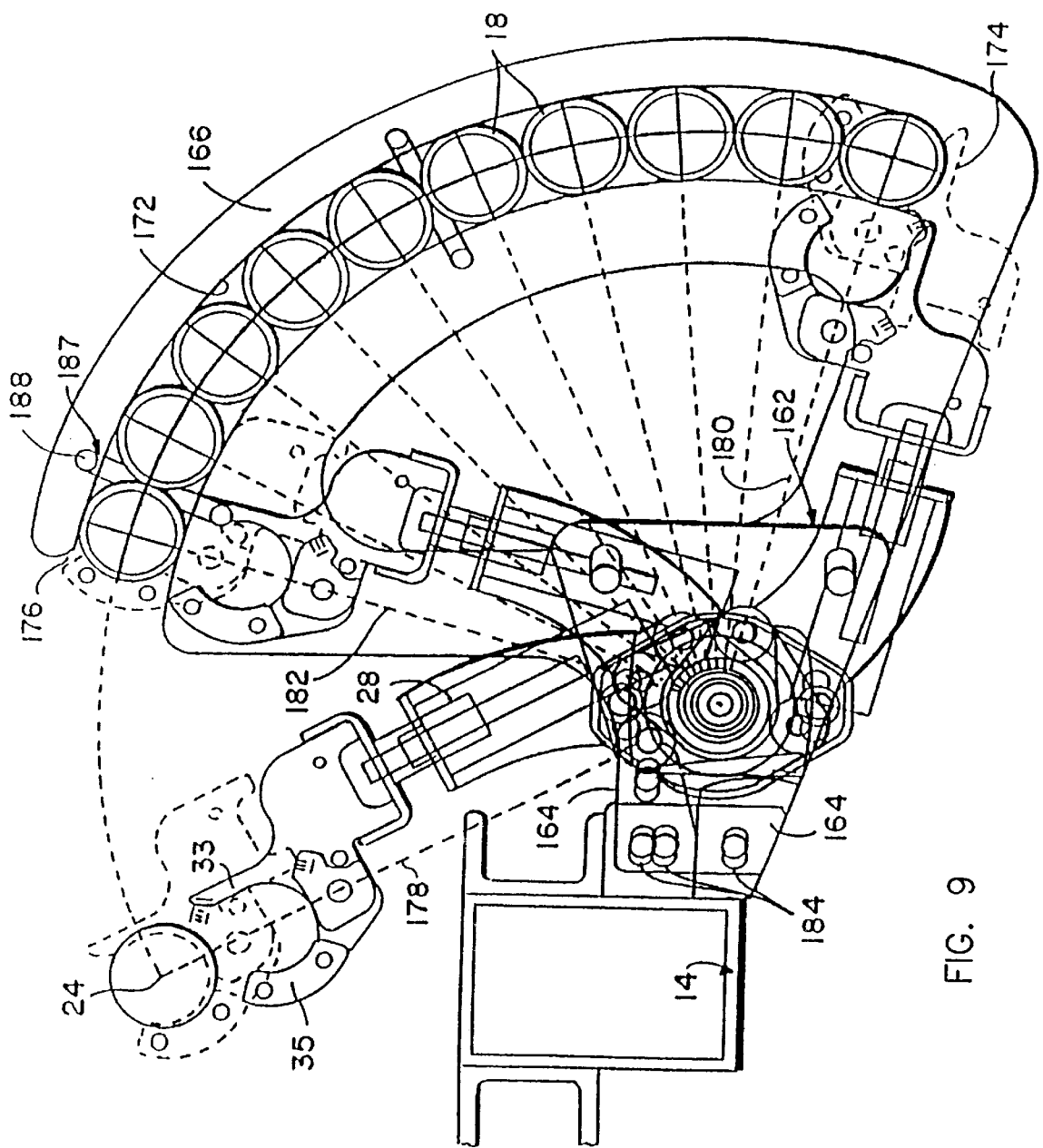
FIG. 9 is an end view of the device of FIG. 8.
Figure 10:
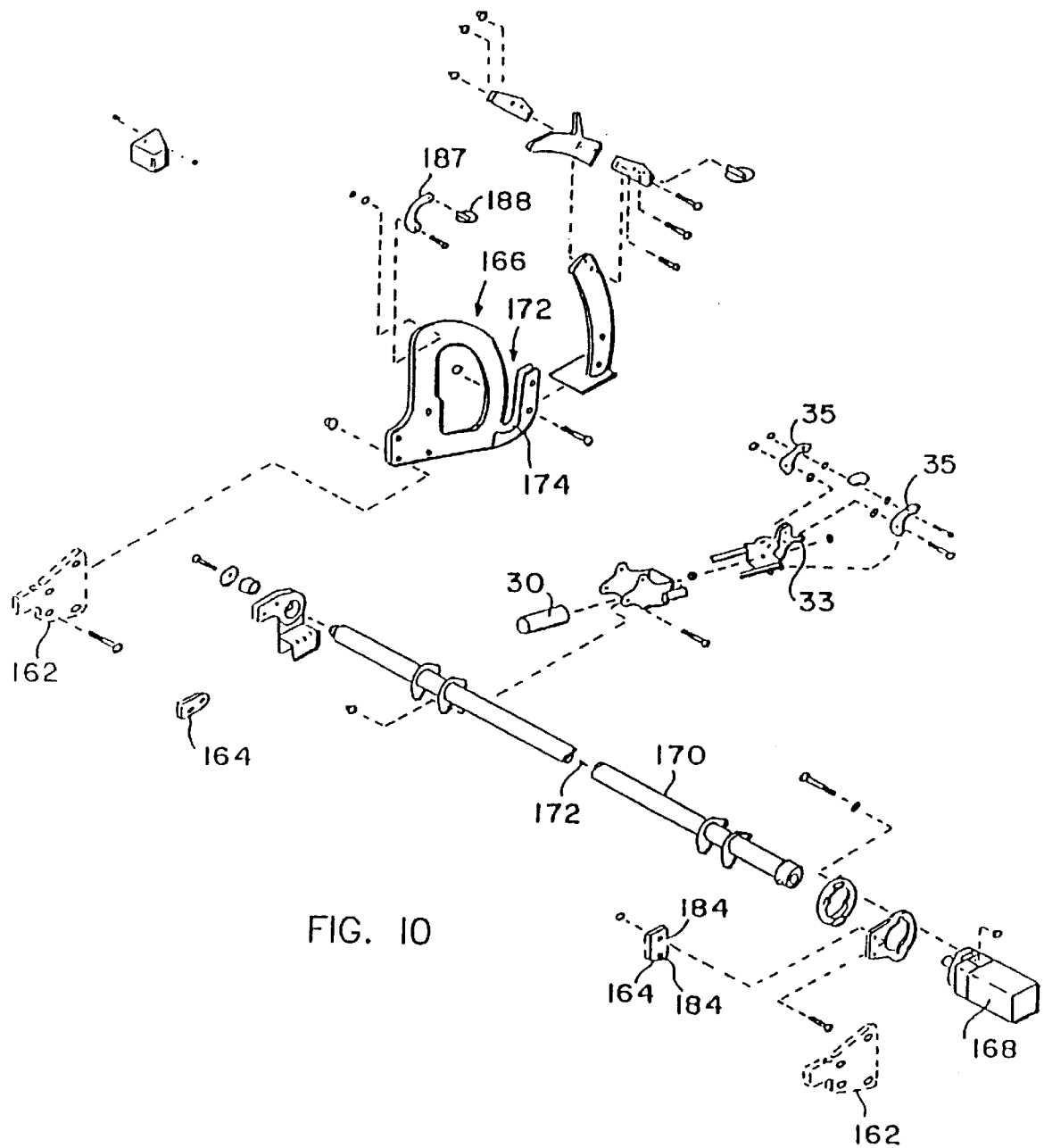
FIG. 10 is an exploded view of a portion of the device of FIG. 8.

The Embodiments of FIGS. 8–10

With reference now to FIGS. 8 and 9, an automatic pipe handling device 160 forming a second embodiment of the present invention is illustrated. The device 160 is mounted on drill rig 14 by bolting to a pair of brackets 162 on the drill rig frame. Plates 162, in turn, mount pipe rack brackets 166. A hydraulic motor 168 is bolted to the drill rig and rotates a longitudinal shaft 170 about an axis 172 which is parallel to the spindle axis 24. Mounted along the longitudinal shaft 170 are a pair of hydraulic cylinders 28 and 30 as used in device 10, including spring loaded pipe grippers with fixed fingers 33 and spring loaded fingers 35.

Each of the pipe rack brackets 166 can be seen to define an arcuate path 172 with a closed lower end 174 and an open upper end 176. The arcuate path 172 and the pipe rack brackets 166 combine to form a curved row to receive and store pipe sections 18. In the particular case illustrated in FIGS. 8, 9 and 10, the pipe rack is capable of storing ten pipe sections.

As will be apparent from FIG. 8, the hydraulic motor 168 is capable of pivoting the longitudinal shaft 170 to position the spring loaded pipe grippers at any selected position along an arc extending from a first position 178 for installing and retrieving pipe sections from the spindle axis 24 to a final position 180 where the pipe grippers are positioned to pick up the very last pipe section in the pipe rack.

With reference to FIG. 8, if the operator begins with a full rack of pipe sections, the cylinders 28 and 30 are activated to retract the pipe grippers and the hydraulic motor 168 pivots the longitudinal shaft to position the pipe grippers in the pick up position 182 adjacent the first pipe section in the pipe rack. The cylinders 28 and 30 are then activated to extend the pipe grippers to grip the first pipe section in the pipe rack. The hydraulic motor 168 is then activated to pivot the longitudinal shaft 170 and pivot the pipe grippers and gripped pipe section into the first position 178, where the pipe section will be centered on the spindle axis 24 to be threaded into the drill string. Once threaded into the drill string, the cylinders 28 and 30 can be activated to retract the pipe grippers away from the pipe section. The hydraulic motor is then activated to pivot the longitudinal shaft 170 to position the pipe grippers adjacent the next pipe in the pipe rack. The pipe grippers will then be extended by cylinders 28 and 30 to grasp the next pipe and hydraulic motor 168 will be activated to move that pipe section into alignment with the spindle axis 24. As can be understood, the device will operate to remove each pipe section in sequence held on the pipe rack until the final pipe section at the final position 180 is delivered for insertion in the drill string.

As the drill string is being disassembled, the operation of the device 160 is simply reversed. The pipe grippers will grip the first section of pipe at the spindle axis 24 and can move it to the next open position along arcuate path 172 on pipe rack brackets 166 for storage before retracting the cylinders 28 and 30 to move the pipe grippers out of engagement with the pipe section. The operation will continue until all the pipe sections have been replaced in the pipe rack.

The loading sequence of operation for the device illustrated in FIGS. 8–9 will be for putting pipe sections in the drill string:

1. extend grippers to top most pipe section in rack;
2. pick up top most pipe section in rack;

3. rotate grippers and gripped pipe section to spindle center line to install in drill string;

4. retract grippers; and 5. rotate grippers to next top most pipe section in rack and repeat above sequence.

To remove pipe sections from the drill string and return them to the rack the unloading sequence would be:

1. rotate grippers to spindle center line;

2. extend grippers to grip pipe section in drill string to be removed;

3. rotate grippers and gripped pipe section to deposit the pipe section on top of the top most pipe section already in the rack, or the bottom of the path 172 if this is the first pipe section being returned;

4. retract grippers; and 5. rotate grippers to spindle center line to pick up next pipe section to be removed from the drill string.

With this device, the pipe sections are not dropped by gravity but are placed on top of the previously positioned pipe section or, if the first pipe section in the rack, at the bottom of the path 172.

It will be appreciated that the adjustment plates 164 have elongated bolt holes 184 which will permit some adjustment of the position of the pipe rack brackets 166 relative to the drill rig 14 and the spindle axis 24. As seen in FIGS. 9 and 10, a stow lock 187 is pivotally mounted on each of the pipe rack brackets and can be pivoted over the open upper end 176 of each bracket and pinned in that position by pins 188. This will prevent inadvertent removal of the pipe sections during transport of the drill rig.

The hydraulic motor 168 does not specifically index the pipe grippers to any pick up position or return position. The pipe sections are, however, picked up from the top of the pipe rack brackets near the open upper end 176 to the bottom of the pipe rack brackets near the closed lower ends 174 in sequence and are returned in opposite order. It is preferable to move the pipe section along the arcuate path 172 and into contact with the next adjacent pipe section in the rack before removing the grippers to avoid allowing the pipe sections to fall by gravity along the arcuate path.

The device of the present invention can be operated by a single individual with only two controls. The first control will operate the hydraulic drive motor 26 or 168 and the second control will operate the hydraulic cylinders 28 and 30 to grab the pipe sections with the pipe grippers 32. The device therefore permits the operator to automatically move drill pipe from the pipe rack carried on the boring device to the spindle center line as the drilling progresses. After completion of the pilot bore and while backreaming and pulling back services, the device will automatically unload the drill pipe from the spindle center line and return the drill pipe to the pipe rack. By designing the pipe racks to be readily installable on and removable from the support frame 12, as many pipe sections as required can be quickly provided. This design permits the number of people in an operating crew for the boring machine to be reduced from three to two.

The device also improves the function, productivity and safety of the drill rigs used by the guided boring industry. The operator, by moving two hydraulic valve levers, has complete control of the pipe loading and unloading operation. The device is easily understood and easy to operate. The operator can remain at the console to operate the device. The smoothness of the operation pernits the operator to load and unload drill pipe at the spindle very efficiently. This improved smoothness and efficiency results in less time spent adding to and removing drill pipe from the drill string, thus reducing time spent on the job. The mechanical device removes the need for another person on the crew to remove drill pipe from a pipe box and load or unload at the spindle. The safety aspects of the device remove the possibility of injury by eliminating the need to lift and load the drill pipe by hand and eliminating the need for an additional crew member to lift and load the drill pipe.

The Embodiments of FIGS. 11–22

Figure 17:
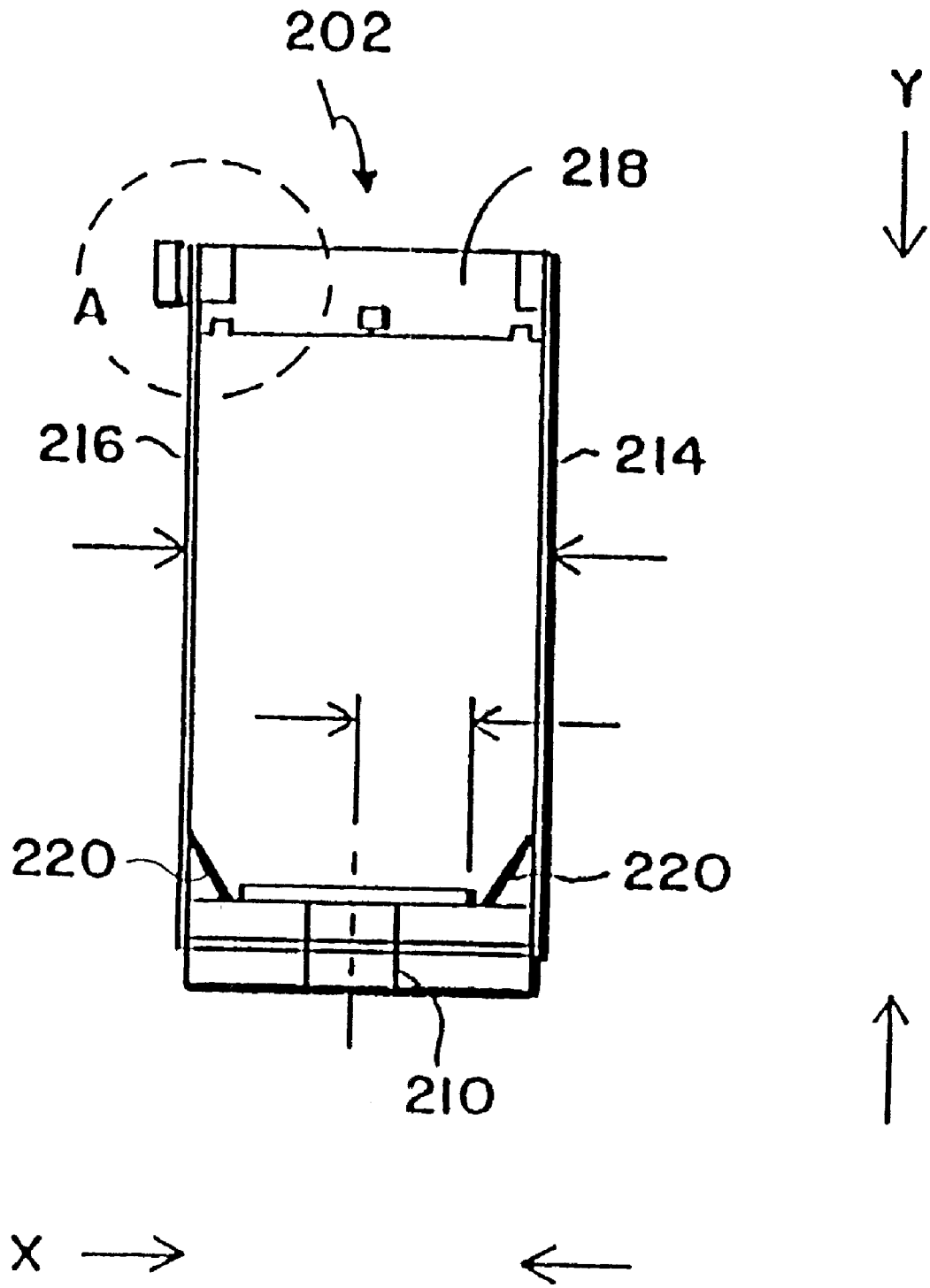
FIG. 17 is an end view of the pipe box.

With reference now to FIGS. 11–22, a pipe handling device 200 forming another embodiment of the present invention is illustrated. With reference to FIGS. 15–17, the device includes a pipe box 202 for storage of pipe sections 18. Pipe box 202 is mounted to the drill rig 14 at mounting points 204 and 206 so that the elongate axis 208 of the pipe box is parallel to the spindle axis 24. The pipe box includes a rectangular bar 210 with bottom plates 212 mounted thereon near each end of the bar.

Side plates 214 and 216 extend upwardly from either side of the bottom plates and an end plate 218 connects the upper ends of the side plates at each end of the box. Preferably, corner plates 220 (FIG. 17) are mounted between the bottom plate and each of the side plates, as seen in FIG. 17. The distance X between the side plates is sufficient to accommodate a number of pipe sections 18 side by side, for example, three or four.

The pipe sections are preferably stored in a stack determined manner. For example, the lowest row may be three pipe sections side by side. The next or second row on top will be four pipe sections wide, with the outer pipe sections of the second row naturally fitting between the side walls and the outer pipe sections just below in the lowest row. The inner pipe sections on the second row naturally fit between adjacent pipe sections in the lowest row. The third row would then be three pipe sections wide, fitting between adjacent pipe sections in the second row.

Such a configuration is illustrated in FIG. 17. Simply put, as a pipe section is placed in the pipe box on pipe sections already there, it will naturally pick a stable position nested between adjacent pipe sections in the next lower row or between a side wall and the pipe section adjacent the side wall in the next lower row. The height Y of the box is sufficient to accommodate a number of pipe sections vertically, for example, eight.

In one embodiment, the pipe sections are held in alternating rows of three and four pipe sections from the bottom to the top of the box along the Y direction. The pipe sections can enter and leave the box through the top of the pipe box between the side plates and end plates. The side plates prevent the pipe sections from rolling out of the box. The bottom plates support the lowest row of pipe sections. Typically, the pipe sections used will be of a type having upset ends, that is ends that have a larger diameter than the intermediate portions of the pipe sections, providing sufficient space between each pipe section for the pipe section to be gripped in a manner discussed hereinafter.

Figure 22:
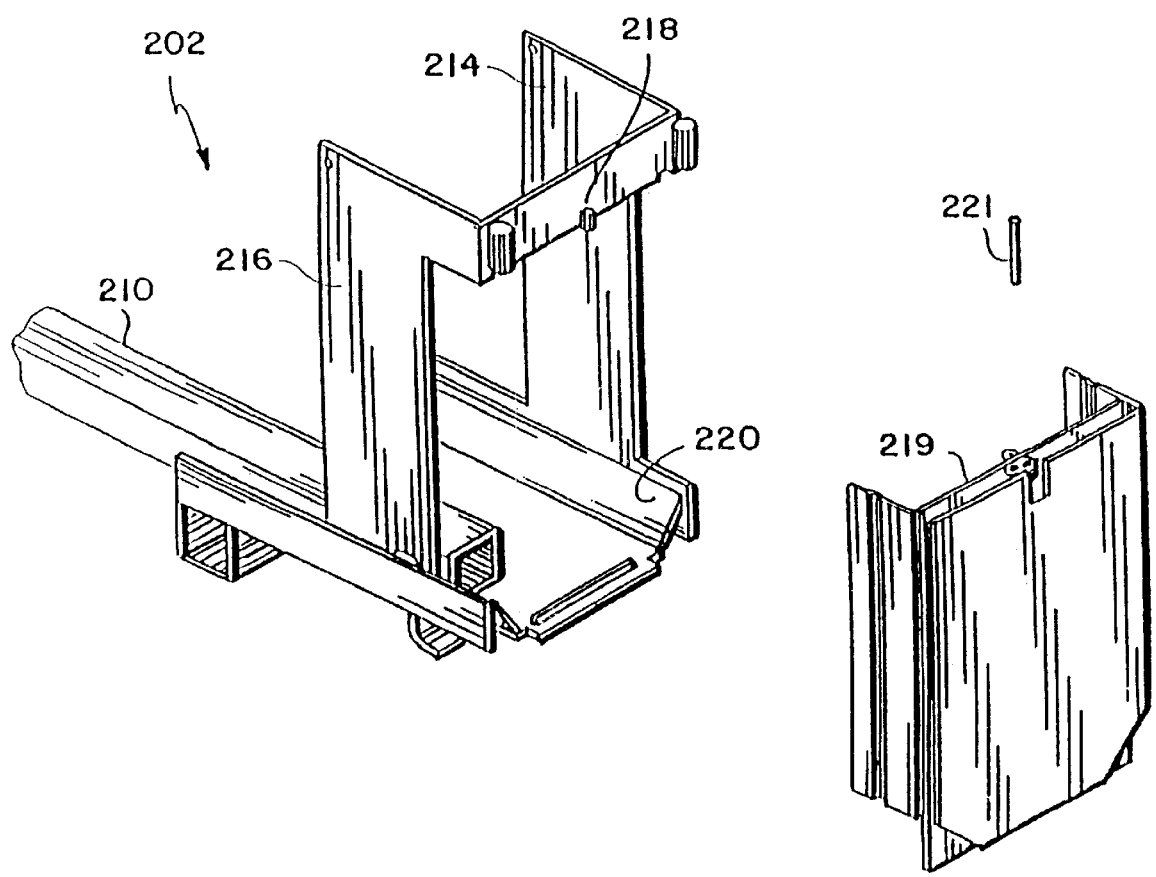
FIG. 22 is a perspective view of the end panel on the pipe box.

As seen in FIG. 22, removable end panels 219 at either end of pipe box 202 normally hold the pipe sections from falling out the ends of the pipe box, but can be removed by lilting out retaining pin 221 to allow access for removal of thread and dust protective caps (not shown) typically installed on the ends of each pipe section 18. The bottom end panel 219, for the lower end of pipe box 202 when it is installed on an inclined boring unit 14, is offset and reversible. Once reversed, the offset restrains the pipe sections 18 from sliding down toward the lower end of box 202 after the protective caps are removed. When the bore is completed and the pipe box 202 is ready for transport from the job site, the end panels can be removed for installation of the protective caps. Bottom panel 219 is now reversed to its original (storage) position to clear the added length of the protective caps.

Figure 18:
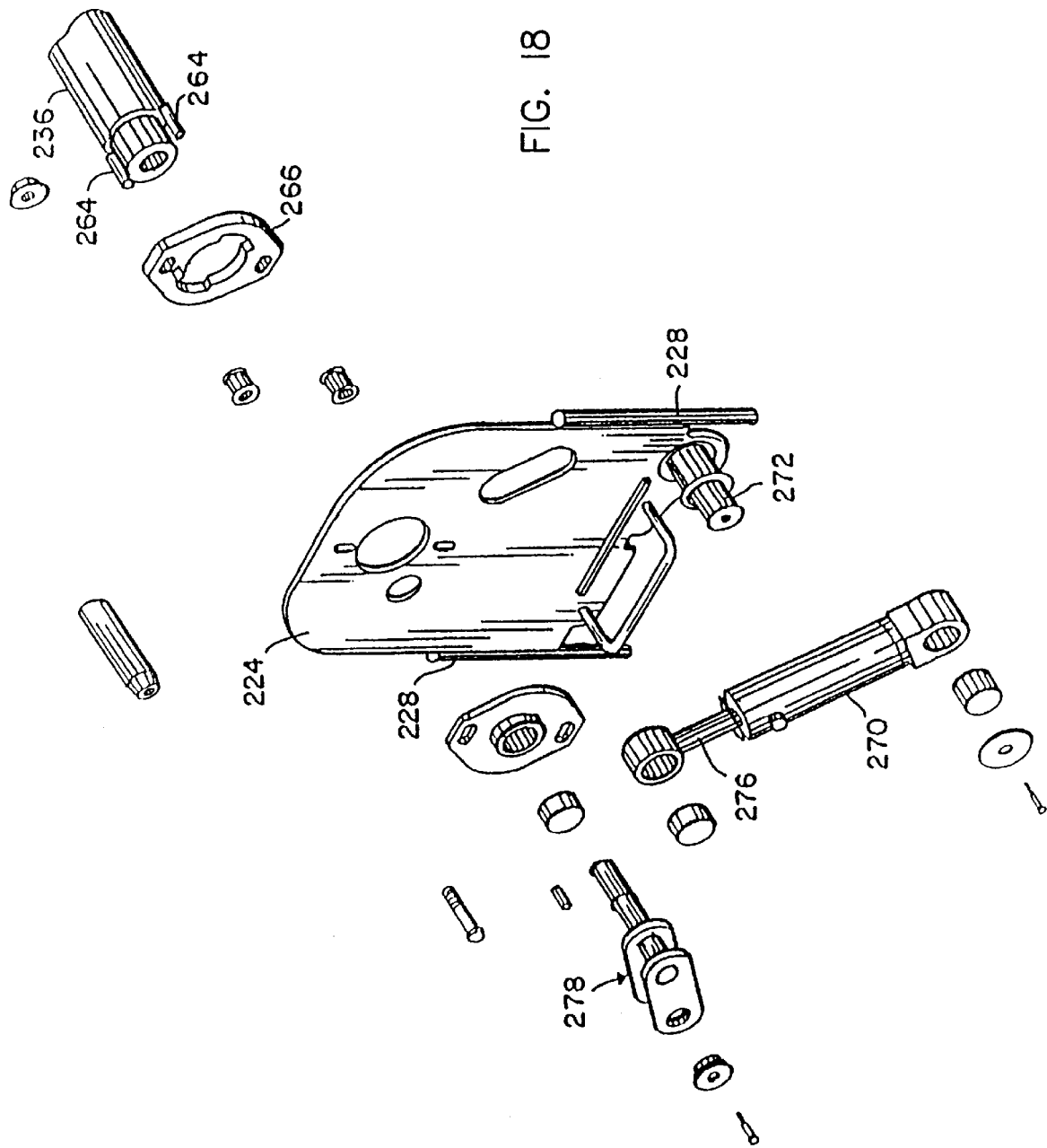
FIG. 18 is a perspective view of a cylinder mount and rotation member mounted thereon for limited pivotal motion.
Figure 19:
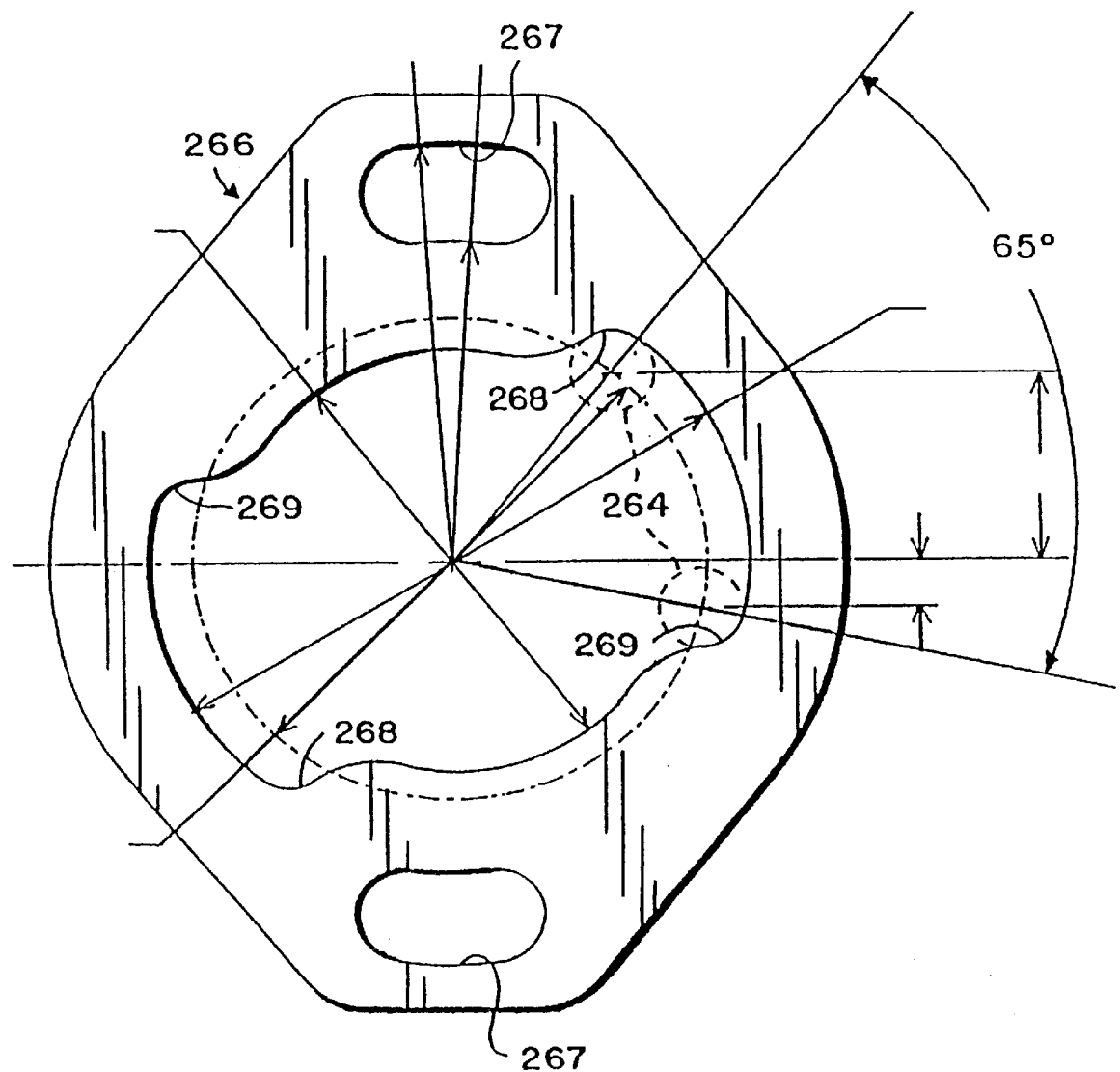
FIG. 19 is a plan view of a pivot adjust stop.

With reference to FIGS. 11–14, the device 200 also includes a pipe loader 222 which is mounted on top of the pipe box 202 and secured thereto. The pipe loader includes a rear pivot mount 224 and a front pivot mount 226. With reference to FIGS. 15 and 18, pivot mount 224 can be seen to have vertical rods 228 at each side thereof which extend downwardly and are received within sockets 234 mounted on side plates 214 and 216 at the rear of the pipe box. Similarly, the front pivot mount has rods 232 which mount through sockets 230 on the side plates 214 and 216 at the front of the pipe box.

A rotation member 236 is mounted between the pivot mounts 224 and 226 to pivot about pivot axis 238 which, when the pipe box 202 is mounted on the drill rig, and the pipe loader 222 is mounted on the pipe box, is also parallel the spindle axis 24. Mounted along the rotation member 236 are a pair of lifting eyes 240 which permit the pipe loader 222 to be lifted off of the pipe box. It is preferable to do so before the pipe box is detached from the rig.

Also mounted on rotation member 236 are a pair of cylinder mount tubes 242 which each mount a double acting extension cylinder 244. A pair of guide tubes 246 are also mounted on the rotation member and receive the guides 248 of an extension frame 250. The ends of the pistons of extension cylinders 244 are mounted to the extension frame at points 251.

At each end of the extension frame is mounted a pipe gripper 256 which includes a fixed finger 258 and pivoting finger 260. The finger 260 is pivoted by the piston of a double acting gripper cylinder 262. The cylinder 262 is supported on the extension frame 250 at the outer ends of the cylinder supports 252 and 254 mounted to frame 250.

With reference to FIGS. 18–21, the rear end of the rotation member 236 has a pair of stop pins 264 mounted thereon. A pivot adjustment stop 266 is mounted to the rear pivot mount 224 by bolts. The bolt holes 267 in the stop allow for limited pivotal motion about the axis 238 before tightening the bolts. The pivot adjustment stop has stop surfaces 268 and 269 which engage the stop pins 264 to confine the pivotal motion of the rotation member to a predetermined angle, for example 65 degrees.

Figure 11:
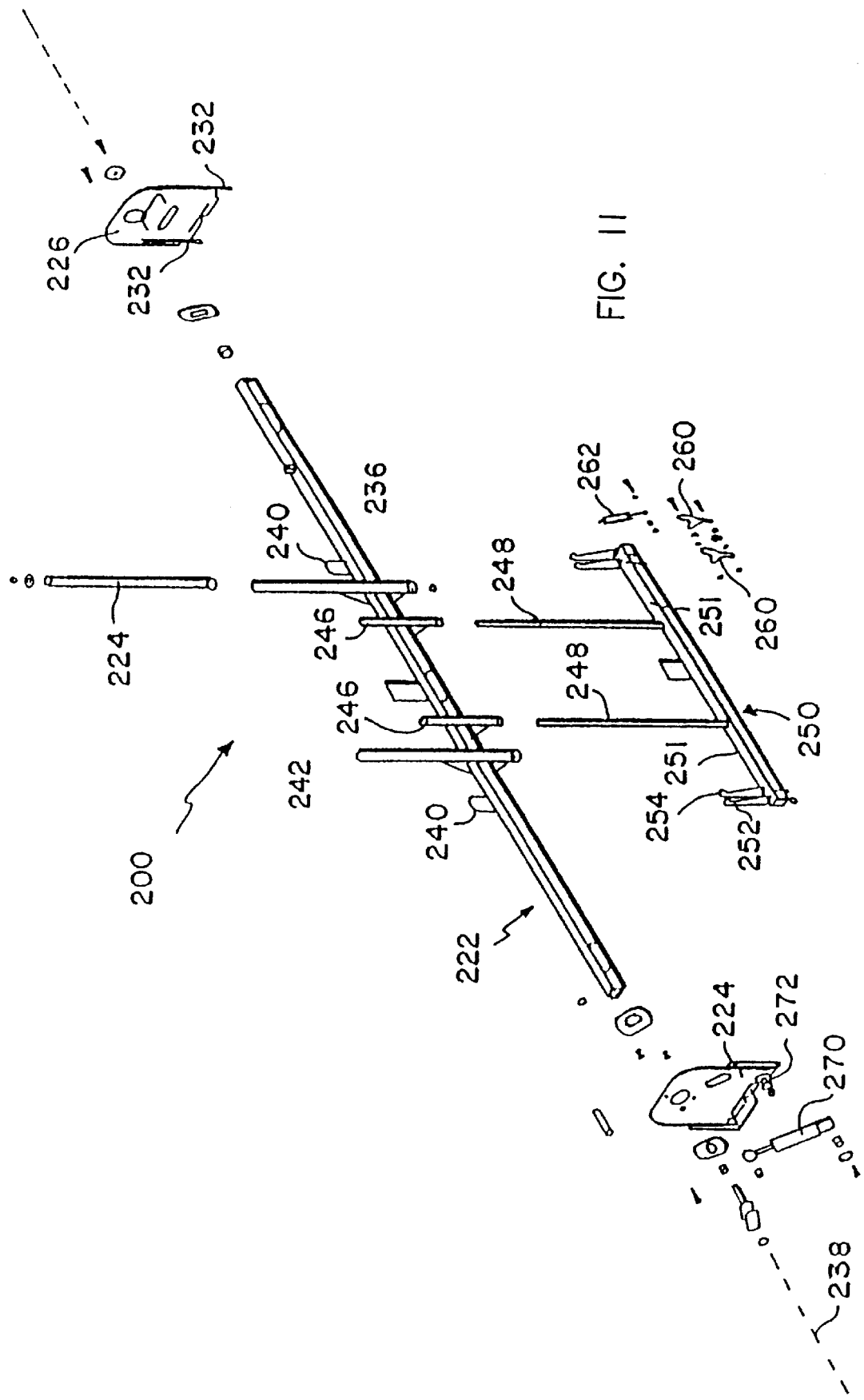
FIG. 11 is an exploded view of a pipe loader used in a pipe handling device forming a modification of the invention.
Figure 12:
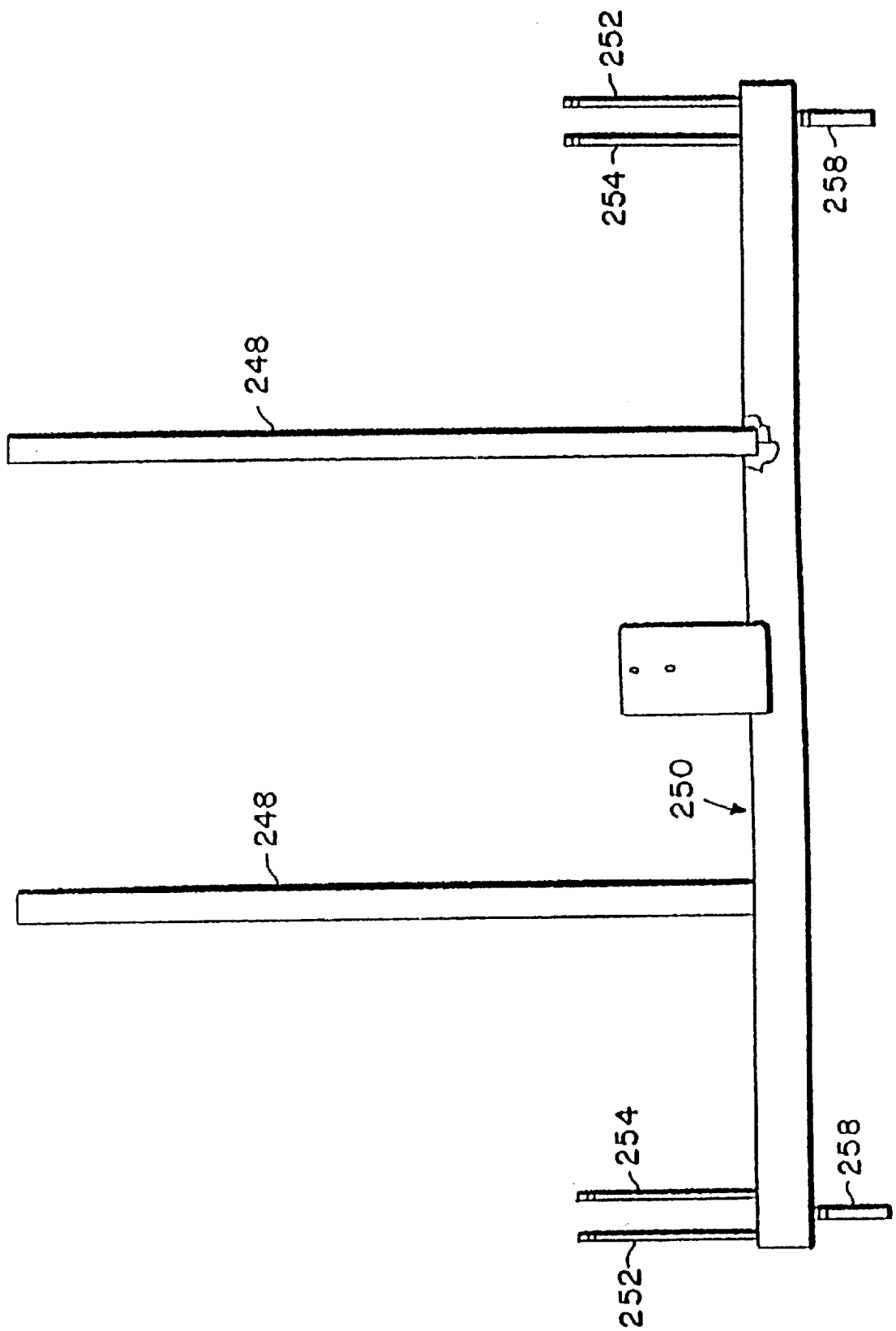
FIG. 12 is a side view of the extension frame of the pipe loader.
Figure 13:
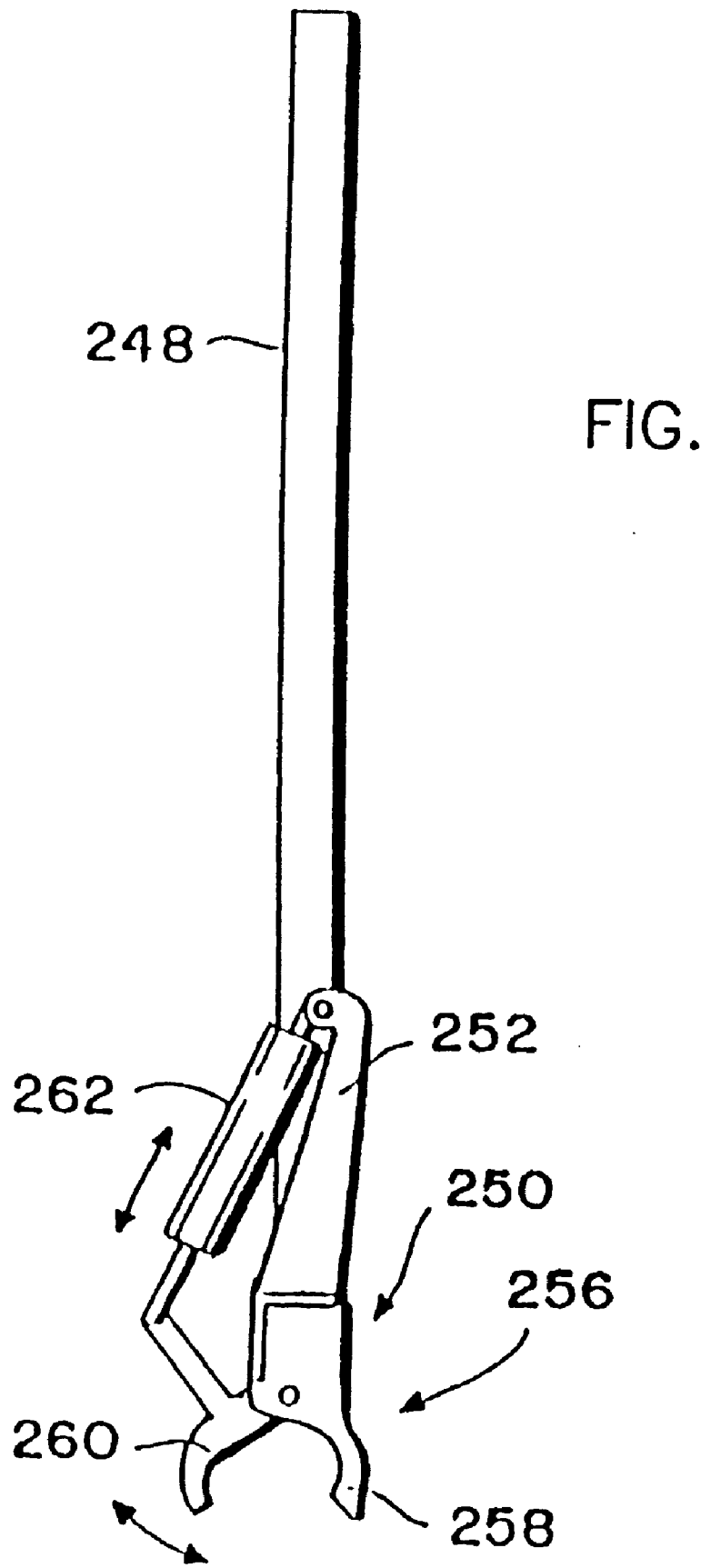
FIG. 13 is an end view of the extension frame.
Figure 20:
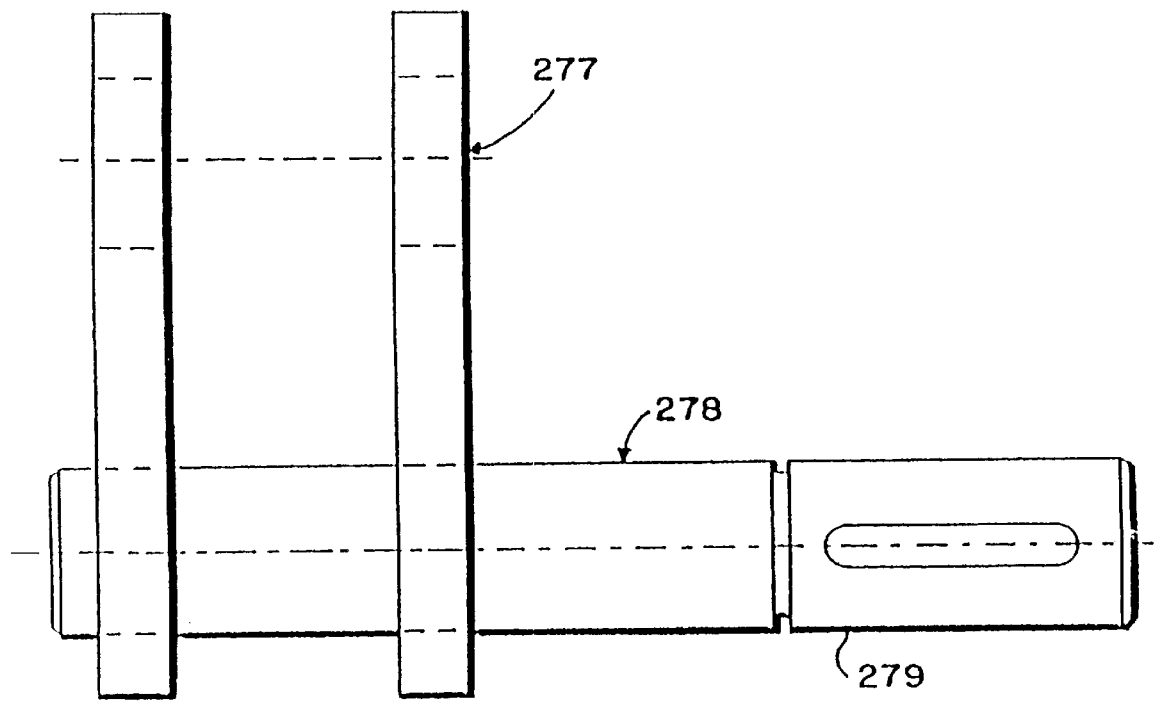
FIG. 20 is a plan view of the rotation arm.
Figure 21:
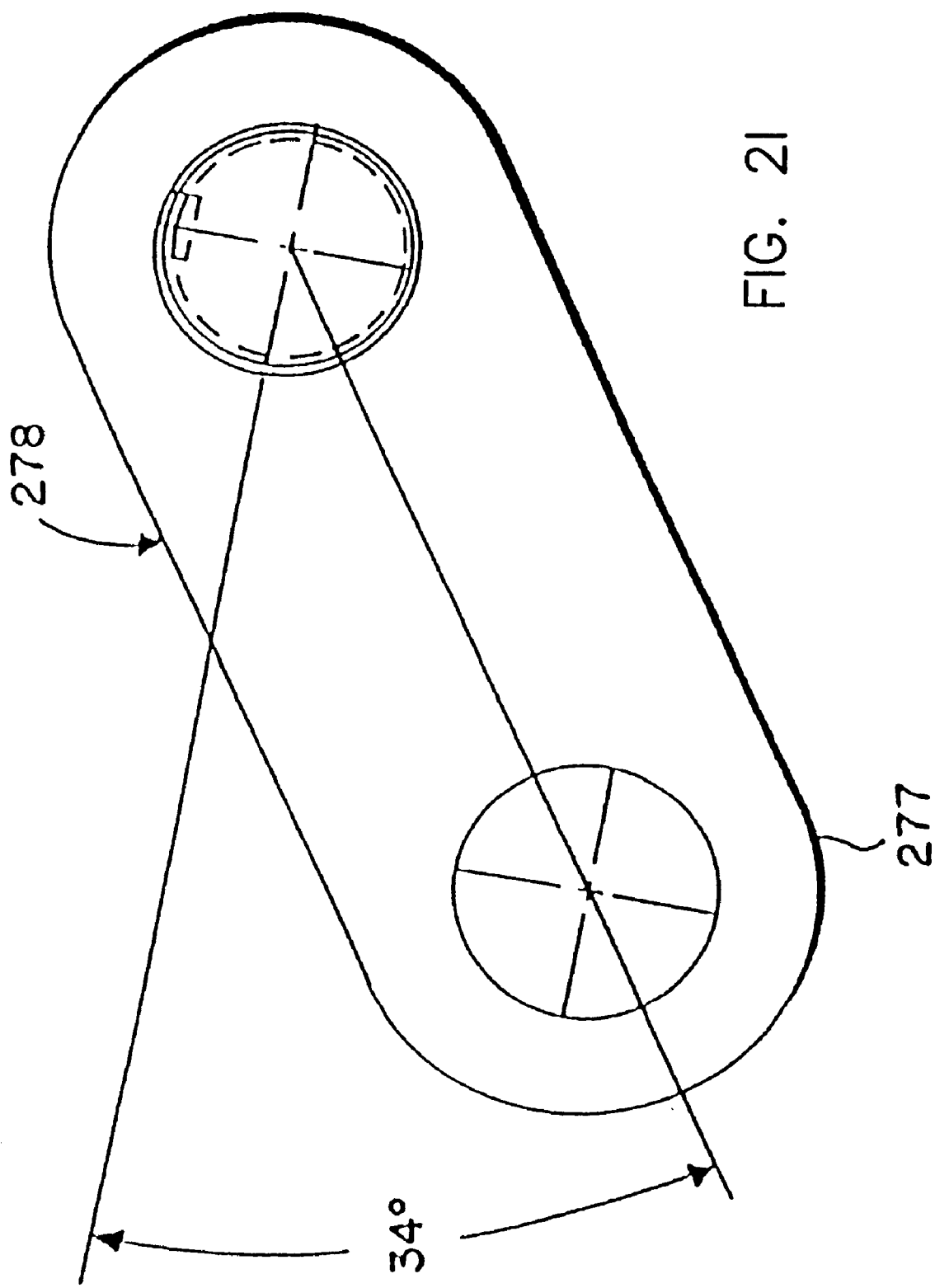
FIG. 21 is an end view of the rotation arm.

As shown in FIGS. 11, 18 and 20, a double-acting pivot cylinder 270 is pivotally mounted to the rear pivot mount 224 on pivot 272. The piston 276 of cylinder 270 is pivotally mounted to one end 277 of a rotation arm 278. The other end of rotation arm 278 has a pin 279 extending in the end of rotation member 236 which is secured to the end of the rotation member 236 by a key. Thus, extension and retraction of the piston 276 within the cylinder 270 will cause pivotal motion of the member 236 between the limits permitted by the pivot adjustment stop 266.

Figure 14:
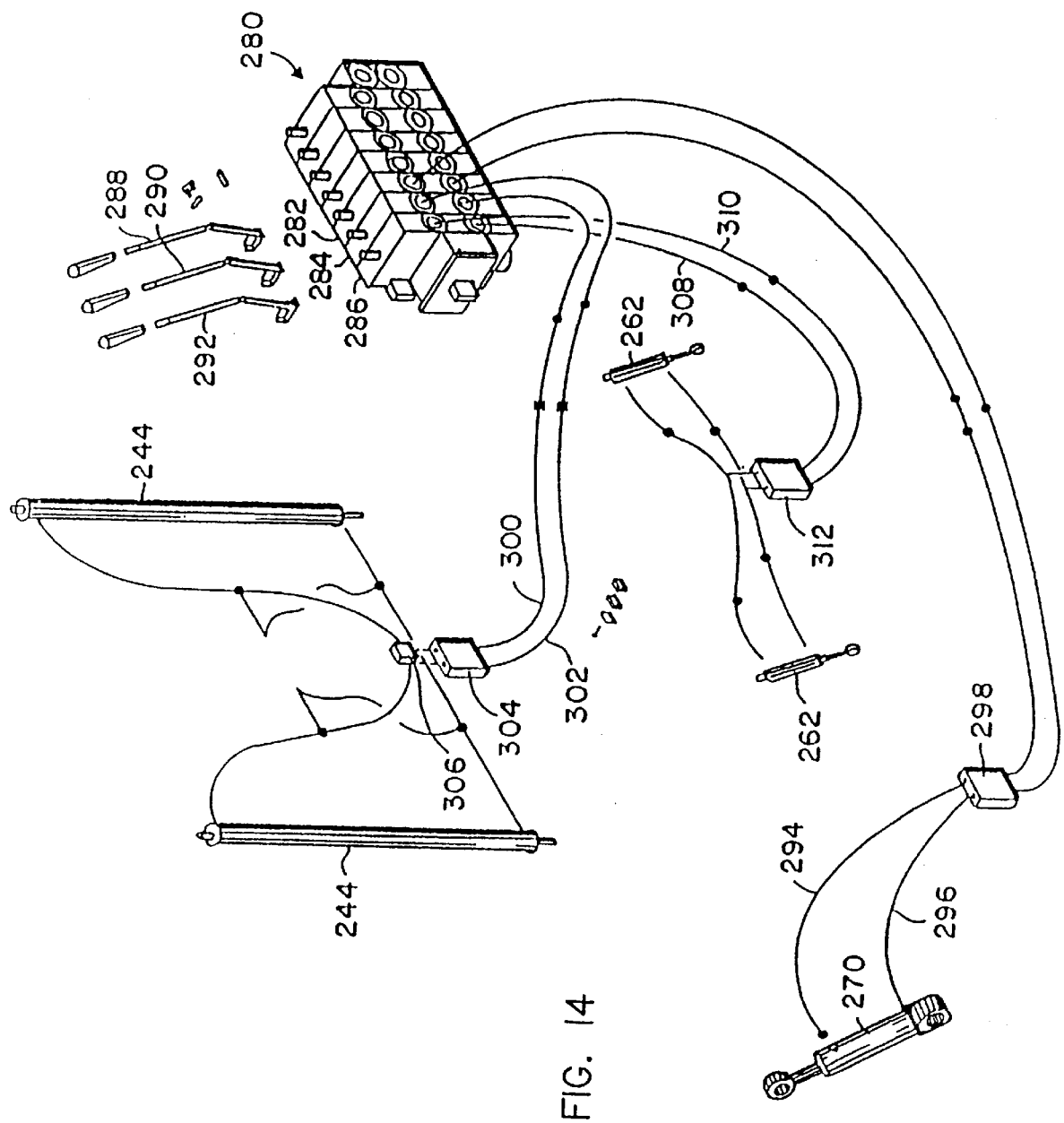
FIG. 14 is a schematic view of hydraulic circuits in the device.

With reference to FIG. 14, the hydraulic connections in the pipe handling device 200 can be described. The hydraulics will normally be powered from a hydraulic pump on an accessory power system (not shown), but can be powered from another source. Also, hydraulic operation can be replaced by compressed air operation or other suitable drive mechanism.

A control valve assembly 280 is provided which includes at least three control valves 282, 284 and 286 controlled respectively by control handles 288, 290 and 292. Valve 282 is connected through lines 294 and 296 to the double-acting rotation or pivot cylinder 270. The lines 294 and 296 pass through a check valve unit 298. Thus, activation of the handle 288 in opposite directions will cause the piston of cylinder 270 to extend and retract, pivoting the rotation member with the pipe grippers mounted thereon. When the rotation member has been pivoted to the desired position, the check valve 298 will maintain the member in that position when the handle is released.

Lines 300 and 302 extend from the valve 284 to the double-acting extension cylinders 244 to extend or retract the extension frame 250 relative the rotation member 236. A check valve 304 is utilized to maintain the position of the extension frame 260 after lever 290 is released. A flow divider 306 is preferably utilized to insure uniform motion of the pistons in the cylinders 244 so that the extension frame 250 does not jam as it is moved relative the rotation member 236.

Lines 308 and 310 extend from the valve 286 to the gripper cylinders 262. Thus, activation of the handle 292 will alternatively open the grippers or close the grippers about a pipe section. A check valve 312 maintains the position of the grippers when the handle is released.

The pipe handling device 200 enables the operator to move pipe joints or segments from the pipe box 202 to the drill unit for the purpose of adding pipe segments to the drill string as the boring operation progresses. Once the initial boring process or pilot bore is complete, the pipe handling device 200 enables the operator to sequentially remove pipe from the drill string and return it to the pipe box 202.

When boring or drilling the initial pilot hole with the drill unit, the operator must sequentially add more drill pipe segments to the drill string as it advances in the ground. This involves operations known in the art such as drilling forward, breaking connection with the drill string, retracting the drill unit carriage, adding another pipe segment to the drill string, and resuming the boring process. The pipe handling device 200 assists in the operation of obtaining and positioning the added pipe segments so that it can be threaded into the drill string. Once the bore is completed, the pipe handling device 200 assists in the operation of moving the pipe segments back to the pipe box.

In the drilling process, to load another pipe, the operator operates the three valves 282, 284 and 286 in sequence or in combination. The pivot cylinder 270 is used to rotate the rotation member and pipe grippers toward the desired pipe section in the pipe box. The extension cylinders 244 are used to telescope the extension frame 250 with the pipe grippers toward the selected pipe segment within the pipe box. The gripper cylinders 262 are actuated to close the gripping fingers 258 and 260 around the selected pipe section. The device can grasp any pipe section in the top row of the pipe box, although the operator will generally choose the one most accessible, typically the one closest to the drill unit. The stroke of extension cylinders 244 will be long enough to grasp pipe sections at the bottom of the pipe box.

Once the pipe section is gripped, it is moved above the pipe box by a combination of rotation of the member 236 by the pivot cylinder 270 and retraction of the extension cylinders 244 so that the pipe section at least clears the top of the side plates. With the pipe section now above the pipe box, the pivot cylinder 270 is actuated to pivot the rotation member into alignment with the spindle axis 24. This alignment can be set by the pivot adjustment stop 266.

Assuming the drill unit is ready to receive another pipe section, the operator can extend the extension cylinders 244 to move the gripped pipe section into coincidence with the spindle axis 24. The operator then moves the carriage of the drill unit forward so that the spindle engages the top hole end of the pipe section and begins to rotate the spindle to thread the connection together. Then the spindle is advanced, sliding the pipe section through the grippers to engage the other end of the pipe section with the drill string, and make that connection.

The gripper cylinders 262 are then actuated to release the pipe section and the extension cylinders are actuated to move the extension frame 250 away from the installed pipe section. The pivot cylinder 270 can then pivot the rotation member 236 to pick up the next pipe section in the pipe box. If the bore is longer than the amount of pipe in the pipe box, the pipe loader 222 can simply be released from and lifted off the empty pipe box and a loaded pipe box is substituted. The pipe loader 222 can then be lowered onto and secured to the full pipe box to continue the drilling operation.

The unloading process is essentially the reverse of the loading process. The pipe box will be at least partially empty. The carriage on the drill unit is moved back to pull the drill string from the hole, and the first pipe section in the drill string is broken free of the string. The pipe handling device 200 is positioned so that the pipe grippers 256 will engage that pipe section. This engagement can be done before the threaded connections are broken or after.

The carriage is moved back enough to disengage the bottom threads of the pipe section, if necessary, sliding the pipe section through the grippers a short distance. The spindle is further rotated and retracted to disengage from the top end of the pipe section. Then the operator can move the pipe section back to the pipe box in the reverse motion from installation. This is done first by retraction of the extension cylinders 244 and followed by actuation of the pivoting cylinder 270 to pivot the rotation member and suspend the pipe section above the pipe box.

The extension cylinders 244 are then extended to lower the pipe section into the box to the position selected by the operator. The gripper cylinders 262 are actuated to release the pipe section and the pipe will drop in place within the box as determined by the stack of pipe already there. Preferably, the operator will not drop the pipe from too high above the existing stack of pipe so that the released pipe section does not become diagonally wedged inside instead of conforming to the stack. The process continues until the last pipe section has been withdrawn from the borehole.

In pipe handling device 200, the operator is involved in the process of deciding which pipe to pick up and where to return it. The operator also has to exercise judgment on how far to extend the extension cylinders 244 in order to line up the pipe with the spindle axis, although rotation to that position with the pivoting cylinder is controlled by the pivot adjustment stop 266. Thus, the device is less of an automatic pipe handling device and performs primarily as a mechanical aid to reduce the manual labor involved in the drilling process. The pipe handling device 200, while disclosed to be mounted on the drill unit, could be supported separately from the drill unit. Further, the pipe loader 222 can, itself, be supported separately from the pipe box 202. For example, pipe handling device 200 might be mounted on a pipe trailer positioned next to the drill unit. One can also appreciate that there are multiple ways to implement the rotation and extension/retraction actions performed by cylinders 244 and 270. For example, the two extension cylinders 244 can use the flow divider 306 to cause them to extend equally. This could be accomplished with a pair of timed ball screws, rack and pinion or the like.

In addition, supports can be mounted on the drill unit itself to receive the pipe sections from pipe handling device 200. These supports would be positioned on the spindle axis to align the pipe section directly. These can be configured to swing away or retract when the carriage on the drill unit advances in the drilling process. This would make alignment of axes 24 and 238 less critical and facilitate mounting the device 200 or loader 222 separate from the drill unit.

Among the significant advantages of pipe handling device 200 is its ability to pick up and return a pipe section to any location within the pipe box. The pipe loader 222 is also easily movable from one pipe box to another, an important factor when longer distance boreholes are drilled. Pipe loader 222 can also be used independently of pipe box 202 if a source of pipe sections within reach of the pipe grippers is provided. Further, the pipe handling device 200 lends itself to retrofitting on older drill units already in service. Also, the use of the pivot adjustment stop 266 insures that the extension of cylinders 244, occurring in a single plane approximately intersecting and parallel to the spindle axis 24 means that the operator need only operate this single function to achieve alignment with the spindle axis. This makes the process easier to accomplish. Typically, the extension cylinders will have to have sufficient capability to extend further than the spindle axis because this extended reach is necessary to reach the bottom row of pipe sections in the pipe box.

The Embodiments of FIGS. 23–30

Turning now to FIGS. 23–30, another preferred pipe handling device will be described. The pipe handling device is adaptable for use with any machine or equipment requiring the use or receipt of elongate objects in a generally horizontal position. The pipe handling device, designated generally by the reference numeral 400, may be positioned adjacent the frame of a horizontal boring machine 14, as illustrated in FIG. 24, for storing and laterally transporting pipe sections 18 between the pipe handling device 400 and the horizontal boring machine. The pipe handling device 400 shuttles pipe sections 18 from a storage position to the spindle axis 24 of the horizontal boring machine 14 in a generally horizontal position.

As illustrated in FIGS. 23 and 24, the pipe handling device 400 is adapted to be mounted to the horizontal boring machine 14 via a mounting assembly 402. The mounting assembly 402 facilitates accurate alignment of pipe sections 18 with the horizontal boring machine 14 and connects the frame 404 of the pipe handling device 400 to an adapter or bracket 406 with a plurality of fasteners, such as pins 408. The adapter 406 preferably is welded to the horizontal boring machine 14. Use of the fasteners 408 to removably connect the frame 404 with the adapter 406 allows accurate alignment of the frame 404 with the spindle axis 24. Thus, the pipe loader machine 400 is easily removable from the horizontal boring machine 14 for transport, yet is easily connectable in ready alignment with the spindle axis 24 upon the next use.

The pipe handling device 400 comprises a magazine 414 and a pipe handling assembly 416. The magazine 414 stores a plurality of pipe sections 18 in a manner yet to be described. The pipe handling assembly 416 receives pipe sections 18 from the magazine 414 and transports the pipe sections to the spindle axis 24 of the horizontal boring machine 14 in a manner yet to be described.

With continuing reference to FIGS. 23 and 24, the magazine 414 is situated directly above the frame 404 and preferably is removably connectable therewith. As illustrated in FIG. 23, the magazine 414 may define apertures 420 which correspond with eyes 422 formed in the frame 404. Pins 424 received through the corresponding apertures 420 and eyes 422 secure the magazine 414 to the frame 404.

The magazine 414 defines an open bottom 428 and a plurality of pipe receiving columns 430. This configuration accommodates a plurality of pipe sections 18 which may be stacked in columns of generally horizontal pipe inside the magazine 414. The columns 430 preferably are formed by a pair of opposing ends 434 and 435 defining a plurality of vertical storage structures 436. The vertical storage structures 436 in the opposing ends 434 and 435 correspond to create tracks for receiving the ends 438 and 440 of a pipe section 18 as shown in FIG. 23. The number of columns 430 in the magazine 414 is dependent upon the number of vertical storage structures 436 formed in the opposing ends 434 and 435.

Referring again to FIG. 23, the magazine preferably further comprises a pair of opposing upper bars 444 and a pair of opposing lower brackets 446. The opposing upper bars 444 and the opposing lower brackets 446 help retain the columns 430 of pipe sections 18 inside the magazine 414 and reinforce the structural integrity of the magazine 414.

The magazine 414 may further comprise a handle 450. In the preferred embodiment, the opposing ends 434 and 435 comprise a plurality of recesses 452 adapted to receive a sling-type handle 450. The sling 450 permits the magazine to be lifted and transported. Thus, it will now be appreciated that the magazine 414 is removable and transportable, while the frame 404 remains in an aligned position with respect to the spindle 24 of the horizontal boring machine 14.

With continuing reference to FIG. 23, the magazine 414 may be removed from the frame 404 while either empty or loaded with pipe sections 18. If removed while loaded, pipe sections 18 may be prevented from falling out of the magazine 414 through the open bottom 428 by retaining pins 454. Retaining pins 454 are received through apertures 456 and 457 formed in the opposing ends 434 and 435.

It will now be appreciated that the magazine 414 efficiently stores pipe sections 18 in generally horizontal columns 430 and that the pipe sections 18 are accessible through the open bottom 428 of the magazine.

As illustrated in FIGS. 23 and 24, the pipe handling assembly 416 is situated directly beneath the open bottom 428 of the magazine 414. The pipe handling assembly 416 comprises arms 460 movably supported on the frame 404, and a drive assembly 462 for driving the movement of the arms 460. The arms 460 comprise a pipe holding member 464 formed in the arms 460 proximal the horizontal boring machine 14. The pipe holding member 464 is adapted to receive and support a pipe section 18. The pipe holding member 464 may further comprise a retaining structure 466 for retaining a pipe section 18 in the pipe holding member. In the preferred embodiment, each retaining structure 466 comprises a spring loaded pipe retainer operatively connected to the arm 460 via a spring 468. Retaining structure 466 retains the pipe section 18 in the pipe holding member 464 until the pipe section 18 is aligned with the spindle axis 24.

The arms 460 are positioned on the frame 404 generally parallel with each other. The arms are advanced and retracted laterally and generally perpendicular to the spindle axis 24 of the horizontal boring machine 14 in such a manner as to shuttle pipe sections 18 between the horizontal boring machine and the magazine 414. The extension and retraction of the arms 460 is powered by the drive assembly 462.

The drive assembly 462, illustrated in FIGS. 23 and 24, comprises rack and pinion gear assemblies mounted on the frame 404. A rack and pinion gear assembly is operatively connected to each arm 460 and comprises a pinion gear 474 and a gear rack 476. The rack and pinion gears are mounted in parallel on a shaft 478 which is rotated by a hydraulic motor 480.

The shaft 478 is mounted on the frame 404 generally parallel the spindle axis 24 of the horizontal boring machine 14. The shaft 478 is rotated by the hydraulic motor 480 mounted at one end of the frame 404 (see FIG. 23). The pinion gears 474 are mounted in parallel on the shaft 478 beneath the arms 460. Gear racks 476 are welded to the arms 460.

Operation of the hydraulic motor 480 rotates the shaft 478, which in turn causes the pinion gears 474 to rotate. As shown in FIG. 24, the rotating pinion gears 474 engage the gears racks 476. When the pinion gears rotate in a counter-clockwise direction, the arms 460 extend laterally in the direction of the horizontal boring machine 14, designated in FIG. 23 as direction X, thereby transporting a pipe section 18 to the spindle axis 24. The pinion gears may be rotated in a clockwise direction to cause the pipe holding member 464 to retract in direction Y, thereby enabling return of a pipe section 18 to the magazine 414.

Figure 28:
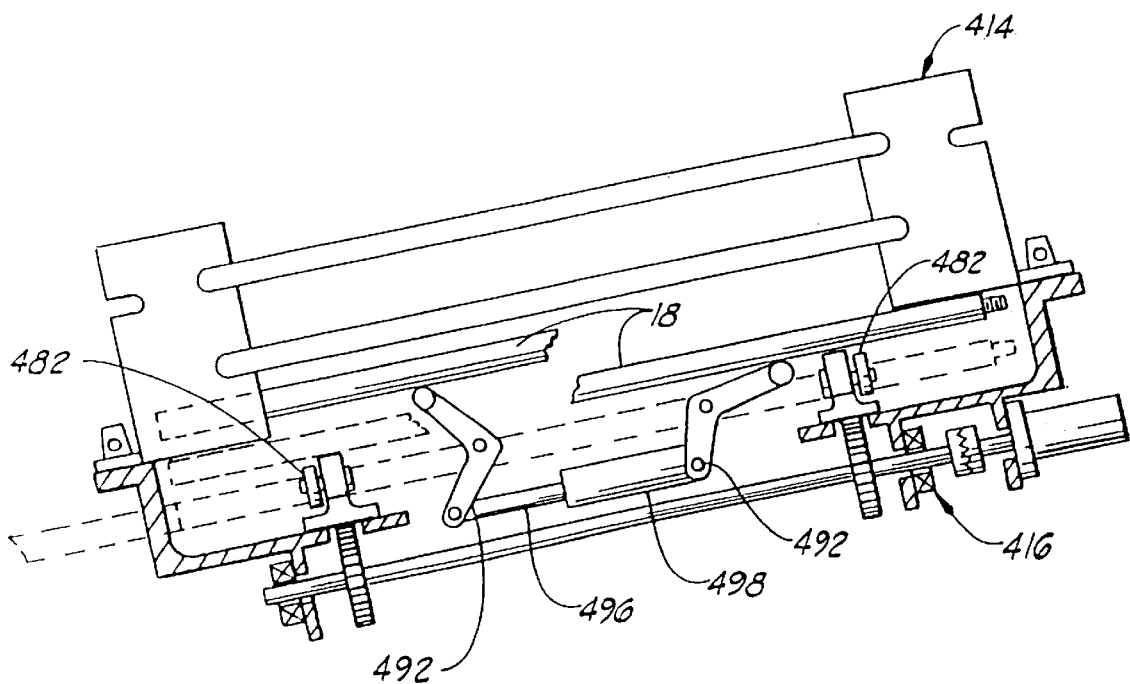
FIG. 28 is a side elevational view of the pipe handling device of FIG. 23 and shows the placement of rollers for preventing axial sliding of pipe sections during transport between the horizontal boring machine and the magazine.

The pipe handling assembly 416 preferably further comprises rollers 482, as shown in FIG. 28, to prevent axial sliding of the pipe section 18 while positioned in the pipe holding member 464. When in a normal operating position, the spindle axis 24 is at an angle of approximately ten to twenty degrees with respect to the ground. The pipe handling device 400 is aligned with the spindle axis of the horizontal boring machine 14. Consequently, pipe sections 18 are delivered to and from the spindle axis 24 on an inclined plane. At this angle, pipe sections 18 may slide axially in the pipe holding members 464. To prevent axial sliding, rollers 482 may be supported on the pipe handling device 400 adjacent the pipe holding members 464. The rollers 482 are preferably comprised of a resilient compound which creates a frictional force with the pipe section 18 in the pipe holding member 464, thus creating resistance to slippage. The rollers 482 allow rotation of the pipe section 18, which is necessary to connect and disconnect the pipe from the horizontal boring machine, yet offer sufficient resistance to axial sliding due to their composition.

Figures 25, 26, 30:
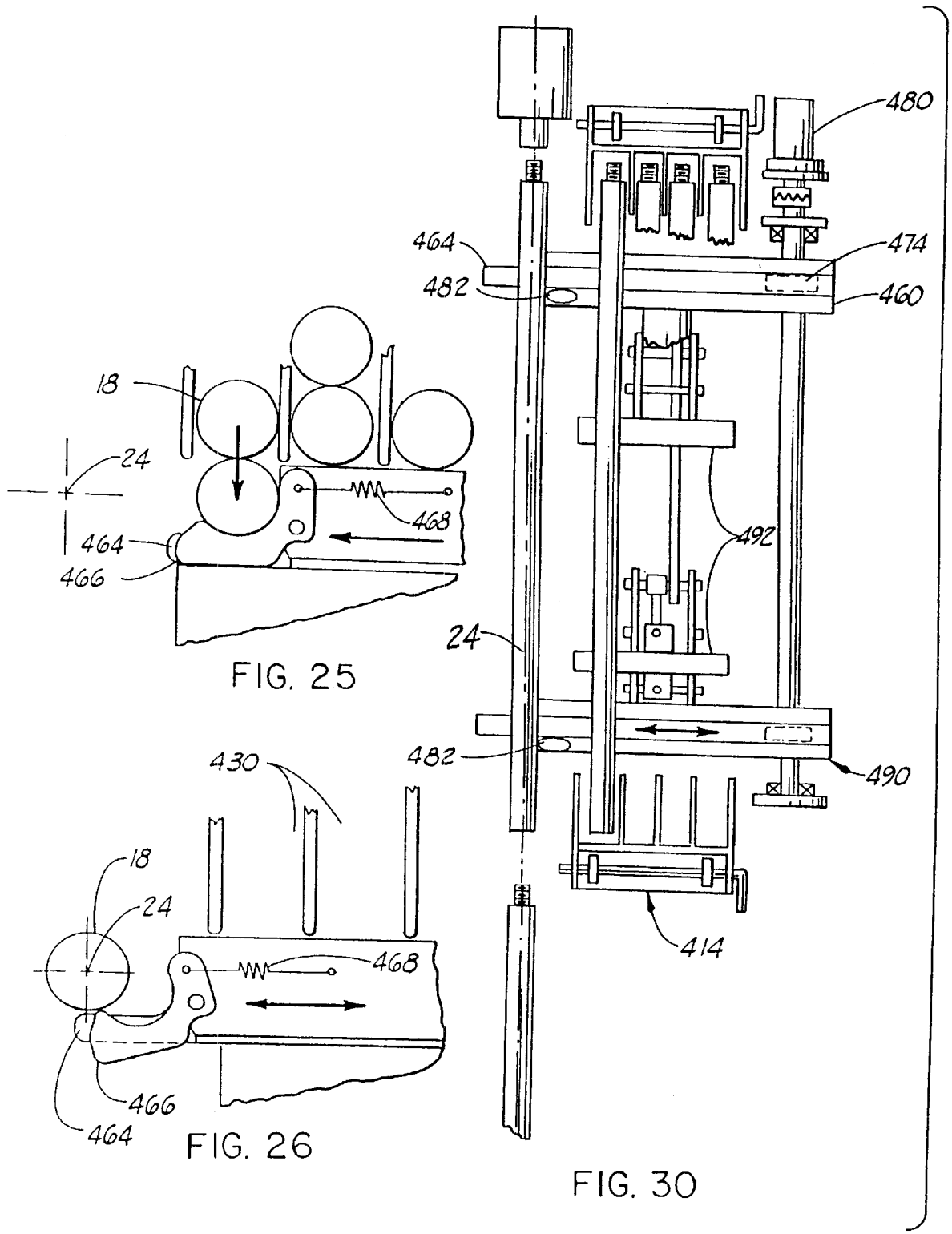
FIG. 25 is a fragmented, end view of the pipe handling device of FIG. 23 receiving a pipe section from the magazine.
FIG. 26 is a fragmented, end view of the pipe handling device of FIG. 23 receiving a pipe section from the spindle axis of a horizontal boring machine.
FIG. 30 is a plan view of the pipe handling device of the present invention showing the operation of the pipe return assembly.

Turning now to FIGS. 25 through 27, operation of the pipe handling device 400 will be described. To receive a pipe section 18 from the magazine 414, the arms 460 of the pipe handling assembly 416 are retracted to position the pipe holding member 464 beneath the selected column 430 from which a pipe is to be received. Generally, pipe sections 18 first will be retrieved from the column 430 proximal the horizontal boring machine 14 until this column is empty. Thereafter, pipe sections 18 will be retrieved from the immediately adjacent column 430 until it also is empty. Retrieval of pipe sections 18 will proceed in the same fashion until all columns 430 are empty or until the boring operation is completed.

After selecting the desired column 430, the arms 460 are retracted to position the pipe holding member 464 beneath the selected column. The arms 460 are advanced in direction Y by the gear racks 476 and the pinion gears 474. As the arms 460 recede from beneath the desired column 430, gravity causes the pipe section 18 positioned at the open bottom 428 of the selected column 430 to fall into the pipe holding member 464 as illustrated in FIG. 24. The retaining structure 466 is supported by the frame 404 while the arms 460 are in the retracted position beneath the selected column 430. The retaining structure 466 prevents the pipe section 18 from rolling off of the pipe holding member 464.

The arms 460 are then advanced to the spindle axis 24 for connection of the pipe section 18 in the pipe holding member 464 with the drill string of the horizontal boring machine 14. The horizontal boring machine 14 is operated to connect the pipe section 18 to the drill string on the horizontal boring machine 14. Boring operations may then resume.

Referring now to FIG. 26, operation of the pipe handling assembly 416 when receiving a pipe section 18 from the horizontal boring machine 24 will be described. The arms 460 are advanced in direction X to the spindle axis 24. As the arms 460 advance, the spring loaded pipe retainer 466 is deflected downward as it contacts the pipe section 18. The pipe holding member 464 is aligned with the pipe section 18 to be received. After alignment with the pipe section 18, the spring 468 returns the pipe retainer 466 to the support position and retains the pipe section 18 in the pipe holding member 464 during transport. The pipe section 18 is unthreaded from the drill string and is supported solely by the pipe holding member 464. The arms 460 are then retracted in direction Y for return of the pipe section 18 to the magazine 414. Pipe sections 18 are replaced in the magazine 414 in a manner yet to be described.

Preferably, the pipe handling assembly 416 also permits the operator to manually load and unload pipe sections 18 directly to or from the spindle axis 24 without requiring that the magazine be removed from the pipe handling device 400. This is accomplished by retracting the arms 460 to the auxiliary load position illustrated in FIG. 26. The arms 460 are retracted in direction Y to provide sufficient space to manually load or unload pipe sections 18 from the horizontal boring machine 14. When the magazine 414 is emptied and a few additional pipe sections 18 are required to complete the bore, pipe sections 18 may be manually loaded and unloaded while the pipe handling assembly is in the auxiliary load position without removing the magazine 414 from the pipe handling device 400.

Figure 29:
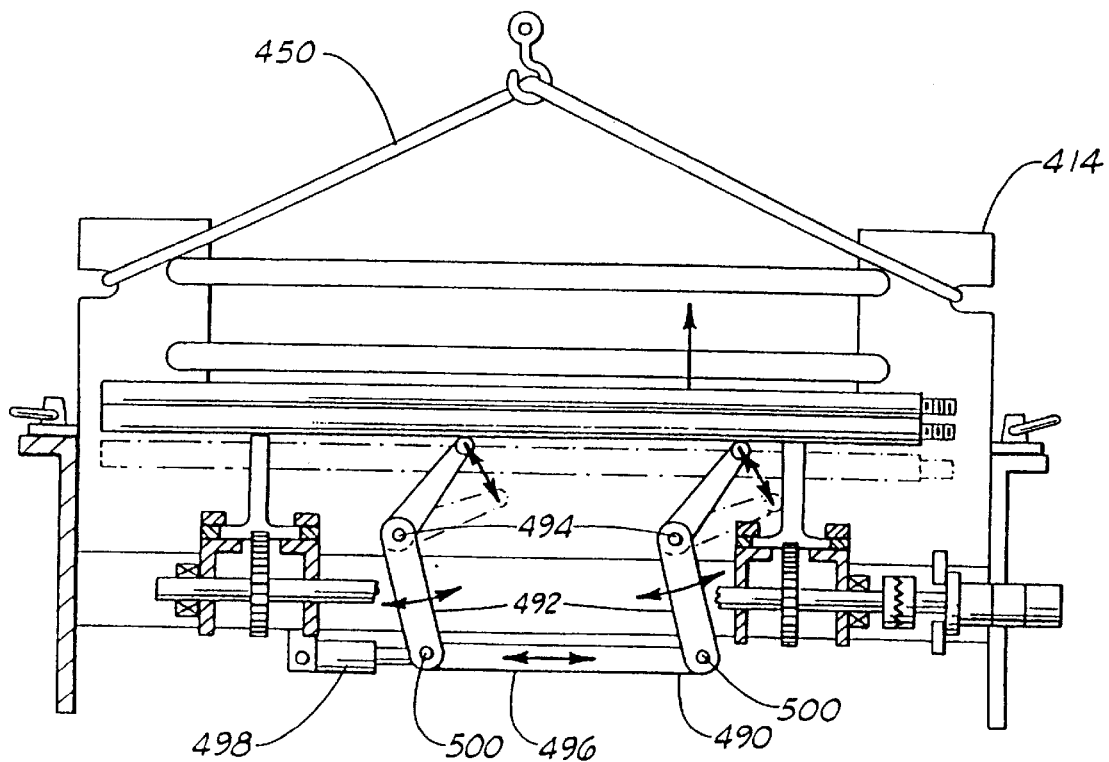
FIG. 29 is a side elevational view of the pipe handling device of FIG. 23 showing the operation of the pipe return assembly.

Turning now to FIGS. 29 and 30, the pipe handling device 400 preferably further comprises a pipe return assembly 490 for returning pipe sections 18 to the magazine 414. The pipe return assembly 490 is positioned beneath the open bottom 428 of the magazine 414 and comprises return arms 492, pivot pins 494, a link 496 and a hydraulic cylinder 498. The return arms 492 are attached to the frame 404 by pivot pins 494. Link 496 connects the hydraulic cylinder 498 to the return arms 492 by pins 500.

When returning a pipe section 18 to the magazine 414, the first column 430 that is not completely full of pipe sections is selected. The hydraulic cylinder 498 is actuated to extend the link 496 in the direction P. Extension of the link 496 in direction P shifts the return arms 492 thus raising the pipe section 18 into the selected column. Actuation of the hydraulic cylinder 498 causes the link 496 to move in direction P. As the link 496 is extended, the return arms 492 shift position causing the uppermost portion of the return arm to raise. Pipe section 18 supported on the return arms 492 is lifted into the selected column 430. The cylinder 498 is then retracted causing link 496 to move in direction Q. As the link moves in direction Q, the return arms 492 lower. The pipe section 18 in the magazine 414 then rests directly oil the arms 460. The arms 460 may then be extended to the spindle axis 24 to receive another pipe section 18 from the horizontal boring machine 14. This sequence is repeated until all the pipe sections 18 from the drill string of the horizontal boring machine 14 are returned to the magazine 414.

It will now be appreciated that the present invention permits automatic loading and unloading of pipe sections between a horizontal boring machine and the magazine of the pipe handling device. The pipe sections are transported in a generally horizontal position and in ready alignment with the boring machine for immediate connection with the drill string. It further will be appreciated that all of the preferred embodiments of the present invention passively position pipe sections in the magazine, or pipe rack, for direct access by the pipe handling assembly. Thus, the present invention permits pipe sections to be retrieved for transport to the horizontal boring machine without the aid of a feeding device which mechanically positions the pipe sections in the magazine for transport to the boring machine.

Although the present invention has been described with respect to a several specific preferred embodiments thereof, various changes and modifications may be suggested to one skilled in the art, and it is intended that the present invention encompass such changes and modifications as fall within the scope of the appended claims.

What is claimed is:

1. A pipe handling device for storing and transporting pipe sections to and from a horizontal boring machine having a drill string rotatable about an axis of rotation, the pipe handling device comprising:

a magazine adapted to store a plurality of pipe sections near the horizontal boring machine; and a pipe handling assembly adapted to transport at least one pipe section between the magazine and the horizontal boring machine, the pipe handling assembly comprising a rotation member and at least one pipe holding member supportable on the rotation member, the pipe holding member adapted to transport at least one pipe section to and from the horizontal boring machine;

wherein the magazine is adapted to passively position the plurality of pipe sections in the magazine.

2. The pipe handling device of claim 1 wherein the pipe handling assembly further comprises:

a frame; and wherein the rotation member comprises a pivot member having an axis of rotation, the pivot member rotatably supportable on the frame;

wherein the pipe holding member is supportable on the pivot member;

wherein the pipe holding member is adapted to receive and release at least one of the plurality of pipe sections; and wherein rotation of the pivot member causes pivotal movement of the pipe holding member about the pivot member axis and movement of a pipe section to and from the horizontal boring machine.

3. The pipe handling device of claim 2 wherein:

the pivot member comprises a shaft rotatably supported on the frame generally parallel with the axis of rotation of the drill string of the horizontal boring machine; and wherein the pipe holding member is supportable on the shaft and adapted for movement between a first position and a second position, wherein in the first position a pipe section is receivable in the pipe holding member and in the second position a pipe section is releasable from the pipe holding member.

4. The pipe handling device of claim 3 wherein the magazine defines a return position and wherein the pipe holding member is adapted to return the pipe section to the magazine at the return position.

5. The pipe handling device of claim 3 further comprising a detent device adapted to confine rotation of the shaft between a first position and a second position.

6. The pipe handling device of claim 3 wherein the pipe handling assembly further comprises a friction member adapted to prevent axial sliding of the pipe section during transport.

7. The pipe handling device of claim 6 wherein the friction member comprises a resilient material.

8. The pipe handling device of claim 2 wherein the pipe handling assembly further comprises:
   a pivot member drive mechanism adapted to rotate the pivot member to position the pipe holding member for receipt and release of a pipe section; and
   a pipe holding member drive mechanism adapted to drive the movement of the pipe holding member in a direction generally perpendicular to the axis of rotation of the pivot member.

9. The pipe handling device of claim 8 wherein the pivot member drive mechanism comprises a hydraulic motor.

10. The pipe handling device of claim 8 wherein the pivot member has first and second ends and the pivot member drive mechanism comprises:
    a hydraulic cylinder having a piston, the hydraulic cylinder supported on the frame of the pipe handling assembly; and
    a rotatable arm coupling the piston of the hydraulic cylinder with the pivot member, the arm having a fixed end and a free end;
    wherein the fixed end of the arm is rotatably supported at the second end of the shaft;
    wherein the piston of the hydraulic cylinder is connectable to the free end of the rotatable arm such that activation of the piston causes rotation of the rotatable arm, thereby rotating the shaft and causing movement of the pipe holding member.

11. The pipe handling device of claim 8 wherein the pipe holding member drive mechanism comprises a hydraulic cylinder having a piston, the hydraulic cylinder being mounted on the pivot member, and wherein the pipe holding member is mounted on the piston for movement of the pipe holding member between a retracted position and an extended position.

12. The pipe handling device of claim 2 wherein the pivot member further comprises a pivot adjustment assembly adapted to confine the rotation of the pivot member to a predetermined angle.

13. The pipe handling device of claim 12 wherein the pivot adjustment assembly comprises:
    a pin supported at the one end of the pivot member in axial alignment therewith; and
    a pivot adjustment stop supported on the pivot member, the pivot adjustment stop defining a stop surface adapted to engage the pin and confine rotation of the pivot member to a predetermined angle.

14. The pipe handling device of claim 2 wherein the pipe holding member comprises a gripping member.

15. The pipe handling device of claim 14 wherein the gripping member comprises a fixed finger and a movable finger.

16. The pipe handling device of claim 15 wherein the movable finger further comprises a biasing member adapted to urge the gripping member into contact with the pipe section to be received.

17. The pipe handling device of claim 15 wherein the movable finger further comprises a hydraulic cylinder having a piston adapted to actuate the moveable finger to retrieve and release a pipe section.

18. The pipe handling device of claim 14 wherein the gripping member further comprises a guide member adapted to ensure movement of the gripping member in a direction perpendicular to the axis of the pivot member.

19. The pipe handling device of claim 18 wherein the guide member comprises:
    brackets mounted on the hydraulic cylinder; and
    guide shafts slidably received within the brackets perpendicular to the pivot member.

20. The pipe handling device of claim 2 wherein the pipe handling assembly further comprises an extension assembly supported on the pivot member, the extension assembly adapted to move the pipe holding member between an extended position and a retracted position.

21. The pipe handling device of claim 20 wherein the extension assembly comprises:
    an extension arm supported on the pivot member in axial alignment therewith; and
    a drive assembly adapted to drive the movement of the extension arm;
    wherein the pipe holding member is supported on the extension assembly.

22. The pipe handling device of claim 21 wherein the drive assembly comprises:
    a hydraulic cylinder having a piston;
    wherein the hydraulic cylinder is supported on the pivot member and the extension arm is connected to the piston;
    wherein actuation of the hydraulic cylinder affects extension and retraction of the extension arm.

23. The pipe handling device of claim 22 wherein the pivot member further comprises a mount tube adapted to mount the hydraulic cylinder of the drive assembly of the extension assembly to the pivot member.

24. The pipe handling device of claim 21 wherein the extension arm further comprises a guide and the pivot member further comprises a guide housing, the guide housing adapted to receive the guide and ensure movement of the extension arm in a direction perpendicular to the axis of the pivot member.

25. The pipe handling device of claim 1 further comprising a mounting assembly adapted to removably connect the magazine to the pipe handling assembly.

26. The pipe handling device of claim 25 wherein the magazine and the pipe handling assembly define corresponding apertures and the pipe handling device further comprises a fastener removably received in the corresponding apertures.

27. The pipe handling device of claim 25 wherein the magazine further comprises a handle.

28. The pipe handling device of claim 27 wherein the magazine further comprises opposed ends and wherein the opposed ends define a plurality of recesses for receiving a sling.

29. The pipe handling device of claim 27 wherein the magazine further defines opposing apertures adapted to receive a sling.

30. The pipe handling device of claim 25 wherein the pipe handling device comprises a handle.

31. The pipe handling device of claim 30 wherein the pivot member defines apertures adapted to receive a handle.

32. The pipe handling device of claim 1 further comprising a mounting assembly adapted to removably connect in parallel alignment the pipe handling device to the horizontal boring machine so that the plurality of pipe sections are transported to the horizontal boring machine in alignment with the spindle for ready connection therewith.

33. The pipe handling device of claim 1 wherein the magazine further comprises a removable end adapted to permit access to the plurality of pipe sections through the open end of the magazine and wherein the removable end is reversible and further defines a first side and an inverted second side, the inverted second side adapted to prevent axial movement of the plurality of pipe sections when the reversible end is installed on the magazine with the inverted second side facing inward.

34. The pipe handling device of claim 1 wherein the magazine further comprises a mounting assembly adapted to position the pipe handling assembly laterally adjacent the magazine.

35. The pipe handling device of claim 1 further comprising a friction member adapted to prevent axial sliding of the pipe section during transport and wherein the friction member comprises a roller adapted to permit rotation of the pipe section.

36. The pipe handling device of claim 1 wherein the pipe handling assembly further comprises:
a frame;
wherein the rotation member comprises a pivot member, the pivot member rotatably supportable on the frame;
wherein the pipe holding member is supportable on the pivot member;
wherein the pipe holding member is adapted to receive and release at least one of the plurality of pine sections; and
wherein rotation of the pivot member causes the pipe holding member to shuttle linearly to and from the horizontal boring machine.

37. The pipe handling device of claim 36 further comprising an arm characterized by the ability to operatively connect the pipe holding member to the pivot member.

38. The pipe handling device of claim 37 wherein the pipe holding member comprises an arcuate shaped member.

39. The pipe handling device of claim 37 further comprising a retainer adapted to retain a pipe section in the pipe holding member.

40. The pipe handling device of claim 39 wherein the retainer further comprises a spring adapted to urge the retainer into contact with the pipe section.

41. The pipe handling device of claim 37 wherein the pipe handling assembly further comprises a drive assembly adapted to drive the movement of the arm.

42. The pipe handling device of claim 41 wherein the drive assembly comprises a rack and pinion gear assembly supported on the frame, the rack and pinion gear assembly adapted to extend and retract the arm laterally and perpendicularly to the axis of rotation of the pivot member.

43. The pipe handling device of claim 36 wherein the magazine further comprises an open bottom and a plurality of pipe receiving columns adapted to store the plurality of pipe sections in generally parallel columns and wherein the plurality of pipe sections are accessed through the open bottom.

44. The pipe handling device of claim 43 wherein the magazine further comprises opposing sides defining a plurality of vertical support structures adapted to retain the plurality of pipe sections in vertical columns in the magazine.

45. The pipe handling device of claim 43 further comprising a mounting assembly adapted to connect the pipe handling assembly beneath the magazine and a drive assembly adapted to drive the movement of the arm.

46. The pipe handling device of claim 43 wherein the magazine further comprises a retainer adapted to retain the plurality of pipe sections in the magazine when the magazine is removed from the pipe handling assembly.

47. The pipe handling device of claim 46 wherein the magazine defines an aperture and further comprises a retaining pin removably received in the aperture, the retaining pin adapted to retain the plurality of pipe sections in the magazine when the magazine is removed from the pipe handling assembly.

48. The pipe handling device of claim 36 further comprising a pipe return assembly adapted to return the plurality of pipe sections into the magazine.

49. The pipe handling device of claim 48 wherein the pipe return assembly comprises:
a return arm supported on the frame beneath the magazine, the return arm adapted to lift a pipe section into the magazine; and
a drive assembly adapted to drive the movement of the return arm.

50. The pipe handling device of claim 49 wherein the drive assembly comprises:
a hydraulic cylinder having a piston; and
a link connecting the piston to the return arm;
wherein extension of the piston causes the return arm to lift a pipe section into the magazine and retraction of the piston causes the return arm to lower.

51. The pipe handling device of claim 1 wherein the pipe handling assembly comprises a frame adapted to retract the pipe handling assembly to a position enabling manual loading and unloading of pipe sections to and from the horizontal boring machine.

52. The pipe handling device of claim 1 wherein:
the magazine further defines a removal position and a return position;
the pipe handling assembly is adapted to retrieve pipe sections from the magazine at the removal position and to return pipe sections to the magazine at the return position; and
wherein the plurality of pipe sections fall by gravity from the return position to the removal position.

53. The pipe handling device of claim 52 wherein the magazine further defines a track adapted to guide the plurality of pipe sections from the return position to the removal position.

54. The pipe handling device of claim 53 wherein the track defines a circuitous path.

55. The pipe handling device of claim 53 wherein the track defines a columnar path.

56. The pipe handling device of claim 53 wherein the magazine further comprises a pipe section retainer near the removal position, the pipe section retainer adapted to retain the plurality of pipe sections in the track until the pipe sections are removed from the magazine.

57. The pipe handling device of claim 53 wherein the magazine further comprises:
a plurality of tracks, wherein each of the plurality of tracks has an open base end continuous with the removal position and an open upper end continuous with the return position; and
a track selector mounted near the open upper ends of the plurality of tracks, the track selector adapted to be selectively positioned to guide a pipe section into the selected track as the pipe section falls by gravity from the return position to the removal position.

58. The pipe handling device of claim 57 wherein the magazine further comprises a handle adapted to permit manual positioning of the track selector.

59. The pipe handling device of claim 58 wherein the blocking member defines a convex surface adapted to block the passage of the plurality of pipe sections.

60. The pipe handling device of claim 57 wherein the magazine further comprises a blocking member mounted at the open base end of each of the plurality of tracks, excepting the track nearest the removal position, and wherein the blocking member is adapted to be positioned alternatively to block or to permit the passage of the plurality of pipe sections from the track nearest which it is mounted, so that the plurality of pipe sections first are retrieved from the track nearest the removal position and subsequently retrieved from the remaining plurality of tracks by selectively positioning each of the blocking members.

61. The pipe handling device of claim 60 wherein the magazine further comprises a handle adapted to manually position the blocking members.

62. The pipe handling device of claim 60 wherein the blocking members define a concave surface adapted to block the passage of the plurality of pipe sections.

63. The pipe handling device of claim 62 wherein the blocking member further defines a second concave surface adapted to assist the movement of the pipe sections to the removal position when the blocking member is positioned to permit the passage of the plurality of pipe sections.

64. The pipe handling device of claim 52 wherein the magazine further comprises a pipe protection member adapted to minimize damage to the plurality of pipe sections as they fall by gravity from the return position to the removal position.

65. The pipe handling device of claim 64 wherein the pipe protection member comprises a plurality of rubber straps mounted inside the magazine, the rubber straps adapted to cushion the plurality of pipe sections as they fall by gravity from the return position to the removal position.

66. The pipe handling device of claim 1 wherein the magazine further comprises a frame adapted to store the plurality of pipe sections in an arcuate path.

67. The pipe handling device of claim 66 wherein the magazine further comprises a closed lower end adapted to support the plurality of pipe sections and an open upper end through which pipe sections are removed and returned to the magazine.

68. The pipe handling device of claim 67 wherein the pipe handling assembly comprises:
 a frame;
 a pivot member rotatably supported on the frame for movement between the magazine and the horizontal boring machine; and
 a pipe holding member supported on the pivot member, wherein the pipe holding member is adapted to receive and release at least one of the plurality of pipe sections;
 wherein the pivot member is adapted to remove and return pipe sections to the magazine at any selected position along the arcuate path.

69. The pipe handling device of claim 68 wherein the pipe handling assembly further comprises a drive assembly adapted to rotate the pivot member to position the pipe holding member at any selected position along an arcuate path extending from a first position, wherein the pipe holding member is positioned to receive or release a pipe section at the horizontal boring machine, to a final position, wherein the pipe holding member is positioned to receive or release a pipe section at the closed lower end of the arcuate path.

70. The pipe handling device of claim 1 wherein the magazine further comprises a frame adapted to store the plurality of pipe sections in a stack determined manner.

71. The pipe handling device of claim 70 wherein the width of the magazine is sized to accommodate a plurality of pipe sections side-by-side and the height of the magazine is sized to accommodate a plurality of stacked pipe sections such that the plurality of pipe sections are stored in an interstitial relationship.

72. The pipe handling device of claim 70 wherein the magazine further comprises a base, two sides, and an open top and wherein the pipe handling assembly is positioned above the magazine and returns and retrieves the plurality of pipe sections through the open top of the magazine.

73. The pipe handling device of claim 72 wherein the magazine further comprises corner pieces mounted between the base and each of the sides of the magazine, the corner pieces adapted to strengthen the structural integrity of the magazine.

74. The pipe handling device of claim 70 wherein the pipe handling assembly comprises;
 a frame;
 a pivot member rotatably supported on the frame;
 a pipe holding member supported on the pivot member, wherein the pipe holding member is adapted to receive and release at least one of the plurality of pipe sections; and
 wherein the pivot member is adapted to position the pipe holding member to permit removal and retrieval of the plurality of pipe sections from the magazine in any selected order.

75. The machine of claim 1 wherein the magazine further comprises a removable end adapted to permit access to the plurality of elongate objects through the open end of the magazine and wherein the removable end is reversible and further defines a first side and an inverted second side, the inverted second side adapted to prevent axial movement of the plurality of elongate objects when the reversible end is installed on the magazine with the inverted second side facing inward.

76. A horizontal boring machine having a drill string rotatable about an axis of rotation, and further comprising a pipe handling device for storing and transporting pipe sections to and from the horizontal boring machine, the pipe handling device comprising:
 a magazine adapted to store a plurality of pipe sections near the horizontal boring machine; and
 a pipe handling assembly adapted to transport at least one pipe section between the magazine and the horizontal boring machine, the pipe handling assembly comprising a rotation member and at least one pipe holding member supportable on the rotation member, the pipe holding member adapted to transport at least one pipe section to and from the horizontal boring machine;
 wherein the magazine is adapted to passively position the plurality of pipe sections in the magazine.

77. The horizontal boring machine of claim 76 wherein the pipe handling assembly further comprises:
 a frame; and
 wherein the rotation member comprises a pivot member, the pivot member rotatably supportable supported on the frame;
 wherein the pipe holding member is supportable on the pivot member;

wherein the pipe holding member is adapted to receive and release at least one of the plurality of pipe sections; and wherein rotation of the pivot member causes pivotal movement of the pipe holding member about the pivot member axis and lateral movement between the magazine and the horizontal boring machine.

78. The horizontal boring machine of claim 77 wherein:

the pivot member comprises a shaft rotatably supported on the frame generally parallel with the axis of rotation of the drill string of the horizontal boring machine; and wherein the pipe holding member is supportable on the shaft and adapted for movement between a first position and a second position, wherein in the first position a pipe section is receivable in the pipe holding member and in the second position a pipe section is releasable from the pipe holding member.

79. The horizontal boring machine of claim 78 further comprising a detent device adapted to confine rotation of the shaft between a first position and a second position.

80. The horizontal boring machine of claim 78 wherein the pipe handling assembly further comprises a friction member adapted to prevent axial sliding of the pipe section during transport.

81. The horizontal boring machine of claim 80 wherein the friction member comprises a resilient material.

82. The horizontal boring machine of claim 77 wherein the magazine defines a return position and wherein the pipe holding member is adapted to return the pipe section to the magazine at the return position.

83. The horizontal boring machine of claim 77 wherein the pipe handling assembly further comprises:

a pivot member drive mechanism adapted to rotate the pivot member to position the pipe holding member for receipt and release of a pipe section; and a pipe holding member drive mechanism adapted to drive the movement of the pipe holding member in a direction generally perpendicular to the axis of rotation of the pivot member.

84. The horizontal boring machine of claim 83 wherein the pivot member drive mechanism comprises a hydraulic motor.

85. The horizontal boring machine of claim 83 wherein the pivot member has first and second ends and the pivot member drive mechanism comprises:

a hydraulic cylinder having a piston, the hydraulic cylinder supported on the frame of the pipe handling assembly; and a rotatable arm coupling the piston of the hydraulic cylinder with the pivot member, the arm having a fixed end and a free end;

wherein the fixed end of the arm is rotatably supported at the second end of the shaft;

wherein the piston of the hydraulic cylinder is connectable to the free end of the rotatable arm such that activation of the piston causes rotation of the rotatable arm, thereby rotating the shaft and causing movement of the pipe holding member.

86. The horizontal boring machine of claim 83 wherein the pipe holding member drive mechanism comprises a hydraulic cylinder having a piston, the hydraulic cylinder being mounted on the pivot member, and wherein the pipe holding member is mounted on the piston for movement of the pipe holding member between a retracted position and an extended position.

87. The horizontal boring machine of claim 77 wherein the pivot member further comprises a pivot adjustment assembly adapted to confine the rotation of the pivot member to a predetermined angle.

88. The horizontal boring machine of claim 87 wherein the pivot adjustment assembly comprises:

a pin supported at the one end of the pivot member in axial alignment therewith; and a pivot adjustment stop supported on the pivot member, the pivot adjustment stop defining a stop surface adapted to engage the pin and confine rotation of the pivot member to a predetermined angle.

89. The horizontal boring machine of claim 77 wherein the pipe holding member comprises a gripping member.

90. The horizontal boring machine of claim 89 wherein the gripping member comprises a fixed finger and a movable finger.

91. The horizontal boring machine of claim 90 wherein the movable finger further comprises a biasing member adapted to urge the gripping member into contact with the pipe section to be received and to release the pipe section.

92. The horizontal boring machine of claim 90 wherein the movable finger further comprises a hydraulic cylinder having a piston adapted to actuate the moveable finger to retrieve and release a pipe section.

93. The horizontal boring machine of claim 89 wherein the gripping member further comprises a guide member adapted to ensure movement of the gripping member in a direction perpendicular to the axis of the pivot member.

94. The horizontal boring machine of claim 93 wherein the guide member comprises:

brackets mounted on the hydraulic cylinder; and guide shafts slidably received within the brackets perpendicular to the pivot member.

95. The horizontal boring machine of claim 77 wherein the pipe handling assembly further comprises an extension assembly supported on the pivot member, the extension assembly adapted to move the pipe holding member between an extended position and a retracted position.

96. The horizontal boring machine of claim 95 wherein the extension assembly comprises:

an extension arm supported on the pivot member in axial alignment therewith; and a drive assembly adapted to drive the movement of the extension arm;

wherein the pipe holding member is supported on the extension assembly.

97. The horizontal boring machine of claim 96 wherein the drive assembly comprises:

a hydraulic cylinder having a piston;

wherein the hydraulic cylinder is supported on the pivot member and the extension arm is connected to the piston;

wherein actuation of the hydraulic cylinder affects extension and retraction of the extension arm.

98. The horizontal boring machine of claim 97 wherein the pivot member further comprises a mount tube adapted to mount the hydraulic cylinder of the drive assembly to the pivot member.

99. The horizontal boring machine of claim 96 wherein the extension arm further comprises a guide and the pivot member further comprises a guide housing, the guide housing adapted to receive the guide and ensure movement of the extension arm in a direction perpendicular to the axis of the pivot member.

100. The horizontal boring machine of claim 76 further comprising a mounting assembly adapted to removably connect the magazine to the pipe handling assembly.

101. The horizontal boring machine of claim 100 wherein the magazine and the pipe handling assembly define corresponding apertures and the pipe handling device further comprises a fastener removably received in the corresponding apertures.

102. The horizontal boring machine of claim 100 wherein the pipe handling device comprises a handle.

103. The horizontal boring machine of claim 102 wherein the pivot member defines apertures adapted to receive a handle.

104. The horizontal boring machine of claim 76 further comprising a mounting assembly adapted to removably connect in parallel alignment the pipe handling device to the horizontal boring machine so that the plurality of pipe sections are transported to the horizontal boring machine for ready connection therewith.

105. The horizontal boring machine of claim 76 wherein the magazine further comprises a handle.

106. The horizontal boring machine of claim 105 wherein the magazine further comprises opposed ends and wherein the opposed ends define a plurality of recesses for receiving a sling.

107. The horizontal boring machine of claim 105 wherein the magazine further defines opposing apertures adapted to receive a sling.

108. The horizontal boring machine of claim 76 wherein the magazine further comprises a removable end adapted to permit access to the plurality of pipe sections through the open end of the magazine and wherein the removable end is reversible and further defines a first side and an inverted second side, the inverted second side adapted to prevent axial movement of the plurality of pipe sections when the reversible end is installed on the magazine with the inverted second side facing inward.

109. The horizontal boring machine of claim 76 wherein the magazine further comprises a mounting assembly adapted to position the pipe handling assembly laterally adjacent the magazine.

110. The horizontal boring machine of claim 76 further comprising a friction member adapted to prevent axial sliding of the pipe section during transport and wherein the friction member comprises a roller adapted to permit rotation of the pipe section.

111. The horizontal boring machine of claim 76 wherein the pipe handling assembly further comprises:
a frame;
wherein the rotation member comprises a pivot member, the pivot member rotatably supportable on the frame;
wherein the pipe holding member is supportable on the pivot member;
wherein the pipe holding member is adapted to receive and release at least one of the plurality of pipe sections; and
wherein rotation of the pivot member causes the pipe holding member to shuttle linearly between the magazine and the horizontal boring machine.

112. The horizontal boring machine of claim 111 further comprising an arm characterized by the ability to operatively connect the pipe holding member to the pivot member.

113. The horizontal boring machine of claim 112 wherein the pipe holding member comprises an arcuate shaped member.

114. The horizontal boring machine of claim 112 further comprising a retainer adapted to retain a pipe section in the pipe holding member.

115. The horizontal boring machine of claim 114 wherein the retainer further comprises a spring adapted to urge the retainer into contact with the pipe section.

116. The horizontal boring machine of claim 112 wherein the pipe handling assembly further comprises a drive assembly adapted to drive the movement of the arm.

117. The horizontal boring machine of claim 116 wherein the drive assembly comprises a rack and pinion gear assembly supported on the frame, the rack and pinion gear assembly adapted to extend and retract the arm laterally and perpendicularly to the axis of rotation of the pivot member.

118. The horizontal boring machine of claim 111 wherein the magazine further comprises an open bottom and a plurality of pipe receiving columns adapted to store the plurality of pipe sections in generally parallel columns and wherein the plurality of pipe sections are accessed through the open bottom.

119. The horizontal boring machine of claim 118 wherein the magazine further comprises opposing sides defining a plurality of vertical supported structures adapted to retain the plurality of pipe sections in vertical columns in the magazine.

120. The horizontal magazine of claim 118 further comprising a mounting assembly adapted to connect the pipe handling assembly beneath the boring machine and a drive assembly adapted to drive the movement of the arm.

121. The horizontal boring machine of claim 118 wherein the magazine further comprises a retainer adapted to retain the plurality of pipe sections in the magazine when the magazine is removed from the pipe handling assembly.

122. The horizontal boring machine of claim 121 wherein the magazine defines an aperture and further comprises a retaining pin removably received in the aperture, the retaining pin adapted to retain the plurality of pipe sections in the magazine when the magazine is removed from the pipe handling assembly.

123. The pipe handling device of claim 76 wherein the pipe handling assembly comprises a frame adapted to retract the pipe handling assembly to a position enabling manual loading and unloading of pipe sections to and from the horizontal boring machine.

124. The horizontal boring machine of claim 123 further comprising a pipe return assembly adapted to return the plurality of pipe sections into the magazine.

125. The horizontal boring machine of claim 124 wherein the pipe return assembly comprises:
a return arm supported on the frame beneath the magazine, the return arm adapted to lift a pipe section into the magazine; and
a drive assembly adapted to drive the movement of the return arm.

126. The horizontal boring machine of claim 125 wherein the drive assembly comprises:
a hydraulic cylinder having a piston; and
a link connecting the piston to the return arm;
wherein extension of the piston causes the return arm to lift a pipe section into the magazine and retraction of the piston causes the return arm to lower.

127. The horizontal boring machine of claim 76 wherein:
the magazine further defines a removal position and a return position;
the pipe handling assembly is adapted to retriever pipe sections from the magazine at the removal position and to return pipe sections to the magazine at the return position; and
wherein the plurality of pipe sections fall by gravity from the return position to the removal position.

128. The horizontal boring machine of claim 127 wherein the magazine further defines a track adapted to guide the plurality of pipe sections from the return position to the removal position.

128. The horizontal boring machine of claim 128 wherein the track defines a circuitous path.

130. The horizontal boring machine of claim 128 wherein the track defines a columnar path.

131. The horizontal boring machine of claim 128 wherein the magazine further comprises a pipe section retainer near the removal position, the pipe section retainer adapted to retain the plurality of pipe sections in the track until the pipe sections are removed from the magazine.

132. The horizontal boring machine of claim 128 wherein the magazine further comprises:
   a plurality of tracks, wherein each of the plurality of tracks has an open base end continuous with the removal position and an open upper end continuous with the return position; and
   a track selector mounted near the open upper ends of the plurality of tracks, the track selector adapted to be selectively positioned to guide a pipe section into the selected track as the pipe section falls by gravity from the return position to the removal position.

133. The horizontal boring machine of claim 132 wherein the magazine further comprises a handle adapted to permit manual positioning of the track selector.

134. The horizontal boring machine of claim 133 wherein the blocking member defines a convex surface adapted to block the passage of the plurality of pipe sections.

135. The horizontal boring machine of claim 132 wherein the magazine further comprises a blocking member mounted at the open base end of each of the plurality of tracks, excepting the track nearest the removal position, and wherein the blocking member is adapted to be positioned alternatively to block or to permit the passage of the plurality of pipe sections from the track nearest which it is mounted, so that the plurality of pipe sections first are retrieved from the track nearest the removal position and subsequently retrieved from the remaining plurality of tracks by selectively positioning each of the blocking members.

136. The horizontal boring machine of claim 135 wherein the magazine further comprises a handle adapted to manually position the blocking members.

137. The horizontal boring machine of claim 135 wherein the blocking members define a concave surface adapted to block the passage of the plurality of pipe sections.

138. The horizontal boring machine of claim 137 wherein the blocking member further defines a second concave surface adapted to assist the movement of the pipe sections to the removal position when the blocking member is positioned to permit the passage of the plurality of pipe sections.

139. The horizontal boring machine of claim 127 wherein the magazine further comprises a pipe protection member adapted to minimize damage to the plurality of pipe sections as they fall by gravity from the return position to the removal position.

140. The horizontal boring machine of claim 139 wherein the pipe protection member comprises a plurality of rubber straps mounted inside the magazine, the rubber straps adapted to cushion the plurality of pipe sections as they fall by gravity from the return position to the removal position.

141. The horizontal boring machine of claim 76 wherein the magazine further comprises a frame adapted to store the plurality of pipe sections in an arcuate path.

142. The horizontal boring machine of claim 141 wherein the magazine further comprises a closed lower end adapted to support the plurality of pipe sections and an open upper end through which pipe sections are removed and returned to the magazine.

143. The horizontal boring machine of claim 142 wherein the pipe handling assembly comprises:
   a frame;
   a pivot member rotatably supported on the frame for movement between the magazine and the horizontal boring machine; and
   a pipe holding member supported on the pivot member; wherein the pipe holding member is adapted to receive and release at least one of the plurality of pipe sections;
   wherein the pivot member is adapted to remove and return pipe sections to the magazine at any selected position along the arcuate path.

144. The horizontal boring machine of claim 143 wherein the pipe handling assembly further comprises a drive assembly adapted to rotate the pivot member to position the pipe holding member at any selected position along an arcuate path extending from a first position, wherein the pipe holding member is positioned to receive or release a pipe section at the horizontal boring machine, to a final position, wherein the pipe holding member is positioned to receive or release a pipe section at the closed lower end of the arcuate path.

145. The horizontal boring machine of claim 76 wherein the magazine further comprises a frame adapted to store the plurality of pipe sections in a stack determined manner.

146. The horizontal boring machine of claim 145 wherein the width of the magazine is sized to accommodate a plurality of pipe sections side-by-side and the height of the magazine is sized to accommodate a plurality of stacked pipe sections such that the plurality of pipe sections are stored in an interstitial relationship.

147. The horizontal boring machine of claim 145 wherein the magazine further comprises a base, two sides, and an open top and wherein the pipe handling assembly is positioned above the magazine and returns and retrieves the plurality of pipe sections through the open top of the magazine.

148. The horizontal boring machine of claim 147 wherein the magazine further comprises corner pieces mounted between the base and each of the sides of the magazine, the corner pieces adapted to strengthen the structural integrity of the magazine.

149. The horizontal boring machine of claim 145 wherein the pipe handling assembly comprises;
   a frame;
   a pivot member rotatably supported on the frame;
   a pipe holding member supported on the pivot member, wherein the pipe holding member is adapted to receive and release at least one of the plurality of pipe sections; and
   wherein the pivot member is adapted to position the pipe holding member to permit removal and retrieval of the plurality of pipe sections from the magazine in any selected order.

150. A machine requiring receipt of elongate objects in a generally horizontal position, the machine comprising a handling device for storing and transporting elongate objects to and from the machine, wherein the handling device comprises:
   a magazine adapted to store a plurality of elongate objects near the machine; and
   a handling assembly adapted to transport at least one elongate object between the magazine and the machine, the handling assembly comprising a rotation member and at least one holding member supportable on the rotation member, the holding member adapted to transport at least one elongate object to and from the machine;

wherein the magazine is adapted to passively position the plurality of elongate objects in the magazine.

151. The machine of claim 150 wherein the handling assembly further comprises:

a frame; and wherein the rotation member comprises a pivot member having an axis of rotation, the pivot member rotatably supportable on the frame;

wherein the holding member is supportable on the pivot member;

wherein the holding member is adapted to receive and release at least one of the plurality of elongate objects; and wherein rotation of the pivot member causes pivotal movement of the holding member about the pivot member axis and movement of an elongate object to and from the machine.

152. The machine of claim 151 wherein:

the pivot member comprises a shaft rotatably supportable on the frame;

the holding member is supportable on the shaft and adapted for movement between a first position and a second position, wherein in the first position an elongate object is receivable in the holding member and in the second position an elongate object is releasable from the holding member.

153. The machine of claim 151 wherein the magazine defines a return position and wherein the holding member is adapted to return the elongate object to the magazine at the return position.

154. The machine of claim 151 wherein the handling assembly further comprises:

a pivot member drive mechanism adapted to rotate the pivot member to position the holding member for receipt and release of an elongate object; and a holding member drive mechanism adapted to drive the movement of the holding member in a direction generally perpendicular to the axis of rotation of the pivot member.

155. The machine of claim 154 wherein the pivot member drive mechanism comprises a hydraulic motor.

156. The machine of claim 154 wherein the pivot member has first and second ends and the pivot member drive mechanism comprises:

a hydraulic cylinder having a piston, the hydraulic cylinder supported on the frame of the handling assembly; and a rotatable arm coupling the piston of the hydraulic cylinder with the pivot member, the arm having a fixed end and a free end;

wherein the fixed end of the arm is rotatably supported at the second end of the shaft;

wherein the piston of the hydraulic cylinder is connectable to the free end of the rotatable arm such that activation of the piston causes rotation of the rotatable arm, thereby rotating the shaft and causing movement of the holding member.

157. The machine of claim 154 wherein the holding member drive mechanism comprises a hydraulic cylinder having a piston, the hydraulic cylinder being mounted on the pivot member, and wherein the holding member is mounted on the piston for movement of the holding member between a retracted position and an extended position.

158. The machine of claim 151 wherein the pivot member further comprises a pivot adjustment assembly adapted to confine the rotation of the pivot member to a predetermined angle.

159. The machine of claim 158 wherein the pivot adjustment assembly comprises:

a pin supported at the one end of the pivot member in axial alignment therewith; and a pivot adjustment stop supported on the pivot member, the pivot adjustment stop defining a stop surface adapted to engage the pin and confine rotation of the pivot member to a predetermined angle.

160. The machine of claim 151 wherein the holding member comprises a gripping member.

161. The machine of claim 160 wherein the gripping member comprises a fixed finger and a movable finger.

162. The machine of claim 161 wherein the movable finger further comprises a biasing member adapted to urge the gripping member into contact with the elongate object to be received and to release the elongate object.

163. The machine of claim 161 wherein the movable finger further comprises a hydraulic cylinder having a piston adapted to actuate the moveable finger to retrieve and release an elongate object.

164. The machine of claim 161 further comprising a detent device adapted to confine rotation of the shaft between a first position and a second position.

165. The machine of claim 160 wherein the gripping member further comprises a guide member adapted to ensure movement of the gripping member in a direction perpendicular to the axis of the pivot member.

166. The machine of claim 165 wherein the guide member comprises:

brackets mounted on the hydraulic cylinder; and guide shafts slidably received within the brackets perpendicular to the pivot member.

167. The machine of claim 151 wherein the handling assembly further comprises an extension assembly supported on the pivot member, the extension assembly adapted to move the holding member between an extended position and a retracted position.

168. The machine of claim 167 wherein the extension assembly comprises:

an extension arm supported on the pivot member in axial alignment therewith; and a drive assembly adapted to drive the movement of the extension arm;

wherein the holding member is supported on the extension assembly.

169. The machine of claim 168 wherein the drive assembly comprises:

a hydraulic cylinder having a piston;

wherein the hydraulic cylinder is supported on the pivot member and the extension arm is connected to the piston;

wherein actuation of the hydraulic cylinder affects extension and retraction of the extension arm.

170. The machine of claim 169 wherein the pivot member further comprises a mount tube adapted to mount the hydraulic cylinder of the drive assembly of the extension assembly to the pivot member.

171. The machine of claim 168 wherein the extension arm further comprises a guide and the pivot member further comprises a guide housing, the guide housing adapted to receive the guide and ensure movement of the extension arm in a direction perpendicular to the axis of the pivot member.

172. The machine of claim 150 further comprising a mounting assembly adapted to removably connect the magazine to the handling assembly.

173. The machine of claim 172 wherein the magazine and the handling assembly define corresponding apertures and the machine further comprises a fastener removably received in the corresponding apertures.

174. The machine of claim 172 wherein the magazine further comprises a handle.

175. The machine of claim 174 wherein the magazine further comprises opposed ends and wherein the opposed ends define a plurality of recesses for receiving a sling.

176. The machine of claim 174 wherein the magazine further defines opposing apertures adapted to receive a sling.

177. The machine of claim 172 wherein the pipe handling device of the machine further comprises a handle.

178. The machine of claim 177 wherein the pivot member defines apertures adapted to receive a handle.

179. The machine of claim 150 further comprising a mounting assembly adapted to removably connect the handling assembly to the machine.

180. The machine of claim 150 wherein the magazine further comprises a mounting assembly adapted to position the handling assembly laterally adjacent the magazine.

181. The machine of claim 150 wherein the handling assembly further comprises a friction member adapted to prevent axial sliding of the elongate object.

182. The machine of claim 181 wherein the friction member comprises a resilient material.

183. The machine of claim 150 further comprising a friction member adapted to prevent axial sliding of the elongate object and wherein the friction member comprises a roller adapted to permit rotation of the elongate object.

184. The machine of claim 150 wherein the handling assembly further comprises:
  a frame;
  wherein the rotation member comprises a pivot member, the pivot member rotatably supportable on the frame;
  wherein the holding member is supportable on the pivot member;
  wherein the holding member is adapted to receive and release at least one of the plurality of elongate objects; and
  wherein rotation of the pivot member causes the holding member to shuttle to and from the handling device.

185. The machine of claim 184 further comprising an arm characterized by the ability to operatively connect the holding member to the pivot member.

186. The machine of claim 185 wherein the holding member comprises an arcuate shaped member.

187. The machine of claim 185 further comprising a retainer adapted to retain an elongate object in the holding member.

188. The machine of claim 187 wherein the retainer further comprises a spring adapted to urge the retainer into contact with the elongate object.

189. The machine of claim 185 wherein the handling assembly further comprises a drive assembly adapted to drive the movement of the arm.

190. The machine of claim 189 wherein the drive assembly comprises a rack and pinion gear assembly supported on the frame, the rack and pinion gear assembly adapted to extend and retract the arm laterally and perpendicularly to the axis of rotation of the pivot member.

191. The machine of claim 184 further comprising a pipe return assembly adapted to return the plurality of elongate objects into the magazine.

192. The machine of claim 191 wherein the pipe return assembly comprises:
  a return arm supported on the frame beneath the magazine, the return arm adapted to lift an elongate object into the magazine; and
  a drive assembly adapted to drive the movement of the return arm.

193. The machine of claim 192 wherein the drive assembly comprises:
  a hydraulic cylinder having a piston; and
  a link connecting the piston to the return arm;
  wherein extension of the piston causes the return arm to lift an elongate object into the magazine and retraction of the piston causes the return arm to lower.

194. The machine of claim 150 wherein the handling assembly comprises a frame adapted to retract the handling assembly to a position enabling manual loading and unloading of elongate objects to and from the horizontal boring machine.

195. The machine of claim 150 wherein:
  the magazine further defines a removal position and a return position;
  the handling assembly is adapted to retrieve elongate objects from the magazine at the removal position and returns elongate objects to the magazine at the return position; and
  wherein a plurality of elongate objects fall by gravity from the return position to the removal position.

196. The machine of claim 195 wherein the magazine further defines a track adapted to guide the plurality of elongate objects from the return position to the removal position.

197. The machine of claim 196 wherein the track defines a circuitous path.

198. The machine of claim 196 wherein the track defines a columnar path.

199. The machine of claim 196 wherein the magazine further comprises an elongate object retainer near the removal position, the elongate object retainer adapted to retain the plurality of elongate objects in the track until the elongate objects are removed from the magazine.

200. The machine of claim 196 wherein the magazine further comprises:
  a plurality of tracks, wherein each of the plurality of tracks has an open base end continuous with the removal position and an open upper end continuous with the return position; and
  a track selector mounted near the open upper ends of the plurality of tracks, the track selector adapted to be selectively positioned to guide an elongate object into the selected track as the elongate object falls by gravity from the return position to the removal position.

201. The machine of claim 200 wherein the magazine further comprises a handle adapted to permit manual positioning of the track selector.

202. The machine of claim 201 wherein the blocking member defines a convex surface adapted to block the passage of the plurality of elongate objects.

203. The machine of claim 200 wherein the magazine further comprises a blocking member mounted at the open base end of each of the plurality of tracks, excepting the track nearest the removal position, and wherein the blocking member is adapted to be positioned alternatively to block or to permit the passage of the plurality of elongate objects from the track nearest which it is mounted, so that the plurality of elongate objects first are retrieved from the track nearest the removal position and subsequently retrieved from the remaining plurality of tracks by selectively positioning each of the blocking members.

204. The machine of claim 203 wherein the magazine further comprises a handle adapted to manually position the blocking members.

205. The machine of claim 203 wherein the blocking members define a concave surface adapted to block the passage of the plurality of elongate objects.

206. The machine of claim 205 wherein the blocking member further defines a second concave surface adapted to assist the movement of the elongate objects to the removal position when the blocking member is positioned to permit the passage of the plurality of elongate objects.

207. The machine of claim 195 wherein the magazine further comprises a pipe protection member adapted to minimize damage to the plurality of elongate objects as they fall by gravity from the return position to the removal position.

208. The machine of claim 207 wherein the pipe protection member comprises a plurality of rubber straps mounted inside the magazine, the rubber straps adapted to cushion the plurality of elongate objects as they fall by gravity from the return position to the removal position.

209. The machine of claim 150 wherein the magazine further comprises a frame adapted to store the plurality of elongate objects in an arcuate path.

210. The machine of claim 209 wherein the magazine further comprises a closed lower end adapted to support the plurality of elongate objects and an open upper end through which elongate objects are removed and returned to the magazine.

211. The machine of claim 210 wherein the handling assembly comprises:
 a frame;
 a pivot member rotatably supported on the frame for movement between the magazine and the horizontal boring machine; and
 a holding member supported on the pivot member, wherein the holding member is adapted to receive and release at least one of the plurality of elongate objects;
 wherein the shaft is adapted to remove and return elongate objects to the magazine at any selected position along the arcuate path.

212. The machine of claim 211 wherein the handling assembly further comprises a drive assembly adapted to rotate the pivot member to position the holding member at any selected position along an arcuate path extending from a first position, wherein the holding member is positioned to receive or release an elongate object at the horizontal boring machine, to a final position, wherein the holding member is positioned to receive or release an elongate object at the closed lower end of the arcuate path.

213. The machine of claim 150 wherein the magazine further comprises a frame adapted to store the plurality of elongate objects in a stack.

214. The machine of claim 213 wherein the width of the magazine is sized to accommodate a plurality of elongate objects side-by-side and the height of the magazine is sized to accommodate a plurality of stacked elongate objects such that the plurality of elongate objects are stored in an interstitial relationship.

215. The machine of claim 213 wherein the magazine further comprises a base, two sides, and an open top and wherein the handling assembly is positioned above the magazine and returns and retrieves the plurality of elongate objects through the open top of the magazine.

216. The machine of claim 215 wherein the magazine further comprises corner pieces mounted between the base and each of the sides of the magazine, the corner pieces adapted to strengthen the structural integrity of the magazine.

217. The machine of claim 213 wherein the handling assembly comprises;
 a frame;
 a pivot member rotatably supported on the frame;
 a holding member supported on the pivot member, wherein the holding member is adapted to receive and release at least one of the plurality of elongate objects; and
 wherein the pivot member is adapted to position the holding member to permit removal and retrieval of the plurality of elongate objects from the magazine in any selected order.

218. The machine of claim 150 wherein the magazine further comprises an open bottom and a plurality of pipe receiving columns adapted to store the plurality of elongate objects in generally parallel columns and wherein the plurality of elongate objects are accessed through the open bottom.

219. The machine of claim 218 wherein the magazine further comprises opposing sides defining a plurality of vertical support structures adapted to retain the plurality of elongate objects in vertical columns in the magazine.

220. The machine of claim 218 further comprising a mounting assembly adapted to connect the handling assembly beneath the magazine.

221. The machine of claim 218 wherein the magazine further comprises a retainer adapted to retain the plurality of elongate objects in the magazine when the magazine is removed from the handling assembly.

222. The machine of claim 221 wherein the magazine defines an aperture and further comprises a retaining pin removably received in the aperture, the retaining pin adapted to retain the plurality of elongate objects in the magazine when the magazine is removed from the handling assembly.

223. A pipe handling assembly for use with a horizontal boring machine and a magazine adapted to store a plurality of pipe sections near the horizontal boring machine, the magazine further adapted to passively position the plurality of pipe sections, wherein the pipe handling assembly comprises:
 a frame;
 a transport member movably supportable on the frame and adapted to transport at least one of the plurality of pipe sections;
 at least one pipe holding member supportable on the transport member;
 wherein the pipe holding member is adapted to receive and release at least one of the plurality of pipe sections; and
 wherein the movement of the transport member causes the pipe holding member to linearly to and from the horizontal boring machine.

224. The pipe handling assembly of claim 223 wherein the transport member comprises a rotation member and wherein rotation of the rotation member causes the pipe holding member to shuttle to and from the horizontal boring machine.

225. The pipe handling assembly of claim 223 further comprising an arm characterized by the ability to operatively connect the pipe holding member to the transport member.

226. The pipe handling assembly of claim 225 wherein the arm comprises the pipe holding member.

227. The pipe handling assembly of claim 226 wherein the pipe holding member comprises an arcuate-shaped member.

228. The pipe handling assembly of claim 226 further comprising a retainer adapted to retain a pipe section in the pipe holding member.

229. The pipe handling assembly of claim 228 wherein the retainer comprises a spring adapted to urge the retainer into contact with the pipe section being transported.

230. The pipe handling assembly of claim 223 wherein the transport member is adapted to retract the holding member to a position enabling manual loading and unloading of pipe sections to and from the horizontal boring machine.

231. The pipe handling assembly of claim 223 further comprising a drive assembly adapted to drive the movement of the transport member.

232. The pipe handling assembly of claim 231 wherein the drive assembly comprises a rack and pinion gear assembly supported on the frame, the rack and pinion gear assembly adapted to laterally extend and retract the transport member with respect to the boring machine.

233. The pipe handling assembly of claim 223 further comprising a pipe return assembly adapted to return at least one of the plurality of pipe sections into the magazine.

234. The pipe handling assembly of claim 233 wherein the pipe return assembly comprises:

a return arm supported on the frame; and a drive assembly adapted to drive the movement of the return arm;

wherein when the pipe handling assembly is assembled with the magazine, the return arm is adapted to lift a pipe section into the magazine.

235. The pipe handling assembly of claim 234 wherein the drive assembly comprises:

a hydraulic cylinder having a piston; and a link connecting the piston to the return arm wherein extension of the piston causes the return arm to lift a pipe section into the magazine and retraction of the piston causes the return arm to lower.

236. The machine of claim 233 wherein the pipe return assembly comprises:

a return arm positionable beneath the magazine; and an extendable and retractable piston operative connectable to the return;

wherein the extension and retraction of the piston causes the return arm to raise and lower at least one of the plurality of pipe sections into the magazine or from the magazine.

237. A method for handling a plurality of pipe sections at a horizontal boring site and for use with a horizontal boring machine having a connecting position for connecting at least one of the plurality of pipe sections, the method comprising the steps of:

storing the plurality of pipe sections in a storage position adjacent to the horizontal boring machine;

during the boring phase, delivering at least one of the plurality of pipe sections from the storage position to a receiving position laterally adjacent the connecting position; and transferring the delivered pipe section from the receiving position to the connecting position of the horizontal boring machine;

wherein transfer of the delivered pipe section is carried out exclusively by linear movement of the delivered pipe section between the receiving position and the connecting position.

238. The method of claim 237 wherein the step of transferring the delivered pipe section from the receiving position to the connecting position of the horizontal boring machine is carried out by shuttling action.

239. The method of claim 237 wherein the steps of delivery and transfer of at least one of the plurality of pipe sections are repeated until the boring phase is completed.

240. The method of claim 237 further comprising the step of withdrawing the plurality of pipe sections from the connecting area of the horizontal boring machine.

241. The method of claim 240 wherein the step of withdrawing the plurality of pipe sections comprises the steps of:

transferring a pipe section from the connecting position of the horizontal boring machine to the receiving position; and returning the pipe section to the storage position.

242. The method of claim 241 further comprising the step of repeatedly transferring withdrawn pipe sections to the receiving position and returning the withdrawn pipe sections to the storage position until the withdrawal phase is completed.

243. The method of claim 241 wherein the step of returning the pipe sections to the storage location is carried out by lifting the pipe sections from the receiving position into the storage position.

244. The method of claim 237 further comprising the steps of storing a plurality of groups of pipe sections near the horizontal boring machine and positioning the groups sequentially near the boring machine for delivery and transport to the horizontal boring machine.

245. The method of claim 237 wherein the step of delivering at least one of the plurality of pipe sections from the storage position to the receiving position is performed passively.

* * * * *

UNITED STATES PATENT AND TRADEMARK OFFICE
CERTIFICATE OF CORRECTION

PATENT NO.   : 6,085,852
DATED        : July 11, 2000
INVENTOR(S)  : Darrel W. Sparks, Richard W. McEwen, Arthur D. Deken, Cody L. Sewell, Ronald A. Frazier, James E. Franklin, Kevin L. Smith and David R. Payne It is certified that error appears in the above-identified patent and that said Letters Patent is hereby corrected as shown below:

Title page,
Under the Inventors, add David R. Payne, Perry

Column 1,
Line 66, after "view" delete "of".

Column 4,
Line 47, delete "tits" and substitute therefor -- this --.

Column 17,
Line 65, delete "oil" and substitute therefor -- on --.

Column 21,
Line 31, delete "pine" and substitute therefor -- pipee --.

Column 28,
Line 22, delete "boring machine" and substitute therefor -- magazine --.

Column 33,
Line 28, delete "150" and substitute therfor -- 152 --.
Line 48, after "shuttle" insert -- linearly --.

Column 35,
Line 60, after "stack" insert -- determined manner --.

UNITED STATES PATENT AND TRADEMARK OFFICE
CERTIFICATE OF CORRECTION

PATENT NO. : 6,085,852
DATED : July 11, 2000
INVENTOR(S) : Darrel W. Sparks, Richard W. McEwen, Arthur D. Deken, Cody L. Sewell, Ronald A. Frazier, James E. Franklin, Kevin L. Smith and David R. Payne It is certified that error appears in the above-identified patent and that said Letters Patent is hereby corrected as shown below:

Column 36,
Line 59, after "member to" insert -- shuttle --.

Signed and Sealed this

Ninth Day of October, 2001

*Attest:*

NICHOLAS P. GODICI
*Attesting Officer*     *Acting Director of the United States Patent and Trademark Office*

EX PARTE REEXAMINATION CERTIFICATE (5590th)
United States Patent
Sparks et al.

(10) Number: US 6,085,852 C1
(45) Certificate Issued: Oct. 31, 2006

(54) PIPE HANDLING DEVICE

(75) Inventors: Darrel W. Sparks, Perry, OK (US);
Richard W. McEwen, Coyle, OK (US);
Arthur D. Deken, Perry, OK (US);
Cody L. Sewell, Perry, OK (US);
Ronald A. Frazier, Perry, OK (US);
James E. Franklin, Perry, OK (US);
Kevin L. Smith, Perry, OK (US);
David R. Payne, Perry, OK (US)

(73) Assignee: The Charles Machine Works, Inc., Perry, OK (US)

Reexamination Request:
No. 90/005,948, Mar. 6, 2001
No. 90/006,251, Mar. 19, 2002

Reexamination Certificate for:
Patent No.: 6,085,852
Issued: Jul. 11, 2000
Appl. No.: 08/624,240
Filed: Mar. 29, 1996

Certificate of Correction issued Oct. 9, 2001.

Related U.S. Application Data

(63) Continuation-in-part of application No. 08/532,354, filed on Sep. 22, 1995, now abandoned, which is a continuation-in-part of application No. 08/392,072, filed on Feb. 22, 1995, now abandoned.

(51) Int. Cl.
*E21B 19/14* (2006.01)

(52) U.S. Cl. .......................... 175/52; 175/85; 173/164; 414/22.54; 414/22.58

(58) Field of Classification Search .................. None
See application file for complete search history.

(56) References Cited

U.S. PATENT DOCUMENTS 924,407 A   6/1909  Whitcomb
1,183,279 A 5/1916  Degenhardt (Continued)

FOREIGN PATENT DOCUMENTS

DE          2129701       8/1973

(Continued)

OTHER PUBLICATIONS

"Vermeer D50 Parts Manual", Vermeer Manufacturing Co., machine publicly shown Sep. 1995, pp. 7–2, 7–3, 7–5 and 7–7.

(Continued)

*Primary Examiner*—Hoang Dang

(57) ABSTRACT

An automatic pipe handling device (10) is disclosed which includes a support frame (12) mounted on a boring device (14). Removable pipe racks (16, 80, 130, 140) can be placed in position on the support frame (12) to deliver pipe to the spindle axis or to remove pipe therefrom as required. The pipe sections are removed from the pipe rack and positioned on the spindle axis by pipe grippers (32) mounted on hydraulic cylinders (28, 30) mounted on a rotating longitudinal shaft (20). The grippers and shaft similarly return the used pipe sections for storage to the pipe rack. In one pipe rack (16) an S-shaped guide path (72) is used. In another pipe rack (80) a plurality of rows (88, 90, 92) of pipe sections are used.

In another embodiment, pipe is stored in an arcuate path. Pipe grippers (32) may be pivoted to any selected position along the arc extending from a first position (178) for connecting to or receiving pipe from the boring device, to a final position (180) where the pipe grippers (32) are positioned to pick up the last pipe in the arc.

In another embodiment, pipe is stored in a self-leveling arrangement beneath a pipe loader (256). The pipe loader is mounted on a rotation member (236) which, in combination with extension cylinders (244), rotates and extends pipe grippers (256) to access any selected pipe section stored in the self-leveling arrangement.

In another embodiment, pipe section (18) are stored horizontally in columns (430) above a pipe handling assembly (416) which shuttles pipe sections between the boring device and the storage area. The pipe handling assembly (416) has arms which extend and retract between the spindle line of the boring device and the columns of pipe sections.

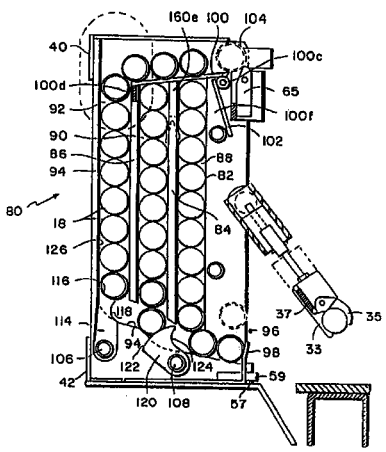

U.S. PATENT DOCUMENTS

| | | | |
|---|---|---|---|
| 2,507,040 A | 5/1950 | Moore | 211/60 |
| 2,780,376 A | 2/1957 | Sanders | 214/519 |
| 2,972,388 A | 2/1961 | Thornburg | 175/52 |
| 3,025,918 A | 3/1962 | Leven | 175/52 |
| 3,034,668 A | 5/1962 | Wicks | 214/83.1 |
| 3,061,011 A | 10/1962 | Paget | 166/77.5 |
| 3,089,549 A | 5/1963 | Robbins | 175/85 |
| 3,145,786 A | 8/1964 | O'Neill et al. | 175/85 |
| 3,151,747 A | 10/1964 | McGoogan | 214/1 |
| 3,177,944 A | 4/1965 | Knights | 166/77.5 |
| 3,181,630 A | 5/1965 | Coburn | 175/85 |
| 3,286,777 A | 11/1966 | Gyongyosi | 175/52 |
| 3,315,822 A | 4/1967 | Wilson | 214/2.5 |
| 3,336,991 A | 8/1967 | Klem et al. | 175/85 |
| RE26,284 E | 10/1967 | O'Neill et al. | 175/57 |
| 3,420,319 A | 1/1969 | Lincoln et al. | 175/52 |
| 3,478,632 A | 11/1969 | Schmermund | 83/105 |
| 3,493,061 A | 2/1970 | Gyongyosi | 175/52 |
| 3,499,498 A | 3/1970 | Bromell et al. | 175/85 |
| 3,501,017 A | 3/1970 | Johnson et al. | 211/60 |
| 3,501,027 A | 3/1970 | Dea et al. | 214/16 |
| 3,514,962 A | 6/1970 | Poole | 61/72.3 |
| 3,612,286 A | 10/1971 | Langowski et al. | 211/60 |
| 3,655,071 A | 4/1972 | Langowski et al. | 214/2.5 |
| 3,664,439 A | 5/1972 | Council | 175/85 |
| 3,680,412 A | 8/1972 | Mayer et al. | 81/57.34 |
| 3,701,435 A | 10/1972 | Woolslayer et al. | 211/60 |
| 3,706,347 A | 12/1972 | Brown | 175/85 |
| 3,708,024 A | 1/1973 | Back | 175/52 |
| 3,734,208 A | 5/1973 | Otto | 175/52 |
| 3,734,209 A | 5/1973 | Haisch et al. | 175/57 |
| 3,734,210 A | 5/1973 | Wilderman | 175/85 |
| 3,734,211 A | 5/1973 | Haisch et al. | 175/85 |
| 3,741,322 A | 6/1973 | Wolters | 175/52 |
| 3,768,663 A | 10/1973 | Turner, Jr. et al. | 211/60 |
| 3,780,883 A | 12/1973 | Brown | 214/2.5 |
| 3,792,783 A | 2/1974 | Brown | 214/2.5 |
| 3,795,326 A | 3/1974 | Neilon et al. | 214/2.5 |
| 3,799,364 A | 3/1974 | Kelly et al. | 214/2.5 |
| 3,800,980 A | 4/1974 | Takeuchi et al. | |
| 3,815,757 A | 6/1974 | Woolslayer | 211/60 |
| 3,828,943 A | 8/1974 | Simon | 214/2.5 |
| 3,835,938 A | 9/1974 | Moody et al. | 175/52 |
| 3,840,079 A | 10/1974 | Williamson | 175/61 |
| 3,844,420 A | 10/1974 | Walling et al. | 214/1 |
| 3,870,165 A | 3/1975 | Besijn | 214/2.5 |
| 3,874,518 A | 4/1975 | Swoboda, Jr. et al. | 214/1 |
| 3,887,086 A | 6/1975 | Woolslayer et al. | 214/2.5 |
| 3,888,538 A | 6/1975 | McWilliams | 296/3 |
| 3,913,753 A | 10/1975 | Swartz et al. | |
| 3,913,754 A | 10/1975 | Swartz et al. | 214/2.5 |
| 3,916,500 A | 11/1975 | Brown | 29/240 |
| 3,937,334 A | 2/1976 | Bleyl et al. | 214/2.5 |
| 3,956,901 A | 5/1976 | Brown | 61/72.1 |
| 3,961,673 A | 6/1976 | Wolters et al. | |
| 3,965,997 A | 6/1976 | Hilding et al. | 175/65 |
| 3,972,407 A | 8/1976 | Kushigian | |
| 3,977,480 A | 8/1976 | Hilding | 175/85 |
| 3,978,994 A | 9/1976 | Woolslayer et al. | 214/2.5 |
| 3,985,189 A | 10/1976 | Jahnke et al. | |
| 3,986,569 A | 10/1976 | Hilding et al. | 175/52 |
| 3,986,618 A | 10/1976 | Woolslayer et al. | 214/1 |
| RE29,020 E | 11/1976 | Moody et al. | 175/52 |
| 3,994,350 A | 11/1976 | Smith et al. | 175/85 |
| 4,000,818 A | 1/1977 | Schmid et al. | 214/1 |
| 4,002,248 A | 1/1977 | Moller | 214/1 |
| 4,049,065 A | 9/1977 | Walter | 175/52 |
| 4,050,590 A | 9/1977 | Benjamin | 214/2.5 |
| 4,051,956 A | 10/1977 | Teague | 214/1 |
| 4,061,233 A | 12/1977 | Benjamin | 214/2.5 |
| 4,067,453 A | 1/1978 | Moller | 214/2.5 |
| 4,077,525 A | 3/1978 | Callegari et al. | |
| 4,081,087 A | 3/1978 | Freeman, Sr. | 214/2.5 |
| 4,093,082 A | 6/1978 | Goodsell | 214/1 |
| 4,129,221 A | 12/1978 | Moller | 214/2.5 |
| 4,163,625 A | 8/1979 | Jenkins | 414/22 |
| 4,165,690 A | 8/1979 | Abrahams | 102/22 |
| 4,191,415 A | 3/1980 | Frei | 294/67 |
| 4,202,653 A | 5/1980 | Moller | 414/22 |
| 4,258,796 A | 3/1981 | Horning et al. | 175/52 |
| 4,269,554 A | 5/1981 | Jackson | |
| 4,335,792 A | 6/1982 | Mahan | 175/52 |
| 4,345,864 A | 8/1982 | Smith, Jr. et al. | 414/22 |
| 4,364,464 A | 12/1982 | Manservisi et al. | |
| 4,368,873 A | 1/1983 | Perry | 254/29 |
| 4,379,676 A | 4/1983 | Frias | 414/748 |
| 4,380,297 A | 4/1983 | Frias | |
| 4,382,591 A | 5/1983 | Minnis et al. | 269/156 |
| 4,388,039 A | 6/1983 | Schwarze | |
| 4,426,182 A | 1/1984 | Frias et al. | 414/22 |
| 4,437,218 A | 3/1984 | Pridy | 29/240 |
| 4,439,091 A | 3/1984 | Frias | 414/745 |
| 4,445,579 A | 5/1984 | Bello | |
| 4,470,740 A | 9/1984 | Frias | 414/22 |
| 4,474,520 A | 10/1984 | Buckner et al. | 414/22 |
| 4,475,604 A | 10/1984 | Albertson et al. | 175/85 |
| 4,486,137 A | 12/1984 | Buckner | 414/22 |
| 4,501,524 A | 2/1985 | Yoan et al. | 414/22 |
| 4,531,875 A | 7/1985 | Krueger | 414/22 |
| 4,547,109 A | 10/1985 | Young et al. | 414/22 |
| 4,547,110 A | 10/1985 | Davidson | 414/22 |
| 4,591,006 A | 5/1986 | Hutchison et al. | 175/52 |
| 4,591,007 A | 5/1986 | Shaginian et al. | 175/85 |
| 4,600,120 A | 7/1986 | Sabo et al. | 221/107 |
| 4,621,974 A | 11/1986 | Krueger | 414/786 |
| 4,632,618 A | 12/1986 | Issakainen | |
| 4,650,235 A | 3/1987 | Shaginian et al. | 294/88 |
| 4,696,207 A | 9/1987 | Boyadjieff | 81/57.34 |
| 4,708,563 A | 11/1987 | Van Den Berg et al. | 414/22 |
| 4,738,321 A | 4/1988 | Olivier | 175/85 |
| 4,765,401 A | 8/1988 | Boyadjieff | 166/77 |
| 4,854,400 A | 8/1989 | Simpson | 175/85 |
| 4,858,980 A | 8/1989 | Dreisig et al. | |
| 4,862,973 A | 9/1989 | Voigts et al. | 175/52 |
| 4,892,160 A | 1/1990 | Schivley, Jr. et al. | 175/85 |
| 4,897,009 A | 1/1990 | Powell | 414/22.66 |
| 4,899,832 A | 2/1990 | Bierscheid, Jr. | 173/23 |
| 4,901,805 A | 2/1990 | Ali-Zade et al. | 175/85 |
| 4,932,537 A | 6/1990 | Martinsen | 211/70.4 |
| 5,018,588 A | 5/1991 | Haberer | 173/22 |
| 5,116,164 A | 5/1992 | Casagrande | 405/303 |
| 5,129,764 A | 7/1992 | Casagrande | 405/303 |
| 5,174,389 A | 12/1992 | Hansen | 175/52 |
| 5,188,503 A | 2/1993 | Appelberg | 414/745.1 |
| 5,244,329 A | 9/1993 | McGill et al. | 414/22.63 |
| 5,246,138 A | 9/1993 | Blevins, Jr. | 221/191 |
| 5,259,723 A | 11/1993 | Willis et al. | 414/746.4 |
| 5,294,228 A | 3/1994 | Willis et al. | 414/22.55 |
| 5,303,783 A | 4/1994 | Begnaud et al. | 175/53 |
| 5,358,371 A | 10/1994 | Neddo | 414/745.5 |
| 5,423,390 A | 6/1995 | Donnally et al. | 175/85 |
| 5,437,527 A | 8/1995 | McGill et al. | 414/22.51 |
| 5,445,032 A * | 8/1995 | Dixon | 73/788 |
| 5,458,454 A | 10/1995 | Sorokan | 414/786 |
| 5,522,699 A | 6/1996 | Smith | 405/154 |
| 5,556,253 A * | 9/1996 | Rozendaal et al. | 414/797.7 |
| 5,575,344 A | 11/1996 | Wireman | 175/85 |
| 5,584,351 A | 12/1996 | Ellicott | 175/62 |
| 5,607,280 A * | 3/1997 | Rozendaal | 414/745.7 |
| 5,620,299 A | 4/1997 | Grabovsky et al. | 414/745.7 |
| 5,687,804 A | 11/1997 | Lappalainen et al. | 175/52 |

| | | | |
|---|---|---|---|
| 5,707,175 A | 1/1998 | Geelhoed | 405/180 |
| 5,762,150 A | 6/1998 | Cheng et al. | 175/52 |
| 5,816,774 A | 10/1998 | Stolzer et al. | 414/792.8 |
| 5,941,324 A | 8/1999 | Bennett | 175/85 |
| 5,954,209 A | 9/1999 | Wurm et al. | 211/70.4 |
| 5,996,710 A | 12/1999 | Jansson et al. | 175/52 |
| 6,074,153 A | 6/2000 | Allen | 414/22.53 |
| 6,089,333 A | 7/2000 | Rise | 175/85 |

FOREIGN PATENT DOCUMENTS

| | | |
|---|---|---|
| DE | 7412313 | 8/1974 |
| DE | 109 915 | 11/1974 |
| DE | 2506362 | 8/1976 |
| DE | 2533621 | 2/1977 |
| DE | 130676 | 4/1978 |
| DE | 2721342 | 11/1978 |
| DE | 2745858 * | 4/1979 |
| DE | 2803831 | 8/1979 |
| DE | 3108053 | 9/1982 |
| DE | 3244896 | 6/1984 |
| DE | 239974 | 10/1986 |
| DE | 3609697 | 10/1987 |
| DE | 3738116 | 5/1989 |
| DE | 3819537 | 8/1990 |
| DE | 3928619 | 3/1991 |
| DE | 41 01 809 C1 | 5/1992 |
| DE | 92 08 747 | 10/1992 |
| DE | 19610883 | 9/1997 |
| DE | 19701172 | 11/1998 |
| DE | 69229748 | 3/2000 |
| EP | 0171368 | 2/1986 |
| EP | 0174055 | 3/1986 |
| EP | 0182500 | 5/1986 |
| EP | 0199664 | 10/1986 |
| EP | 0258705 | 3/1988 |
| EP | 0 548 900 A2 | 6/1993 |
| EP | 0819820 | 1/1998 |
| EP | 0860580 | 8/1998 |
| EP | 0860581 | 8/1998 |
| EP | 0731251 | 8/1999 |
| FR | 2293156 | 7/1976 |
| FR | 0040576 | 11/1981 |
| FR | 2544789 | 10/1984 |
| GB | 1 357 608 | 6/1974 |
| GB | 2047306 | 11/1980 |
| GB | 2083106 | 3/1982 |
| GB | 2155974 | 10/1985 |
| GB | 2219613 | 12/1989 |
| GB | 2231900 | 11/1990 |
| JP | 5237376 | 3/1977 |
| JP | 5661235 | 5/1981 |
| JP | 6480698 | 3/1989 |
| JP | 2-213586 | 8/1990 |
| JP | 3275895 | 12/1991 |
| JP | 4269295 | 9/1992 |
| JP | 4-367421 | 12/1992 |
| JP | 552086 | 3/1993 |
| JP | 5118037 | 5/1993 |
| JP | 5171894 | 7/1993 |
| JP | 5195683 | 8/1993 |
| JP | 5302488 | 11/1993 |
| JP | 129186 * | 5/1994 |
| JP | 6-129186 | 5/1994 |
| JP | 6235216 | 8/1994 |
| JP | 6317082 | 11/1994 |
| JP | 742472 | 2/1995 |
| JP | 7238774 | 9/1995 |
| JP | 8189278 | 7/1996 |
| JP | 10196280 | 7/1998 |
| RU | 1602686 * | 10/1990 |
| SE | 7403123 | 3/1975 |
| SU | 427138 | 5/1974 |
| SU | 446625 | 10/1974 |
| SU | 560974 | 6/1977 |
| SU | 583280 | 12/1977 |
| SU | 587043 | 1/1978 |
| SU | 622637 | 9/1978 |
| SU | 642465 | 1/1979 |
| SU | 643620 | 1/1979 |
| SU | 677871 | 8/1979 |
| SU | 682634 | 8/1979 |
| SU | 682636 | 8/1979 |
| SU | 701762 | 12/1979 |
| SU | 726300 | 4/1980 |
| SU | 739212 | 6/1980 |
| SU | 757682 | 8/1980 |
| SU | 768928 | 10/1980 |
| SU | 768934 | 10/1980 |
| SU | 781318 | 11/1980 |
| SU | 825845 | 4/1981 |
| SU | 829856 | 5/1981 |
| SU | 874962 | 10/1981 |
| SU | 876368 | 10/1981 |
| SU | 901462 | 1/1982 |
| SU | 901463 | 1/1982 |
| SU | 944869 | 7/1982 |
| SU | 985245 | 12/1982 |
| SU | 985246 | 12/1982 |
| SU | 1013206 | 4/1983 |
| SU | 1044569 | 9/1983 |
| SU | 1052645 | 11/1983 |
| SU | 1059121 | 12/1983 |
| SU | 1063979 | 12/1983 |
| SU | 1099041 | 6/1984 |
| SU | 1121381 | 10/1984 |
| SU | 1141182 | 2/1985 |
| SU | 1204526 | 1/1986 |
| SU | 1234574 | 5/1986 |
| SU | 1250441 | 8/1986 |
| SU | 1257160 | 9/1986 |
| SU | 1270289 | 11/1986 |
| SU | 1305-002 A | 4/1987 |
| SU | 1313645 | 5/1987 |
| SU | 1414560 | 8/1988 |
| SU | 1421492 | 9/1988 |
| SU | 1445-907 A | 12/1988 |
| SU | 1461831 | 2/1989 |
| SU | 1488432 | 6/1989 |
| SU | 1497138 A1 | 7/1989 |
| SU | 1497138 | 7/1989 |
| SU | 1602686 | 10/1990 |
| SU | 1627367 | 2/1991 |
| SU | 1681002 | 9/1991 |
| SU | 1730422 | 4/1992 |
| SU | 1779541 | 12/1992 |
| SU | 583280 | 12/1997 |
| WO | 8401599 | 4/1984 |
| WO | WO 95/00737 | 1/1995 |
| WO | WO 95/10687 | 4/1995 |
| WO | 0075479 | 12/2000 |

OTHER PUBLICATIONS

"Vermeer D24/40 Part Manual", Vermeer Manufacturing Co., machine publicly shown Sep. 1995, pp. 10–2 through 10–4.

"The Underground", The Charles Machine Works, Inc., Summer 1993, cover page and pp. 2–3.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 66–74, 142–150, 210–217 and 244 are cancelled.

Claims 1, 10, 21, 36, 76, 85, 96, 111, 127, 151, 156, 168, 172, 178–180, 183, 184, 194, 195, 209, 218, 223, 224, 232, 233, 237 and 240 are determined to be patentable as amended.

Claims 2–9, 11–20, 22–35, 37–65, 75, 77–84, 86–95, 97–110, 112–126, 128–141, 152–155, 157–167, 169–171, 173–177, 181, 182, 185–193, 196–208, 219–222, 225–231, 234–236, 238, 239, 241–243 and 245, dependent on an amended claim, are determined to be patentable.

1. A pipe handling device for storing and transporting pipe sections to and from a horizontal boring machine having a drill string rotatable about an axis of rotation, the pipe handling device comprising:

a magazine *comprising a plurality of pipe receiving columns and* adapted to store a plurality of pipe sections *in generally parallel columns* near the horizontal boring machine; and a pipe handling assembly adapted to transport at least one pipe section between the magazine and the horizontal boring machine, the pipe handling assembly comprising a rotation member and at least one pipe holding member supportable on the rotation member, the pipe holding member adapted to transport at least one pipe section to and from the horizontal boring machine;

wherein the magazine is adapted to passively position the plurality of pipe sections in the *columns of the* magazine.

10. [The] *A* pipe handling device [of claim 8] *for storing and transporting pipe sections to and from a horizontal boring machine having a drill string rotatable about an axis of rotation, the pipe handling device comprising:*

*a magazine adapted to store a plurality of pipe sections near the horizontal boring machine; and*

*a pipe handling assembly adapted to transport at least one pipe section between the magazine and the horizontal boring machine, the pipe handling assembly comprising a frame, a rotation member and at least one pipe holding member supportable on the rotation member, the pipe holding member adapted to transport at least one pipe section to and from the horizontal boring machine;*

*wherein the magazine is adapted to passively position the plurality of pipe sections in the magazine;*

*wherein the rotation member comprises a pivot member having an axis of rotation, the pivot member rotatably supportable on the frame;*

*wherein the pipe holding member is supportable on the pivot member;*

*wherein the pipe holding member is adapted to receive and release at least one of the plurality of pipe sections; and*

*wherein rotation of the pivot member causes pivotal movement of the pipe holding member about the pivot member axis and movement of a pipe section to and from the horizontal boring machine;* wherein the pipe handling assembly further comprises:

a pivot member drive mechanism adapted to rotate the pivot member to position the pipe holding member for receipt and release of a pipe section; and a pipe holding member drive mechanism adapted to drive the movement of the pipe holding member in a direction generally perpendicular to the axis of rotation of the pivot member; and wherein the pivot member has first and second ends and the pivot member drive mechanism comprises:

a hydraulic cylinder having a piston, the hydraulic cylinder supported on the frame of the pipe handling assembly; and a rotatable arm coupling the piston of the hydraulic cylinder with the pivot member, the arm having a fixed end and a free end;

wherein the fixed end of the arm is rotatably supported at the second end of the [shaft] *pivot member*;

wherein the piston of the hydraulic cylinder is connectable to the free end of the rotatable arm such that activation of the piston causes rotation of the rotatable arm, thereby rotating the [shaft] *pivot member* and causing movement of the pipe holding member.

21. [The] *A* pipe handling device [of claim 20] *for storing and transporting pipe sections to and from a horizontal boring machine having a drill string rotatable about an axis of rotation, the pipe handling device comprising:*

*a magazine adapted to store a plurality of pipe sections near the horizontal boring machine; and*

*a pipe handling assembly adapted to transport at least one pipe section between the magazine and the horizontal boring machine, the pipe handling assembly comprising a frame, a rotation member, and at least one pipe holding member supportable on the rotation member, the pipe holding member adapted to transport at least one pipe section to and from the horizontal boring machine;*

*wherein the magazine is adapted to passively position the plurality of pipe sections in the magazine;*

*wherein the rotation member comprises a pivot member having an axis of rotation, the pivot member rotatably supportable on the frame;*

*wherein the pipe holding member is supportable on the pivot member;*

*wherein the pipe holding member is adapted to receive and release at least one of the plurality of pipe sections; and*

*wherein rotation of the pivot member causes pivotal movement of the pipe holding member about the pivot member axis and movement of a pipe section to and from the horizontal boring machine;*

*wherein the pipe handling assembly further comprises an extension assembly supported on the pivot member, the extension assembly adapted to move the pipe holding member between an extended portion and a retracted position; and* wherein the extension assembly comprises:
  an extension arm supported on the pivot member in axial alignment therewith; and
  a drive assembly adapted to drive the movement of the extension arm;
  wherein the pipe holding member is supported on the extension assembly.

36. [The] *A* pipe handling device [of claim 1] *for storing and transporting pipe sections to and from a horizontal boring machine having a drill string rotatable about an axis of rotation, the pipe handling device comprising:*
  *a magazine adapted to store a plurality of pipe sections near the horizontal boring machine; and*
  *a pipe handling assembly adapted to transport at least one pipe section between the magazine and the horizontal boring machine, the pipe handling assembly comprising a rotation member and at least one pipe holding member supportable on the rotation member, the pipe holding member adapted to transport at least one pipe section to and from the horizontal boring machine;*
  *wherein the magazine is adapted to passively position the plurality of pipe sections in the magazine;*
  wherein the pipe handling assembly further comprises:
    a frame;
    wherein the rotation member comprises a pivot member, the pivot member rotatably supportable on the frame;
    wherein the pipe holding member is supportable on the pivot member;
    wherein the pipe holding member is adapted to receive and release at least one of the plurality of pipee sections; and
    wherein rotation of the pivot member causes the pipe holding member to shuttle linearly to and from the horizontal boring machine.

76. A horizontal boring machine having a drill string rotatable about an axis of rotation, and further comprising a pipe handling device for storing and transporting pipe sections to and from the horizontal boring machine, the pipe handling device comprising:
  a magazine *comprising a plurality of pipe receiving columns and* adapted to store a plurality of pipe sections *in generally parallel columns* near the horizontal boring machine; and
  a pipe handling assembly adapted to transport at least one pipe section between the magazine and the horizontal boring machine, the pipe handling assembly comprising a rotation member and at least one pipe holding member supportable on the rotation member, the pipe holding member adapted to transport at least one pipe section to and from the horizontal boring machine;
  wherein the magazine is adapted to passively position the plurality of pipe sections in the *columns of the* magazine.

85. [The] *A* horizontal boring machine [of claim 83] *having a drill string rotatable about an axis of rotation, and further comprising a pipe handling device for storing and transporting pipe sections to and from the horizontal boring machine, the pipe handling device comprising:*
  *a magazine adapted to store a plurality of pipe sections near the horizontal boring machine; and*
  *a pipe handling assembly adapted to transport at least one pipe section between the magazine and the horizontal boring machine, the pipe handling assembly comprising a frame, a rotation member and at least one pipe holding member supportable on the rotation member, the pipe holding member adapted to transport at least one pipe section to and from the horizontal boring machine;*
  *wherein the magazine is adapted to passively position the plurality of pipe sections in the magazine;*
  *wherein the rotation member comprises a pivot member, the pivot member rotatably supportable on the frame;*
  *wherein the pipe holding member is supportable on the pivot member;*
  *wherein the pipe holding member is adapted to receive and release at least one of the plurality of pipe sections; and*
  *wherein rotation of the pivot member causes pivotal movement of the pipe holding member about the pivot member axis and lateral movement between the magazine and the horizontal boring machine;*
  wherein the pipe handling assembly further comprises:
    a pivot member drive mechanism adapted to rotate the pivot member to position the pipe holding member for receipt and release of a pipe section; and
    a pipe holding member drive mechanism adapted to drive the movement of the pipe holding member in a direction generally perpendicular to the axis of rotation of the pivot member; and
  wherein the pivot member has first and second ends and the pivot member drive mechanism comprises:
    a hydraulic cylinder having a piston, the hydraulic cylinder supported on the frame of the pipe handling assembly; and
    a rotatable arm coupling the piston of the hydraulic cylinder with the pivot member, the arm having a fixed end and a free end;
    wherein the fixed end of the arm is rotatably supported at the second end of the [shaft] *pivot member*;
    wherein the piston of the hydraulic cylinder is connectable to the free end of the rotatable arm such that activation of the piston causes rotation of the rotatable arm, thereby rotating the [shaft] *pivot member* and causing movement of the pipe holding member.

96. [The] *A* horizontal boring machine [of claim 95] *having a drill string rotatable about an axis of rotation, and further comprising a pipe handling device for storing and transporting pipe sections to and from the horizontal boring machine, the pipe handling device comprising:*
  *a magazine adapted to store a plurality of pipe sections near the horizontal boring machine; and*
  *a pipe handling assembly adapted to transport at least one pipe section between the magazine and the horizontal boring machine, the pipe handling assembly comprising a frame, a rotation member, and at least one pipe holding member supportable on the rotation member, the pipe holding member adapted to transport at least one pipe section to and from the horizontal boring machine;*
  *wherein the magazine is adapted to passively position the plurality of pipe sections in the magazine;*
  *wherein the rotation member comprises a pivot member, the pivot member rotatably supportable on the frame;*
  *wherein the pipe holding member is supportable on the pivot member;*
  *wherein the pipe holding member is adapted to receive and release at least one of the plurality of pipe sections; and*
  *wherein rotation of the pivot member causes pivotal movement of the pipe holding member about the pivot* member axis and lateral movement between the magazine and the horizontal boring machine;

wherein the pipe handling assembly further comprises an extension assembly supported on the pivot member, the extension assembly adapted to move the pipe holding member between an extended position and a retracted position; and wherein the extension assembly comprises:
an extension arm supported on the pivot member in axial alignment therewith; and
a drive assembly adapted to drive the movement of the extension arm;
wherein the pipe holding member is supported on the extension assembly.

111. [The] *A* horizontal boring machine [of claim 76] having a drill string rotatable about an axis of rotation, and further comprising a pipe handling device for storing and transporting pipe sections to and from the horizontal boring machine, the pipe handling device comprising:

a magazine adapted to store a plurality of pipe sections near the horizontal boring machine; and a pipe handling assembly adapted to transport at least one pipe section between the magazine and the horizontal boring machine, the pipe handling assembly comprising a rotation member and at least one pipe holding member supportable on the rotation member, the pipe holding member adapted to transport at least one pipe section to and from the horizontal boring machine;

wherein the magazine is adapted to passively position the plurality of pipe sections in the magazine; and wherein the pipe handling assembly further comprises:
a frame;
wherein the rotation member comprises a pivot member, the pivot member rotatably supportable on the frame;
wherein the pipe holding member is supportable on the pivot member;
wherein the pipe holding member is adapted to receive and release at least one of the plurality of pipe sections; and
wherein rotation of the pivot member causes the pipe holding member to shuttle linearly between the magazine and the horizontal boring machine.

127. The horizontal boring machine of claim 76 wherein:
the magazine further defines a removal position and a return position;
the pipe handling assembly is adapted to [retriever] *retrieve* pipe sections from the magazine at the removal position and to return pipe sections to the magazine at the return position; and
wherein the plurality of pipe sections fall by gravity from the return position to the removal position.

151. The machine of claim [150] *179* wherein the handling assembly further comprises:
a frame; and
wherein the rotation member comprises a pivot member having an axis of rotation, the pivot member rotatably supportable on the frame;
wherein the holding member is supportable on the pivot member;
wherein the holding member is adapted to receive and release at least one of the plurality of elongate objects; and
wherein rotation of the pivot member causes pivotal movement of the holding member about the pivot member axis and movement of an elongate object to and from the machine.

156. [The] *A* machine [of claim 154] *requiring receipt of elongate objects in a generally horizontal position, the machine comprising a handling device for storing and transporting elongate objects to and from the machine, wherein the handling device comprises:*

*a magazine adapted to store a plurality of elongate objects near the machine wherein the magazine is adapted to passively position the plurality of elongate objects in the magazine*

*a handling assembly adapted to transport at least one elongate object between the magazine and the machine, the handling assembly comprising a frame, a rotation member and at least one holding member supportable on the rotation member, the holding member adapted to transport at least one elongate object to and from the machine;* wherein the magazine is adapted to passively position the plurality of elongate objects in the columns of the magazine;

wherein the rotation member comprises a pivot member having an axis of rotation, the pivot member rotatably supportable on the frame;

wherein the holding member is supportable on the pivot member;

wherein the holding member is adapted to receive and release at least one of the plurality of elongate objects; and wherein rotation of the pivot member causes pivotal movement of the holding member about the pivot member axis and movement of an elongate object to and from the machine;

wherein the handling assembly further comprises:
a pivot member drive mechanism adapted to rotate the pivot member to position the holding member for receipt and release of an elongate object; and
a holding member drive mechanism adapted to drive the movement of the holding member in a direction generally perpendicular to the axis of rotation of the pivot member; and wherein the pivot member has first and second ends and the pivot member drive mechanism comprises:
a hydraulic cylinder having a piston, the hydraulic cylinder supported on the frame of the handling assembly; and
a rotatable arm coupling the piston of the hydraulic cylinder with the pivot member, the arm having a fixed end and a free end;
wherein the fixed end of the arm is rotatably supported at the second end of the [shaft] *pivot member*;
wherein the piston of the hydraulic cylinder is connectable to the free end of the rotatable arm such that activation of the piston causes rotation of the rotatable arm, thereby rotating the [shaft] *pivot member* and causing movement of the holding member.

168. [The] *A* machine [of claim 167] *requiring receipt of elongate objects in a generally horizontal position, the machine comprising a handling device for storing and transporting elongate objects to and from the machine, wherein the handling device comprises:*

*a magazine adapted to store a plurality of elongate objects near the machine; and*

*a handling assembly adapted to transport at least one elongate object between the magazine and the machine,* the handling assembly comprising a frame, a rotation member, and at least one holding member supportable on the rotation member, the holding member adapted to transport at least one elongate object to and from the machine;

wherein the magazine is adapted to passively position the plurality of elongate objects in the magazine; and wherein the rotation member comprises a pivot member having an axis of rotation, the pivot member rotatably supportable on the frame;

wherein the holding member is supportable on the pivot member;

wherein the holding member is adapted to receive and release at least one of the plurality of elongate objects; and wherein rotation of the pivot member causes pivotal movement of the holding member about the pivot member axis and movement of an elongate object to and from the machine;

wherein the handling assembly further comprises an extension assembly supported on the pivot member, the extension assembly adapted to move the holding member between an extended position and a retracted position; and wherein the extension assembly comprises:
an extension arm supported on the pivot member in axial alignment therewith; and
a drive assembly adapted to drive the movement of the extension arm;
wherein the holding member is supported on the extension assembly.

172. The machine of claim [150] *179* further comprising a mounting assembly adapted to removably connect the magazine to the handling assembly.

178. The machine of claim 177 wherein the [pivot] *rotation* member defines apertures adapted to receive a handle.

179. [The machine of claim 150 further comprising] *A machine requiring receipt of elongate objects in a generally horizontal position, the machine comprising a handling device for storing and transporting elongate objects to and from the machine, wherein the handling device comprises:*
*a magazine comprising a plurality of object receiving columns and adapted to store a plurality of elongate objects near the machine;*
*a handling assembly adapted to transport at least one elongate object between the magazine and the machine, the handling assembly comprising a rotation member and at least one holding member supportable on the rotation member, the holding member adapted to transport at least one elongate object to and from the machine;*
*wherein the magazine is adapted to passively position the plurality of elongate objects in the columns of the magazine; and*
*a mounting assembly adapted to removably connect the handling assembly to the machine, wherein the machine is a drilling machine.*

180. The machine of claim [150] *179* wherein the magazine further comprises a mounting assembly adapted to position the handling assembly laterally adjacent the magazine.

183. The machine of claim [150] *179* further comprising a friction member adapted to prevent axial sliding of the elongate object and wherein the friction member comprises a roller adapted to permit rotation of the elongate object.

184. [The] *A* machine [of claim 150] *requiring receipt of elongate objects in a generally horizontal position, the machine comprising a handling device for storing and transporting elongate objects to and from the machine, wherein the handling device comprises:*
*a magazine adapted to store a plurality of elongate objects near the machine; and*
*a handling assembly adapted to transport at least one elongate object between the magazine and the machine, the handling assembly comprising a rotation member and at least one holding member supportable on the rotation member, the holding member adapted to transport at least one elongate object to and from the machine;*
*wherein the magazine is adapted to passively position the plurality of elongate objects in the magazine; and*
wherein the handling assembly further comprises:
a frame;
wherein the rotation member comprises a pivot member, the pivot member rotatably supportable on the frame;
wherein the holding member is supportable on the pivot member;
wherein the holding member is adapted to receive and release at least one of the plurality of elongate objects; and
wherein rotation of the pivot member causes the holding member to shuttle linearly to and from the handling device.

194. The machine of claim [150] *179* wherein the handling assembly comprises a frame adapted to retract the handling assembly to a position enabling manual loading and unloading of elongate objects to and from the horizontal boring machine.

195. The machine of claim [150] *179* wherein:
the magazine further defines a removal position and a return position;
the handling assembly is adapted to retrieve elongate objects from the magazine at the removal position and returns elongate objects to the magazine at the return position; and
wherein a plurality of elongate objects fall by gravity from the return position to the removal position.

209. The machine of claim [150] *179* wherein the magazine further comprises a frame adapted to store the plurality of elongate objects in an arcuate path.

218. The machine of claim [150] *179* wherein the magazine further comprises an open bottom and [a plurality of pipe receiving columns adapted to store the plurality of elongate objects in generally parallel columns and] wherein the plurality of elongate objects are accessed through the open bottom.

223. A pipe handling assembly for use with a horizontal boring machine and a magazine adapted to store a plurality of pipe sections near the horizontal boring machine, the magazine further adapted to passively position the plurality of pipe sections, wherein the pipe handling assembly comprises:
a frame;
a transport member movably supportable on the frame and adapted to transport at least one of the plurality of pipe sections;
at least one pipe holding member supportable on the transport member; *and*
*a pipe return assembly adapted to return at least one of the plurality of pipe sections into a lower portion of the magazine;* wherein the pipe holding member is adapted to receive and release at least one of the plurality of pipe sections; and wherein the movement of the transport member causes the pipe holding member to shuttle linearly to and from the horizontal boring machine.

224. [The] *A* pipe handling assembly [of claim 223] *for use with a horizontal boring machine and a magazine adapted to store a plurality of pipe sections near the horizontal boring machine, the magazine further adapted to passively position the plurality of pipe sections, wherein the pipe handling assembly comprises:*

*a frame;*

*a transport member movably supportable on the frame and adapted to transport at least one of the plurality of pipe sections; and*

*at least one pipe holding member supportable on the transport member;*

*wherein the pipe holding member is adapted to receive and release at least one of the plurality of pipe sections;*

*wherein the movement of the transport member causes the pipe holding member to shuttle linearly to and from the horizontal boring machine; and* wherein the transport member comprises a rotation member and wherein rotation of the rotation member causes the pipe holding member to shuttle to and from the horizontal boring machine.

232. [The] *A* pipe handling assembly [of claim 231] *for use with a horizontal boring machine and a magazine adapted to store a plurality of pipe sections near the horizontal boring machine, the magazine further adapted to passively position the plurality of pipe sections, wherein the pipe handling assembly comprises:*

*a frame;*

*a transport member movably supportable on the frame and adapted to transport at least one of the plurality of pipe sections;*

*at least one pipe holding member supportable on the transport member; and*

*a drive assembly adapted to drive the movement of the transport member;*

*wherein the pipe holding member is adapted to receive and release at least one of the plurality of pipe sections;*

*wherein the movement of the transport member causes the pipe holding member to shuttle linearly to and from the horizontal boring machine; and* wherein the drive assembly comprises a rack and pinion gear assembly supported on the frame, the rack and pinion gear assembly adapted to laterally extend and retract the transport member with respect to the boring machine.

233. [The] *A* pipe handling assembly [of claim 223 further comprising] *for use with a horizontal boring machine and a magazine adapted to store a plurality of pipe sections near the horizontal boring machine, the magazine further adapted to passively position the plurality of pipe sections, wherein the pipe handling assembly comprises:*

*a frame;*

*a transport member movably supportable on the frame and adapted to transport at least one of the plurality of pipe sections;*

*at least one pipe holding member supportable on the transport member; and*

*a pipe return assembly adapted to return at least one of the plurality of pipe sections into the magazine;*

*wherein the pipe holding member is adapted to receive and release at least one of the plurality of pipe sections; and*

*wherein the movement of the transport member causes the pipe holding member to shuttle linearly to and from the horizontal boring machine.*

237. A method for handling a plurality of pipe sections at a horizontal boring site and for use with a horizontal boring machine having a connecting position for connecting at least one of the plurality of pipe sections, the method comprising the steps of:

storing the plurality of pipe sections in *a plurality of generally parallel columns at* a storage position adjacent to the horizontal boring machine;

during the boring phase, delivering at least one of the plurality of pipe sections from the storage position to a receiving position laterally adjacent the connecting position; [and]

transferring the delivered pipe section from the receiving position to the connecting position of the horizontal boring machine; *and*

*returning a pipe section from the connecting position of the horizontal boring machine to the storage position;*

*wherein transfer of the delivered pipe section is carried out exclusively by linear movement of the delivered pipe section between the receiving position and the connecting position.*

240. [The] *A* method [of claim 237 further comprising the step of withdrawing the] *for handling a* plurality of pipe sections [from the connecting area of the] *at a horizontal boring site and for use with a* horizontal boring machine *having a connecting position for connecting at least one of the plurality of pipe sections, the method comprising the steps of:*

*storing the plurality of pipe sections in a plurality of generally parallel columns at a storage position adjacent to the horizontal boring machine;*

*during the boring phase, delivering at least one of the plurality of pipe sections from the storage position to a receiving position laterally adjacent the connecting position;*

*transferring the delivered pipe section from the receiving position to the connecting position of the horizontal boring machine; and* withdrawing the plurality of pipe sections from the connecting area of the horizontal boring machine;

*wherein transfer of the delivered pipe section is carried out exclusively by linear movement of the delivered pipe section between the receiving position and the connecting position.*

\* \* \* \* \*